United States Patent
Itkonen et al.

(10) Patent No.: US 11,992,030 B2
(45) Date of Patent: May 28, 2024

(54) MEAT-REPLACEMENT PRODUCT AND A METHOD OF MANUFACTURING THE SAME

(71) Applicant: VALIO OY, Helsinki (FI)

(72) Inventors: Maija Itkonen, Helsinki (FI); Zhongqing Jiang, Helsinki (FI); Jingwei Liu, Vantaa (FI); Veera Lintola, Espoo (FI)

(73) Assignee: Valio Oy, Helsinki (FI)

( * ) Notice: Subject to any disclaimer, the term of this patent is extended or adjusted under 35 U.S.C. 154(b) by 0 days.

(21) Appl. No.: 18/347,766

(22) Filed: Jul. 6, 2023

(65) Prior Publication Data

US 2023/0345969 A1    Nov. 2, 2023

Related U.S. Application Data

(63) Continuation of application No. PCT/EP2022/050005, filed on Jan. 3, 2022.

(30) Foreign Application Priority Data

Jan. 20, 2021 (FI) ..................................... 20215066

(51) Int. Cl.
*A23J 3/14* (2006.01)
*A23J 3/22* (2006.01)
(Continued)

(52) U.S. Cl.
CPC .................. *A23J 3/227* (2013.01); *A23J 3/14* (2013.01); *A23J 3/26* (2013.01); *A23L 7/152* (2016.08); *A23L 7/25* (2016.08); *A23L 29/212* (2016.08)

(58) Field of Classification Search
CPC ...... A23J 3/227; A23J 3/14; A23J 3/26; A23L 7/25; A23L 29/212
(Continued)

(56) References Cited

U.S. PATENT DOCUMENTS

| | | | |
|---|---|---|---|
| 3,883,672 A | 5/1975 | Bone et al. | |
| 3,904,775 A | 9/1975 | Harwood et al. | |

(Continued)

FOREIGN PATENT DOCUMENTS

| | | |
|---|---|---|
| BE | 1024412 A1 | 2/2018 |
| BE | 1024413 A1 | 2/2018 |

(Continued)

OTHER PUBLICATIONS

International Preliminary Report on Patentability issued by the International Bureau of WIPO in relation to International Application No. PCT/EP2022/050005 dated Jul. 20, 2023 (11 pages).

(Continued)

*Primary Examiner* — Hamid R Badr
(74) *Attorney, Agent, or Firm* — Robert P. Michal; Carter, DeLuca & Farrell LLP

(57) ABSTRACT

To improve texture, mouthfeel, and/or to prevent or delay protein matrix hardening, meat-replacement food products are manufactured with a high moisture protein texturization method using i) at least one proteinaceous matrix forming ingredient, such as protein isolate or protein concentrate,
ii) starch-containing grains that are selected from: ii.a) steeped grains, ii.b) germinated grains, ii.c) malted grains, ii.d) sprouted grains, or ii.e) any combination of two, three or four of these as one of the ingredients, and
iii) water or water-containing liquid in the extruder under conditions causing the continuous proteinaceous fibrous matrix structure to contain disruptions, the extrudate including starch located in the disruptions and not emulsified with the proteinaceous fibrous matrix structure.

25 Claims, 16 Drawing Sheets

(51) Int. Cl.
*A23J 3/26* (2006.01)
*A23L 7/152* (2016.01)
*A23L 7/25* (2016.01)
*A23L 29/212* (2016.01)

(58) Field of Classification Search
USPC .................................................. 426/574
See application file for complete search history.

(56) References Cited

U.S. PATENT DOCUMENTS

| | | | |
|---|---|---|---|
| 4,029,823 | A | 6/1977 | Bone et al. |
| 4,124,727 | A | 11/1978 | Rockland et al. |
| 4,748,037 | A | 5/1988 | Matsumoto et al. |
| 4,910,025 | A * | 3/1990 | Lee .................... A23L 7/20 426/549 |
| 5,296,253 | A | 3/1994 | Lusas et al. |
| 5,382,443 | A | 1/1995 | Kincaid et al. |
| 5,902,629 | A | 5/1999 | Baker et al. |
| 6,041,868 | A | 3/2000 | Matus et al. |
| 6,042,868 | A | 3/2000 | Ameye et al. |
| 9,314,045 | B2 | 4/2016 | Nishimura et al. |
| 9,907,332 | B2 | 3/2018 | Davila et al. |
| 2005/0153044 | A1 | 7/2005 | Hellweg et al. |
| 2006/0051492 | A1 | 3/2006 | Mueller et al. |
| 2007/0087107 | A1 | 4/2007 | Borders et al. |
| 2007/0104853 | A1 | 5/2007 | Coleman et al. |
| 2008/0145483 | A1 | 6/2008 | Berrios et al. |
| 2009/0155447 | A1 | 6/2009 | Moore et al. |
| 2010/0285196 | A1 | 11/2010 | Moore et al. |
| 2012/0207904 | A1* | 8/2012 | Twombly .............. A23L 13/426 426/574 |
| 2014/0010920 | A1 | 1/2014 | Nishimura et al. |
| 2014/0170283 | A1 | 6/2014 | McMindes et al. |
| 2015/0044334 | A1* | 2/2015 | Walther ............... A23P 30/20 426/63 |
| 2016/0205985 | A1 | 7/2016 | Walther et al. |
| 2017/0029733 | A1 | 2/2017 | Felix |
| 2017/0105428 | A1 | 4/2017 | Kiveläet al. |
| 2018/0064137 | A1 | 3/2018 | Trottet et al. |
| 2018/0279646 | A1 | 10/2018 | Kiveläet al. |
| 2018/0360084 | A1 | 12/2018 | Wang et al. |
| 2020/0260768 | A1 | 8/2020 | Sillick et al. |

FOREIGN PATENT DOCUMENTS

| | | |
|---|---|---|
| CN | 1350433 A | 5/2002 |
| CN | 103783374 A | 5/2014 |
| CN | 104026584 B | 11/2015 |
| CN | 105410329 A | 3/2016 |
| CN | 106538820 A | 3/2017 |
| CN | 107509960 A | 12/2017 |
| CN | 108471778 A | 8/2018 |
| CN | 108471780 A | 8/2018 |
| EP | 0682876 A1 | 11/1995 |
| EP | 2689670 A1 | 1/2014 |
| EP | 3155903 A1 | 4/2017 |
| EP | 3387914 A1 | 10/2018 |
| FR | 2340054 A1 | 9/1977 |
| GB | 1361735 A | 7/1974 |
| GB | 1433841 A | 4/1976 |
| GB | 1433842 A | 4/1976 |
| GB | 1433843 A | 4/1976 |
| GB | 2067884 A | 8/1981 |
| RU | 2679394 C1 | 2/2019 |
| WO | 9631128 A1 | 10/1996 |
| WO | 9634539 A1 | 11/1996 |
| WO | 9717858 A1 | 5/1997 |
| WO | 0228201 A1 | 4/2002 |
| WO | 2004016097 A1 | 2/2004 |
| WO | 2005004625 A1 | 1/2005 |
| WO | 2008036906 A1 | 3/2008 |
| WO | 2009038938 A1 | 3/2009 |
| WO | 2011053786 A2 | 5/2011 |
| WO | 2011092360 A1 | 8/2011 |
| WO | 2017153930 A1 | 9/2017 |
| WO | 2018177717 A1 | 10/2018 |

OTHER PUBLICATIONS

International Search Report issued by the European Patent Office acting as the International Searching Authority in relation to International Application No. PCT/EP2022/050005 dated Mar. 25, 2022 (3 pages).
Written Opinon of the International Searching Authority issued by the European Patent Office acting as the International Searching Authority in relation to International Application No. PCT/EP2022/050005 dated Mar. 25, 2022 (9 pages).
Tolstoguzov, V. B. (1993), Thermoplastic extrusion-the mechanism of the formation of extrudate structure and properties. J Am Oil Chem Soc, 70: 417-424. doi:10.1007/BF02552717.
Akdogan, H. (1999), High moisture food extrusion. International Journal of Food Science & Technology, 34: 195-207. doi:10.1046/j.1365-2621.1999.00256.x.
Lin, S., Huff, H. and Hsieh, F. (2000), Texture and Chemical Characteristics of Soy Protein Meat Analog Extruded at High Moisture. Journal of Food Science, 65: 264-269. doi:10.1111/j.1365-2621.2000.tb15991.x.
Xiang Dong Sun, Susan D. Arntfield. (2010) Gelation properties of salt-extracted pea protein induced by heat treatment. Food Research International. vol. 43, Issue 2, 2010, pp. 509-515.
M. H. Boyacioglu and B. L. D'Appolonia. (1994) Characterization and utilization of durum wheat for breadmaking III. Staling properties of bread baked from bread wheat flours and durum wheat flours. Cereal Chemistry. 71:34-41.
Szczesniak, A. S. (1963). Classification of textural characteristics. J. Food Sci, 28, 385-389.
Bourne, M. C. (1978). Texture Profile Analysis. Food Technol., 32 (7), 62-66, 72.
Bourne, M. C., Basic Principles of Food Texture Measurement, Chapter 6, H. Faridi et al. (eds.), Dough Rheology and Baked Product Texture © Van Nostrand Reinhold 1990.
Szczesniak, A. S. (1966). Texture Measurements. Food Technol., 20, 50, 55-58.).
McGrance, S. J., Cornell, H. J. and Rix, C. J. (1998), A Simple and Rapid Colorimetric Method for the Determination of Amylose in Starch Products. Starch/Stärke, 50: 158-163. doi:10.1002/(SICI)1521-379X(199804)50:4<158:: AID-STAR158>3.0.CO;2-7.
Adedeji, O. E., Oyinloye, O. D., & Ocheme, O. B. (2014). Effects of germination time on the functional properties of maize flour and the degree of gelatinization of its cookies. African Journal of Food Science, 8(1), 42-47.
Azarfar, A., Williams, B. A., Boer, H. and Tamminga, S. (2007) In vitro gas production profile and the formation of end products from non? washable, insoluble washable and soluble washable fractions in some concentrate ingredients. Journal of the Science of Food and Agriculture. 87: 1345-1355.
A Kaukovirta-Norja, A Wilhelmson, K Poutanen. (2004) Germination: a means to improve the functionality of oat. Journal of the Agricultural and Food Science. 12: 100-112.
Paolo Benincasa et al., Sprouted Grains: A Comprehensive Review, Nutrients 2019, 11, 421; <https://doi.org/10.3390/nu11020421>.
Hood-Niefer, S. High moisture protein fibration of pulse ingredients. Power Point presentation. Innovation Summit 2016, Oct. 19-20, 2016. Saskatchewan Food Industry Developement Centre Inc (onlnie), retrieved Apr. 21, 2021. Available at https://clextral.com/files/2016/11/high-moisture-fibration-of-pulse-ingredients.pdf.
Finnish Search Report issued by the Finnish Patent and Registration Office in relation to Finnish Patent Application No. 20215066 dated Apr. 22, 2021 (2 pages).
Finnish Office Action issued by the Finnish Patent and Registration Office in relation to Finnish Patent Application No. 20215066 dated Jul. 1, 2022 ( 6 pages).

(56) References Cited

OTHER PUBLICATIONS

Altan A. et al. Effect of screw configuration and raw material on some properties of barley extrudates. Journal of Food Engineering, 2009, vol. 92, No. 4, p. 377-382. doi: 10.1016/j.jfoodeng.2008.12.010.

Carvalho C. W.P. et al. Relative effect of particle size on the physical properties of corn mean extrudates: Effect of particle size on the extrusion of corn meal. Journal of Food Engineering, 2010, vol. 98, No. 1, p. 103-109.

Al-Rabadi, G. J. et al. Particle size of milled barley and sorghum and physico-chemical properties of grain following extrusion. Journal of Food Engineering, 2011, vol. 103, No. 4, p. 464-472.

Singh, B. et al. Effects of moisture, temperature and level of pea grits on extrusion behaviour and product characteristics of rice. Food Chemistry, 2007, vol. 100, No. 1, p. 198-202. doi:10.1016/j.foodchem.2005.09.042.

Drzikova, B. et al. The composition of dietary fibre-rich extrudates from oat affects bile acid binding and fermentation in vitro. Food Chemistry, 2005, vol. 90, No. 1-2, p. 181-192.

Liu C. et al. Preparation, physicochemical and texture properties of texturized rice produce by Improved Extrusion Cooking Technology. Journal of Cereal Science, 2011, vol. 54, No. 3, p. 473-480. doi: 10.1016/j.jcs.2011.09.001.

Robin, F. et al. Extrusion, structure and mechanical properties of complex starchy foams, Journal of Food Engineering, 2010, vol. 98, No. 1, p. 19-27.

Cian, R. et al. Optimization of single screw extrusion process for producing fish feeds based on vegetable meals and evaluation of nutritional effects using a juvenile Piaractus mesopotamicus model. Animal Feed Science and Technology, 2017, vol. 234, p. 54-64. doi:10.1016/j.anifeedsci.2017.09.004.

Zhang, M. et al. "Extrusion process improves the functionality of soluble dietary fiber in oat bran" Journal of Cereal Science, 2011, vol. 54, No. 1, p. 98-103. doi:10.1016/j.jcs.2011.04.001.

Al-Rabadi, G.J. et al. Effect of extrusion temperature and pre-extrusion particle size on starch digestion kinetics in barley and sorghum grain extrudates. Animal Feed Science and Technology, 2011, vol. 168, pp. 267-279, [Retrieved Jan. 30, 2019].

Frohlich, P. et al. Pulse ingredients as healthier options in extruded products. Cereal Foods World, May-Jun. 2014, vol. 59, No. 3, pp. 120-125, [Retrieved Jan. 30, 2019].

Walsh, M.K. et al. Properties of Extrusion-Expanded Whey Protein Products Containing Fiber, International Journal of Food Properties, 2010, vol. 13, No. 4, pp. 702-712.

Osen, R. et al. High moisture extrusion cooking of pea protein isolates: Raw material characteristics, extruder responses, and texture properties. Journal of Food Engineering, 2014, vol. 127, pp. 67-74.

Database Caba [online] Mar. 16, 2011 (Mar. 16, 2011), Egorova, A.V. Method of obtaining cereal-based functional food products. Scientific Works of the University of Food Technologies—Plovdiv, 2008, vol. 55, No. 1, pp. 421-425. Published by: University of Food Technologies (UFT), Plovdiv, Conference: Scientific conference with international participation. 'Food science, engineering and technologies 2008'. Plovdiv.

Written Opinion of the IPEA dated Jun. 23, 2021, issued in corresponding international application No. PCT/EP2019/068296.

International Search Report and Written Opinion dated Apr. 24, 2020, issued in corresponding international appln. No. PCT/EP/2019/068926.

Chinese Office Action dated Sep. 29, 2023 (16 pages), issued in corresponding CN Application No. 2019801002306, and English translation (23 pages), total 39 pages.

English translation of Chinese Search Report dated Sep. 26, 2023, issued in corresponding CN Application No. 2019801002306, 3 pages.

* cited by examiner

\# 8

\# 7

\# 5

5

8

FIG 4
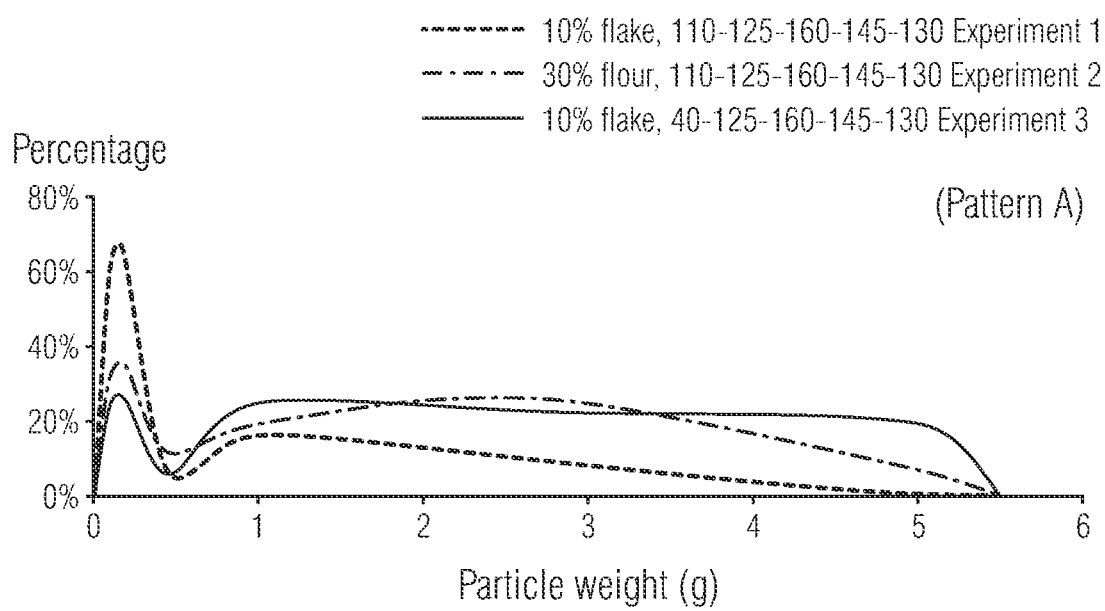
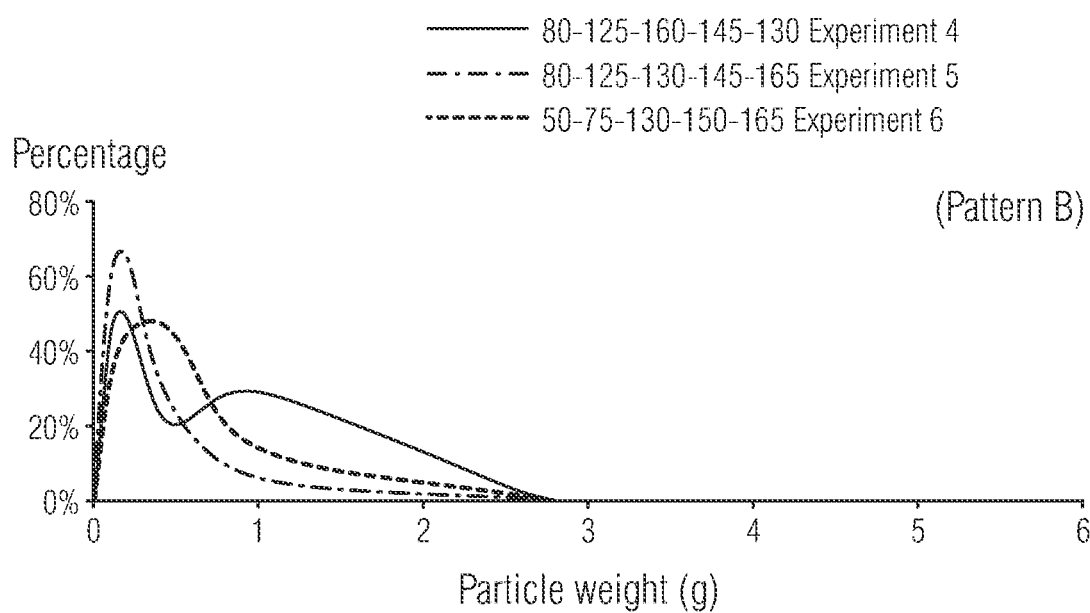

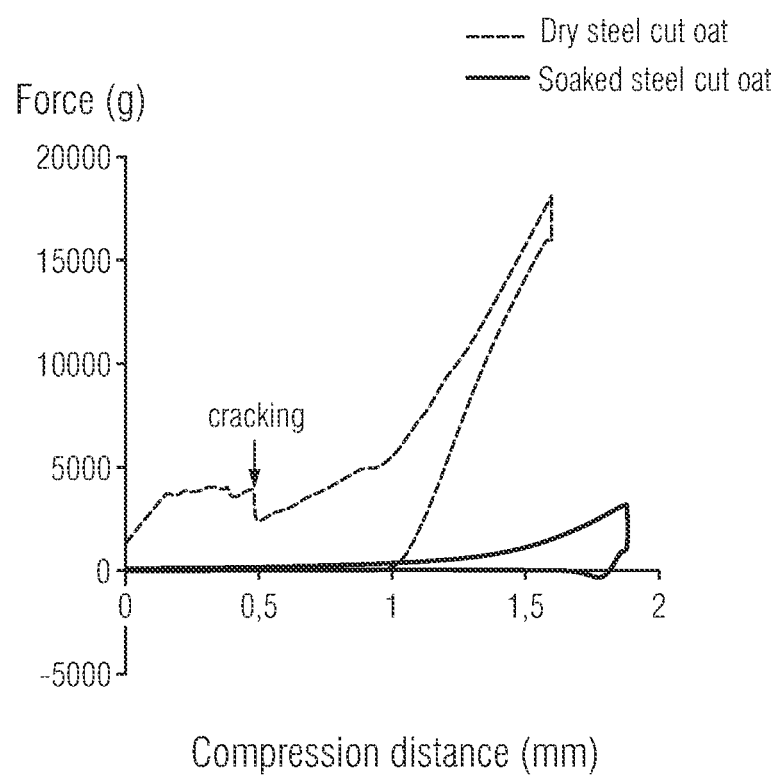

FIG 10
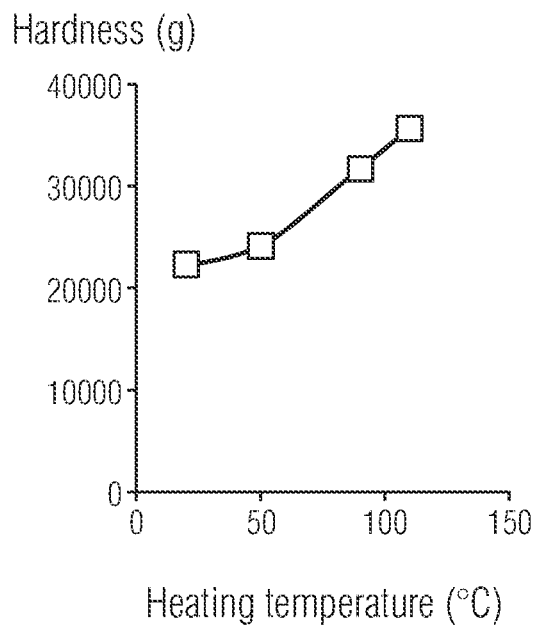
FIG 11
Knife cutting:
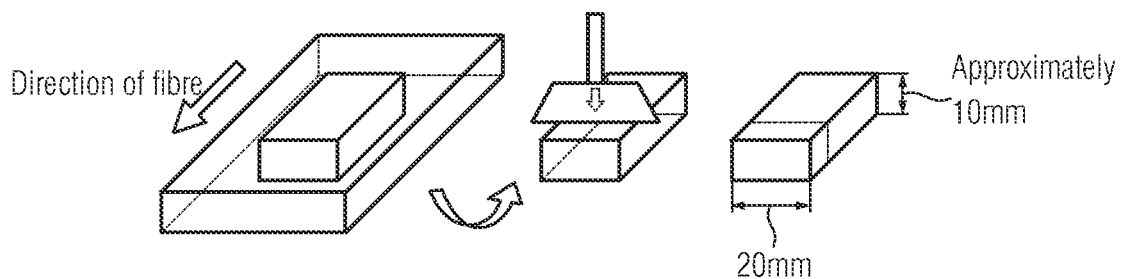
Cylinder Compression:
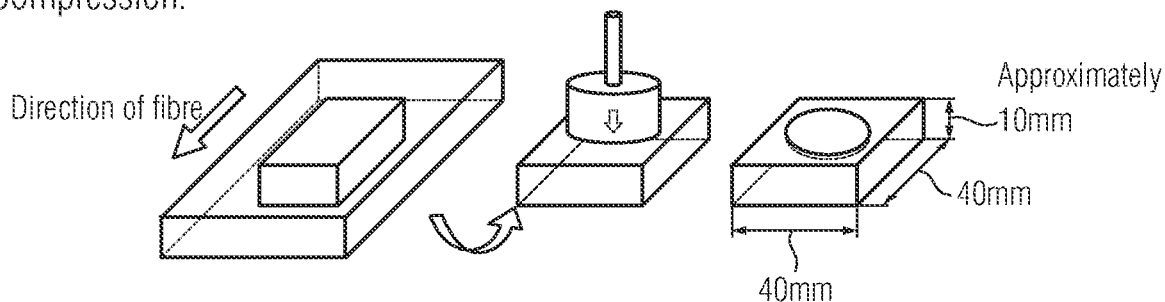

MEAT-REPLACEMENT PRODUCT AND A METHOD OF MANUFACTURING THE SAME

CROSS-REFERENCE TO RELATED APPLICATIONS

This application is a continuation of PCT International Application No. PCT/EP2022/050005 filed Jan. 3, 2022, which claims priority to Finnish Patent Application No. 20215066, filed Jan. 20, 2021, the disclosure of each of these applications is expressly incorporated herein by reference in their entirety.

FIELD OF THE INVENTION

The invention relates to meat-replacement products as well as their manufacturing methods.

TECHNICAL BACKGROUND

In the recent years, many people have turned vegetarian or vegan, or at least increased the share of vegetables and vegetable products in their diet. While ecological concerns are the reason for some, it appears also clear that vegetables and products made of vegetables should be a central part of a healthy diet. Many consumers find it difficult to ensure a daily protein intake with vegetables or products made of vegetables, while some find it time-consuming to prepare the protein-containing ingredients for cooking or baking.

Thus, there is a market for vegetarian or vegan foods produced on an industrial basis by extrusion cooking. Extrusion cooking is a continuous process which enables the production of texturized proteins that are unique products made by extrusion. The extrusion enables controlling the functional properties such as density, rate and time of rehydration, shape, product appearance and mouthfeel.

For extrusion of meat replacement products, also known as meat analogues or texturized vegetable products, a twin-screw extruder is normally used. There are mainly two types of extrusion cooking methods for preparing meat replacement products.

One kind of meat replacement products is produced with low moisture protein texturization extrusion. Such products have a moisture content between 10% and 40% (moisture content during extrusion is between 15% and 40%). They often have a sponge-like texture and require rehydration prior consumption. These products are often used as minced meat substitutes or extenders in meat products but can hardly mimic fibrous whole-muscle meat.

Another kind of meat replacement products is manufactured with high moisture protein texturization extrusion. Such products have a moisture content between 40% and 80% (moisture content during extrusion is beyond 40%). They generally resemble more muscle food than the meat replacement products manufactured with low moisture texturization extrusion.

Meat replacement products are generally manufactured by mixing at least one proteinaceous matrix forming ingredient, such as protein isolate or protein concentrate (that generally are referred to as protein fractions), possibly starch-containing particles, possibly oil, and extruding the ingredients mixed to a slurry in an extruder that is configured to carry out protein texturization extrusion.

In the tests carried out by the inventors with high moisture protein texturization extrusion, we found out that the mouth feel of a freshly extruded meat replacement product is generally very appealing. However, after a relatively short time (typically in the range of few minutes, typically 5 to 10 minutes), the mouth feel becomes inacceptable when the meat replacement product cools.

Currently, meat replacement products manufactured with high moisture protein texturization extrusion are often sold deep frozen. Alternatively, meat replacement products are sold minced or torn in pieces such that the inacceptable mouth feel becomes less apparent.

OBJECTIVE OF THE INVENTION

An objective of the invention is generally to improve the texture and mouthfeel of a meat-replacement food product (which is a meat imitate), and further to delay the structure-hardening (firming) of the protein matrix of the meat-replacement food product. Further objectives are to improve nutritional properties and flavour of a meat-replacement food product (which is a meat imitate). All or at least some of these objectives can be achieved with the method and with meat replacement food product.

The dependent patent claims describe advantageous embodiments of the method and meat replacement product.

Advantages of the Invention

In the method of manufacturing a meat replacement food product,
i. at least one proteinaceous matrix forming ingredient, such as protein isolate or protein concentrate,
ii. starch-containing grains that are selected from: ii.a) steeped grains, ii.b) germinated grains, ii.c) malted grains, ii.d) sprouted grains, or ii.e) any combination of two, three or four of these as one of the ingredients, and
iii. water or water-containing liquid
   a. are fed to an extruder suitable for high-moisture protein texturization extrusion; and
   b. are extruded in the extruder.

The extrusion is carried out under conditions causing the continuous proteinaceous fibrous matrix structure to contain disruptions, the extrudate comprising starch located in the disruptions and not emulsified with the proteinaceous fibrous matrix structure. The starch located in the disruptions and not emulsified may help to obtain an improved mouth-feel which is sustained for a prolonged period.

With the method, it is possible to improve the texture and mouthfeel of the meat-replacement food product. It is also possible to prevent or delay structure-hardening (firming) of the protein matrix.

Furthermore, with the method, nutritional properties and flavour of the meat-replacement food product may be improved. Though it is known that nutritional properties of sprouted grains is improved [cf "5 Sprouted Seeds and Human Health" in Ref 14], the sprouted grains are used in powder form if not consumed ready-to-eat or used in beverage fermentation process. With the method, starch-containing grains that are selected from: ii.a) steeped grains, ii.b) germinated grains, ii.c) malted grains, ii.d) sprouted grains, or ii.e) any combination of two, three or four of these may be higher than starch-containing grains that are neither steeped, germinated, malted nor sprouted, while enabling advantages in the mouthfeel, textural properties and protein matrix hardening characteristics. The inventors are unaware that these ingredients would have been used as starting materials in protein texturization extrusion to manufacture a meat-replacement product.

Preferably, the extrusion is carried out as high moisture protein texturization extrusion method in which starch containing grains are gelatinized and the proteins forming a proteinaceous matrix are melted. This enables a more dense structure of the meat-replacement food product which in turn may contribute to the improvement in the texture properties and mouthfeel and/or delaying or preventing of the protein matrix hardening.

Preferably, in the extrusion, the starch-containing grains are gelatinized before they get substantially powdered by the extruder screw, to produce a continuous proteinaceous fibrous matrix structure that is substantially linearly oriented in which some of the starch is not emulsified with the proteinaceous fibrous matrix structure. This may help to obtain an improved mouthfeel which sustains for a prolonged period.

Preferably, in the extrusion, the starch containing grains are gelatinized and the proteins forming the proteinaceous matrix are melted:
  i. before the gelatinized starch containing grains form an emulsion with the proteins of the proteinaceous matrix, and/or
  ii. before the gelatinized starch forms a complete barrier that prohibits the formation of continuous proteinaceous fibrous crosslinking matrix.

This may help to obtain an improved mouthfeel which is sustained for a prolonged period.

Preferably, after the extrusion, in the extrudate
  i. at least 10.5% of the starch is washable starch when the protein content of the extrudate is larger than 55% but smaller than 70% weight-%,
  ii. at least 15% of the starch is washable starch when the protein content of the extrudate is at least 70% but smaller than 90% weight-%,
  iii. at least 16% of the starch is washable starch when the protein content of the extrudate is at least 90% but equal to or smaller than 99% weight-%,
  wherein the weight-% indicated are on a dry basis.

These percentages of washable starch may help to obtain an improved mouthfeel which is sustained for a prolonged period.

Preferably, the proteinaceous matrix structure comprises disruptions, of which some are in form of cavities that have walls that are at least partly coated with gelatinized starch clusters formed with starch, preferably with soluble starch or washable starch. Cavities having walls at least partly coated with gelatinized starch clusters formed with starch may help to obtain an improved mouthfeel which is sustained for a prolonged period.

In practice, from the viewpoint of commercially available materials, the at least one proteinaceous matrix forming ingredient may be or comprise at least one protein isolate and/or at least one protein concentrate.

The starch-containing grains preferably have an average or median particle volume of at least 0,125 mm$^3$, preferably at least 1 mm$^3$, most preferably at least 6 mm$^3$.

Preferably, the extrusion is carried out such that:
  a. water or water-containing liquid is fed into the extruder;
  b. the mixture is heated in the extruder to gelatinize the starch containing grains;
  c. after reaching the starch gelatinization, further heating the mixture in the extruder to melt the at least one proteinaceous matrix forming ingredient;
  d. extruding the mixture through an extrusion die at temperature between 70° C. and 100° C.

Carrying the extrusion out in this manner, the inventors have managed to manufacture meat-replacement food products an improved mouthfeel which is sustained for a prolonged period.

Preferably,
  e. the heating step b. is performed as shock heating such that the starch containing grains are gelatinized before they get substantially powdered by the extruder screw, preferably:
    i. such that starch gelatinization occurs between 0 s and 18 s, advantageously between 1 s and 15 s, after the water/water-containing liquid feeding step a; and/or
    ii. before the starch containing grains are ground by the extruder screw to a volume-per-particle less than 5 000 µm3, and preferably before the starch containing grains are ground by the extruder screw to a volume-per-particle less than 1000 µm3; and/or
  f. the heating step c. is performed as shock heating such that the protein melting temperature of the proteinaceous matrix forming ingredient will be achieved, preferably at a temperature between 140° C. and 200° C. and/or such that protein melting occurs between 1 s and 40 s, advantageously between 10 s and 30 s, after water/water-containing liquid feeding step a; and/or
  g. after the heating step c. extruding of the mixture is continued at temperature not higher than that in the heating step c., preferably between 90° C. and the temperature in heating step c., for more than 5 s, preferably for more than 10 s.

The starch containing grains may be processed before feeding into the extruder such that the starch is at least partly gelatinized before feeding into the extruder.

Preferably, the water or water-containing liquid is fed to the extruder at an elevated temperature, preferably the water has a temperature of above 60° C., more preferably above 65° C., most preferably above 75° C.

The starch-containing grains may be selected of, comprise or consist of one or more of the following: oat, barley, rye, wheat, rice, corn, lentil, chickpea, mung bean, faba bean, pea, quinoa, pigeon peas, sorghum, buckwheat.

Preferably, the starch-containing grains consist of or comprise whole grains. It is possible that the shell (such as bran layer) of the whole grains prevents or slows down powdering of the grains in the extruder, thus preventing some of the starch forming an emulsion with the protein matrix. This may help to obtain an improved mouthfeel which is sustained for a prolonged period.

The starch-containing grains may consist of or comprise mechanically processed starch containing grains, such as in particular one or more of the following: flakes (such as compressed, rolled, or flaked), steel cut grains, dehulled pearled grains, crushed grains, dehulled but not pearled grains. It is possible that the mechanically processed starch containing grains prevent or slow down powdering of the grains in the extruder, thus preventing some of the starch forming an emulsion with the protein matrix. This may help to obtain an improved mouthfeel which is sustained for a prolonged period.

Preferably, in the method, in addition to
  i. at least one proteinaceous matrix forming ingredient, such as protein isolate or protein concentrate,
  ii. starch-containing grains that are selected from: ii.a) steeped grains, ii.b) germinated grains, ii.c) malted grains, ii.d) sprouted grains, ii.e) any combination of two, three or four of these as one of the ingredients, and
  iii. water or water-containing liquid also
  iv. flour and/or bran and/or starch and/or fibre may be used. This may result in advantages such as improving the nutritional value of the meat-replacement product. Furthermore, these materials are widely available commercially. They may also be used to control the hardening to certain extent. Different protein source with different amount of protein may have different combination effects with starch, flour and fibre.

The flour may comprise, consist of or be selected from at least one of the following: oat, barley, rye, wheat, rice, corn, lentil, chickpea, mung bean, faba bean, pea, quinoa, pigeon peas, sorghum, buckwheat, potato, sweet potato, lupine, any mixture thereof.

The bran may comprise, consist of or be selected from at least one of the following: oat bran, barley bran, wheat bran, rice bran, rye bran, corn bran, millet bran, any mixture thereof.

The starch may comprise, consist of or be selected from at least one of the following: oat starch, barley starch, rye starch, wheat starch, rice starch, corn starch, lentil starch, chickpea starch, mung bean starch, faba bean starch, pea starch, quinoa starch, pigeon peas starch, sorghum starch, buckwheat starch, potato starch, sweet potato starch, lotus root starch, any mixture thereof.

The fibre may comprise, consist of or be selected from at least one of the following: oat fibre, barley fibre, rye fibre, wheat fibre, rice fibre, corn fibre, lentil fibre, chickpea fibre, mung bean fibre, faba bean fibre, pea fibre, quinoa fibre, pigeon peas fibre, sorghum fibre, buckwheat fibre, potato fibre, sweet potato fibre, lupine fibre, apple fibre any mixture thereof.

The starch-containing grains may be selected so that steeped grains (ii.a) are used in combination with germinated grains (ii.b) and/or malted grains (ii.c) and/or sprouted grains (ii.d) only, i.e. the option ii.a) may be excluded such that it is not selected alone in the method.

The extrusion step is preferably performed with an extrusion die having a length of above 300 mm, preferably above 1000 mm.

Preferably, some of the non-emulsified starch may be soluble starch preferably the starch not bound to the proteinaceous matrix is determined as soluble starch; preferably the compressibility is controlled by changing the extrusion parameters such that the proportion of the amount of soluble starch to the total amount of starch is between 3 weight-% and 10 weight-% and/or the soluble starch content is between 0.03 weight-% and 1.1 weight-%, in the meat replacement product after extrusion. This may help to obtain an improved mouthfeel which is sustained for a prolonged period.

A meat-replacement food product is or comprises an extrudate manufactured with the method according to the first aspect of the invention.

The extrudate preferably comprises starch, of which starch at least 5.1%, preferably at least 5.2%, is soluble starch. This may help to obtain an improved mouthfeel which is sustained for a prolonged period.

The extrudate may comprise disruptions in the matrix structure, such that some of the disruptions are in form of cavities that have walls that are at least partly coated with gelatinized starch clusters formed with washable starch not emulsified with the matrix structure. This may help to obtain an improved mouthfeel which is sustained for a prolonged period.

The starch clusters may contain washable starch that is washable in water having a temperature of 50° C. Washable starch may help to obtain an improved mouthfeel which is sustained for a prolonged period.

Preferably, the matrix structure has disruptions, and some of the disruptions in the matrix structure are preferably in form of cavities that have walls that are at least partly coated with gelatinized starch clusters formed with starch, preferably with soluble starch. Such cavities may help to obtain an improved mouthfeel which is sustained for a prolonged period.

The meat replacement product is preferably in the form of chunks, chops, nuggets, fillets, steaks, or in doner meat-like slices, or in the form of a doner kebab-like layer-wise stratification layers in yoghurt or vegetarian yoghurt and spices.

LIST OF DRAWINGS

In the following, the meat replacement product and the method for manufacturing a meat replacement product will be described in more detail with reference to the appended drawings, of which:

FIG. 4 shows particle weight distribution of extruded material as affected by the ingredient composition and extrusion heating temperature profile, for Experiments 1 to 6;

FIG. 5 shows the results of compression testing on dry (un-soaked) steel cut oat vs. soaked steel cut oat (soaking in hot water);

FIG. 10 shows pea protein gelation as affected by heating temperature;

FIG. 11 illustrates the cutting force and compression force analysis methods;

Figure 12A:
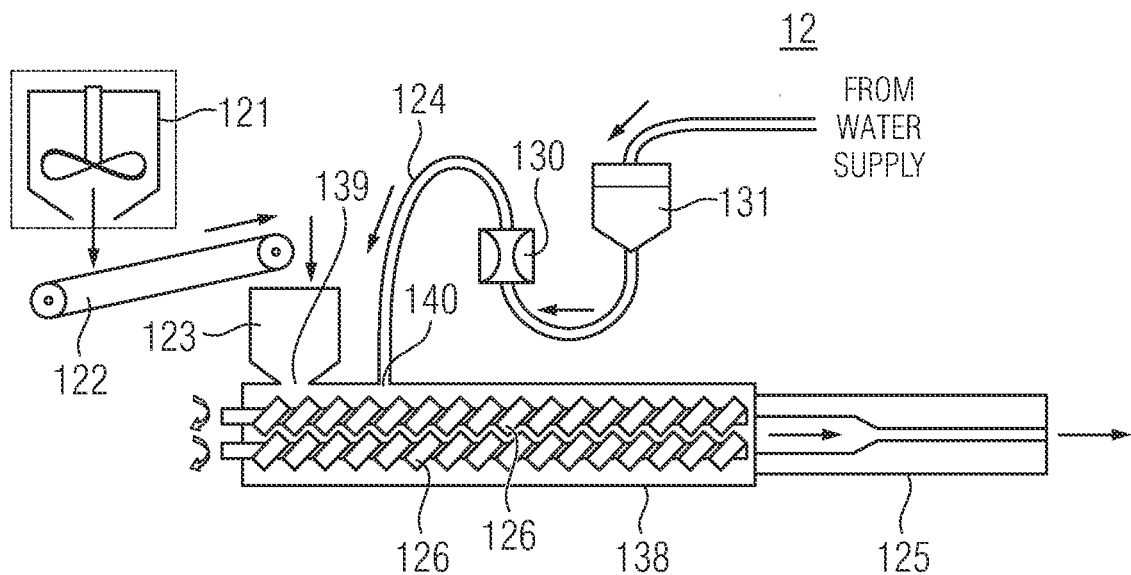
Figure 13:
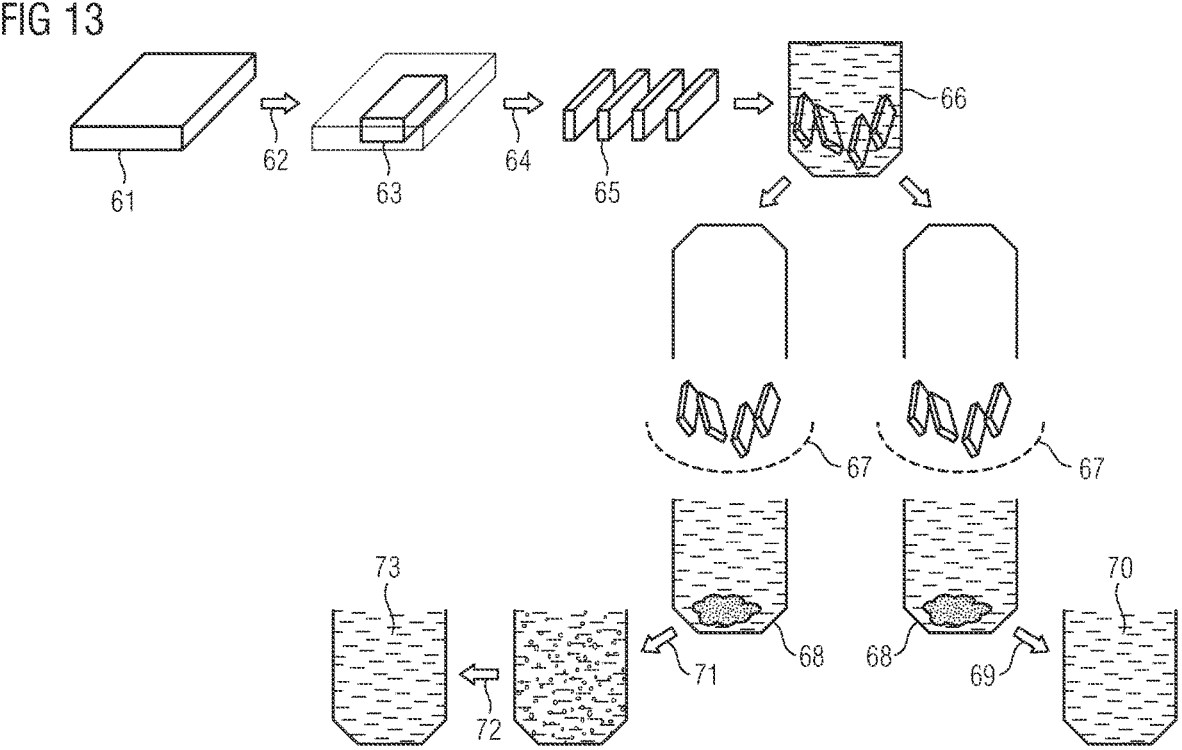
Figure 14A:
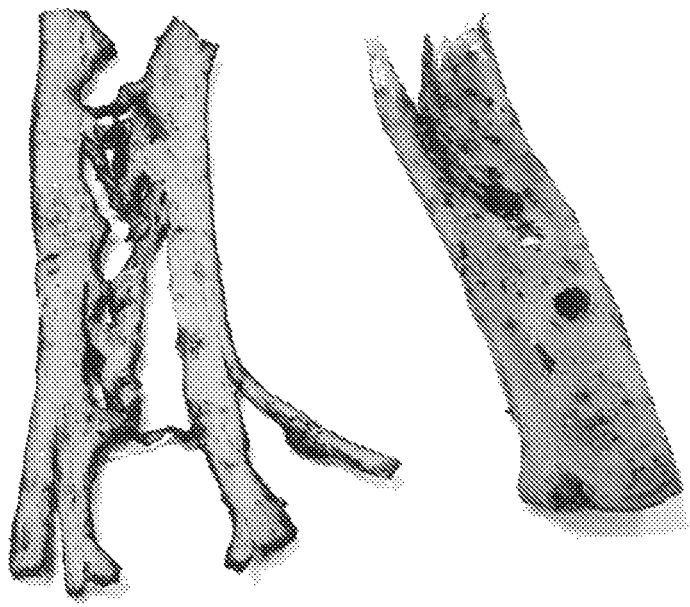
Figure 14B:
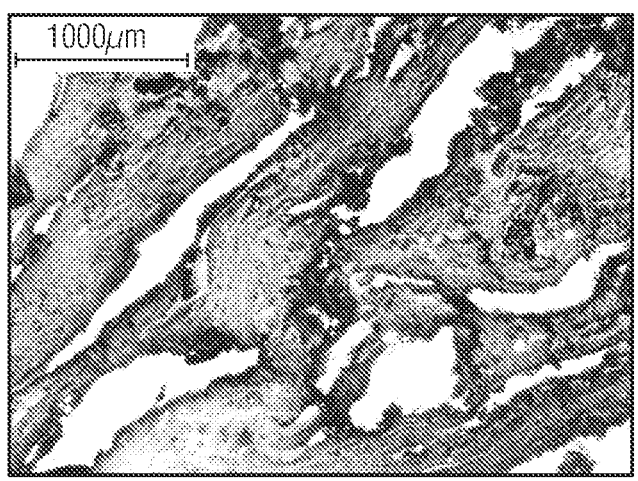
Figure 14C:
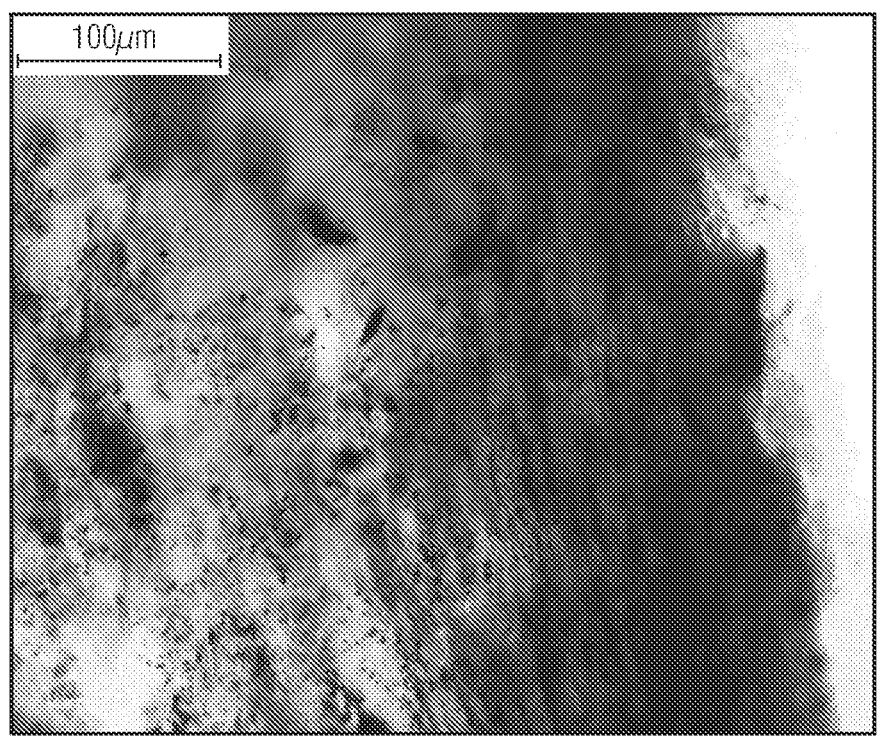
Figure 14D:
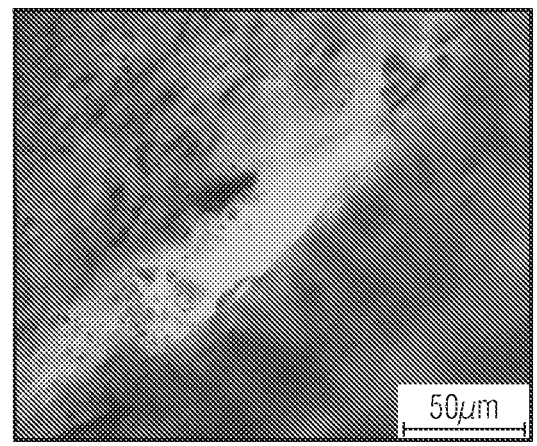
Figure 14E:
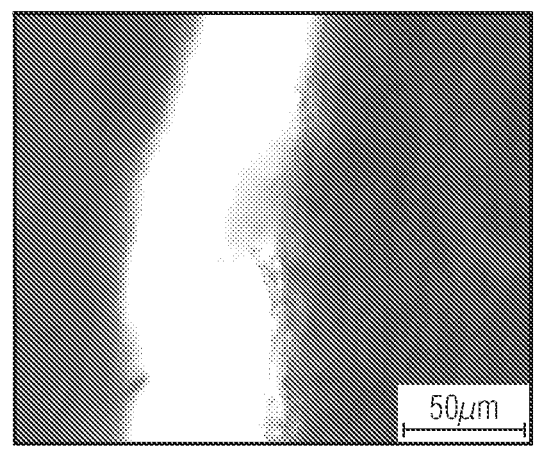
Figure 15:
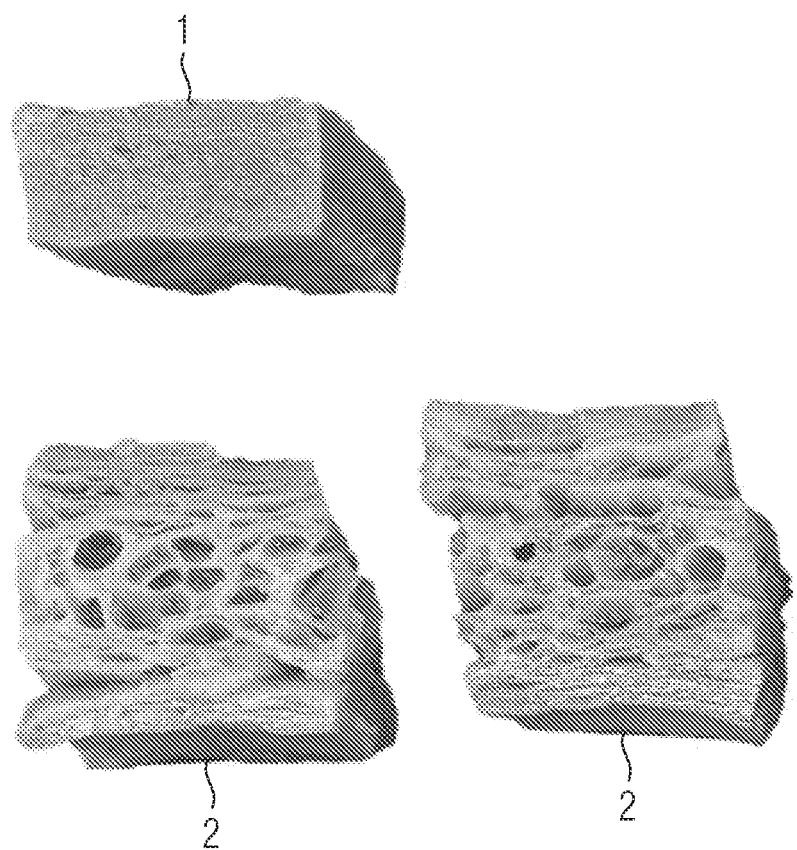

FIGS. 12A and B illustrate the schematic arrangement of the extrusion processes;

FIG. 13 illustrates the soluble starch and washable starch quantification analysis method;

FIG. 14A shows the starch coating on the inner surfaces of the cavity of the extruded product;

FIG. 14B shows inner surfaces of the cavity of the extruded product as observed by iodine staining;

FIG. 14C shows inner surfaces of the cavity of the extruded product as observed by iodine staining;

FIG. 14D and FIG. 14E show inner surfaces of the cavity of the extruded product as observed by iodine staining; and FIG. 15 shows a photograph of Sample #2 before (the photograph on top) and after (the lower two photographs) expansion.

Same reference numerals refer to same components in all FIG.

DETAILED DESCRIPTION

Previous Work—So Far Unpublished—Detailed Description

I: Current Situation and Objectives

The mouthfeel of cooked chicken thigh meat is different from cooked chicken breast fillet meat. The differences in the mouthfeel concern especially tenderness. Cooked chicken breast fillet meat generally requires a relatively high compression force at 40% compression rate, which indicates that, generally, cooked chicken breast fillet meat has a relatively low compressibility.

As described in the introductory part, the inventors have been working on a meat replacement product manufactured with high moisture protein texturization extrusion. FIG. 12A illustrates an extruder 12 configured to carry out the traditional high moisture protein texturization extrusion process. In the extruder 12, ingredients in powder format are mixed in a mixer 121 connected to a supply line 122 leading to an entry funnel 123. The extruder 12 has a liquid feed line 124 connected (preferably via a valve 130 and a collection tank 131, to enable a constant water volume flow) to a normal tap water supply (tap water generally has a temperature that is not higher than room temperature or 30° C. for example). The extruder 12 has a long cooling die 125. The extrusion is carried out with two extruder screws 126, hence the name "twin screw extruder".

The research focus has been aimed to improving the mouth feel and to finding a manner in which a meat replacement product manufactured with high moisture protein texturization extrusion can be produced such that the meat replacement product has a suitably high compressibility and chewiness so that its mouthfeel is as close to cooked chicken thigh meat as possible. Furthermore, to optimize the mouthfeel, the meat replacement product should have a long continuous fibrous protein matrix structure.

On the market, there are meat replacement products manufactured with high moisture protein texturization extrusion that are sold minced or torn in pieces and that to a certain point have a mouthfeel comparable to cooked chicken breast fillet meat when the meat replacement product has cooled after extrusion. Table I shows certain data of selected existing meat replacement products, in comparison to tofu, chicken breast meat and chicken thigh meat.

TABLE I

Physical properties of selected meat replacement products on the market

| Material | Cutting force (g) | Compression force (g) | Texture observation note |
| --- | --- | --- | --- |
| Soy Tofu (commercial product) | 129 | 6 636 | Soft, not chewy, very easy to cut. |
| Chicken breast fillet meat (RAW) | 1582 | 11 831 | Overall flexible and compressible. Highly resistant against cutting or biting. |
| Chicken breast fillet meat (COOKED) | 974 | 29 978 | Stiff, hard to compress Easier to cut or bite |
| Chicken thigh meat (RAW) | 3920 | 8 672 | Overall flexible and compressible. Highly resistant against cutting or biting. |
| Chicken thigh meat (COOKED) | 1066 | 9 947 | Overall flexible and compressible. Chewy. |
| Oumph!® the chunk | 976 | 25 827 | Stiff and rubbery |

[Oumph!® is a registered trademark of Food for Progress Scandinavia Ab, Sweden, at least in the European Union, United States of America, New Zealand, Switzerland, Australia, Island and Norway. The product "the chunk" has ingredients of water, soy protein (23%) and salt.]

None of those products the inventors have been able to test resembles cooked chicken thigh meat, which is more tender, more compressible and has a more flexible structure than cooked chicken breast fillet meat.

The cooked chicken thigh meat has a chewy mouthfeel comparable with chicken breast fillet meat, thanks to its long continuous fibrous protein matrix structure.

In the tests carried out by the inventors with high moisture protein texturization extrusion, we have found out that the mouthfeel of a freshly extruded meat replacement product manufactured with high moisture protein texturization extrusion is generally very appealing.

However, after a relatively short time (typically in the range of few minutes, typically 5 to 10 minutes), the mouthfeel becomes inacceptable when the meat replacement product cools. The inacceptable mouthfeel results from the meat replacement product losing its tenderness, becoming less compressible and the structure of the meat replacement product becoming less flexible.

Currently, most meat replacement products manufactured with high moisture protein texturization extrusion are sold deep frozen. After being thaw, those products will have a mouthfeel comparable with cooked chicken breast fillet meat which is far from being similar to cooked chicken thigh meat.

To improve the mouthfeel of meat replacement products manufactured with low moisture extrusion protein texturization, it is known to add particles into the extrusion such as in the of have been including starch; flours; soluble and insoluble polymer fibres such as pea fibre, cellulose, agar agar, xanthan (such as in US patent application publication 2016/0205985 A1); insoluble salt such as gypsum (such as in U.S. Pat. No. 5,922,392); and fat to disrupt the protein fibres in order to tenderize the extruded products for producing meat replacement products (such as in US patent application publication 2016/0205985 A1).

However, these compounds are mostly small in size (below 100 µm in each dimension) before being extruded, or will break into small parts (below 100 µm in each dimension) during the extrusion. In practice, all of them will be homogenized by the extruder screws and emulsified with the protein materials covering them.

Different types of emulsions including emulsions of polysaccharides in protein in protein extrusion has been studied and described in detailed by Tolstoguzov [Ref 1]. Tolstoguzov found out that extruded emulsion systems in protein texturization extrusion condition are different from typical water-in-water emulsions or oil-in-water emulsions existing in temperatures below 140° C. Emulsions of polysaccharides-in-protein can be regarded as emulsions of a polysaccharide melt in a protein melt. During the manufacturing method of a meat replacement product, i.e. in the high moisture protein texturization extrusion process, the protein is the major component. Proteins normally make out between 50 and 100% by weight of the extrusion raw material on a dry basis. Normally, the plant proteins that are suitable for such extrusion process can melt at a heating temperature between 140° C. and 200° C. in an extruder. So, the protein can form a continuous phase.

Therefore, the particles as disclosed in US 2016/0205985 A1 and 5,922,392 will be dispersed within the protein and form dispersed phase. The dispersed particles are stably captured or embedded within the continuous phase, evenly distributed throughout the continuous phase, and have small particle size.

The spinneretless spinning effect in the extrusion results in shaping an anisotropic (fibrous or lamellar) structure of heterophase liquid systems in flow.

At the last phase of the extrusion process, the shape of the emulsion, the liquid filaments and the anisotropic structure are fixed by rapid gelation of the protein phase with a gelation time being shorter than the lifetime of the liquid filaments. After that, the dispersed particles remain being evenly dispersed, firmly embedded, and can hardly be separated out from the protein matrix by mechanical force (e.g. centrifugation, gravity) or by extraction (e.g. water washing, water extracting) if the protein matrix structure or the protein-layer covering the dispersed particles are not broken apart.

The known methods to include particles in the extrusion when producing the meat replacement products with protein texturization extrusion are known to tenderize the extruded products to a certain extent, especially when the extruded products are freshly produced and before being chilled and stored overnight. The particles can disrupt the protein fibres by being in the middle of the protein fibres or being between neighbouring protein fibres.

The addition of such particles also dilutes the protein concentration (proportion) in the ingredient for extrusion, which forms the protein fibre matrix and contributes to the strength of the extruded product. In this way, the addition of particles can soften the extruded products especially when the products are fresh and warm before being stored overnight in chilled temperature (e.g. between 0° C. and 6° C.). In low moisture protein texturization extrusion for producing meat replacement product (e.g. moisture content of the material during extrusion is between 15% and 40%), the extruded products mostly have abundant expansion and inclusion of massive amount of air bubbles between the protein fibres. The expansion and air bubbles are attributable to the abundant water evaporation happening when the extruded material just exit the extruder die at a high temperature (such as, above 100° C., for example). In such a situation, the disrupted protein fibres are further separated by the air bubbles, and are fixed in positions that are departed (far) from each other. Consequently, the disruption effect from those particles can be to certain extent appealing in low moisture protein texturization extrusion for meat replacement product production.

However, in high moisture protein texturization extrusion used in the meat replacement product production (moisture content of the material during extrusion is between 40% and 80%, for example), the extruded materials are expanded much less, having much less air bubbles to be evenly distributed between the protein fibres to disrupt their cross-linking between neighbouring fibres.

Akdogan [Ref 2] found out that the decreased level of expansion in high moisture protein texturization extrusion was caused by the increased concentration of water during extrusion. More specifically, the extrusion with higher moisture content had a different distribution of shear (normally there is less shear force present in high moisture protein texturization extrusion), mixing, mechanical heat (normally there is less mechanical heat dissipation in high moisture protein texturization extrusion) and convective heat. The extrusion with high moisture content had much less viscous dissipation of energy in the extruder barrel due to much lowered melt viscosity and lowered pressure build-up in the extruder barrel. The pressure along the die is much lowered and, hence, is partly responsible for the minimal to non-existent expansion at the die. The extruded materials were cooled with long cooling die during high moisture protein texturization extrusion and, hence, water evaporation is much less. It was also known in the background art that when the starch content of the extruded material is lower, and when the level of starch gelatinization is lower, the expansion level of the extruded material exiting the extruder die will be lower. The high moisture content related low viscosity of the extruded material also results in certain inability for it to hold (keep) the expansion stable from being collapsed into one dense piece.

The difference in moisture content during extrusion also results in the change of main contributing protein-protein forces that stabilizes the protein matrix. Lin et al. [Ref 3] found out that under high moisture extrusion (such as when moisture content during extrusion is between 40%-80%), a significant portion of the proteins was connected and stabilized by the hydrogen bonds, while the disulphide bonds and hydrophobic interactions were not the major force that stabilizes the proteins. On the contrary, under low moisture extrusion (such as when moisture content during extrusion is between 30%-40%), the major important protein matrix stabilizing forces were disulphide bonds and hydrophobic bonds. After extrusion, during the cooling period, the hydrogen bonds in the protein matrix can contribute significantly to further increase the gel strength (firmness) of the extruded product. It was well known and was disclosed by Sun and Arntfield [Ref 4] that the low temperature (such as between 0° C. and 6° C., for example) for storage and the cooling period after protein gel formation can favour the extensive and increasing formation of hydrogen bonds. In addition, it is also well known that starch gel strength is also mainly and substantially increased during cooling period after the starch is heated and gelatinized in water, because the hydrogen bonds between starch molecules occur extensively during cooling. Starch retrogradation can happen after starch gelation. The longer storage time period will result in further formation of hydrogen bonds and, hence, result in further tightening (firming) of the structure, as well as lower water holding capacity. Therefore, starch gelation and retrogradation are another factor that contributes to the problems of texture firming and losing of the appealing mouthfeel of the meat replacement products produced by high moisture protein texturization extrusion in methods known in the background art.

In the context of baking bread, the adverse effects of retrogradation on the texture of bread crumb are well-known: retrogradation significantly contributes to bread crumb staling and firmness increase during the storage time.

Hydrogen bond is a short-range chemical bonding, meaning that the hydrogen bonding related crosslinking mainly occurs between neighbouring compounds (e.g. protein-protein, protein-starch, starch-starch) that are closely or directly in touch with each other. Amylose type starch has a high capability of forming starch-starch hydrogen bonding, because it has many hydroxyl groups on the molecular structure and linear polymer chains. Starch before gelatinization cannot form gel in water, as the starch is embedded in starch granule structure and is thus insoluble. Starch gelation can happen more excessively during high moisture extrusion than in low moisture extrusion. During high moisture protein texturization extrusion, the starches are sufficiently heated, leached into water by heat and shearing forces, and getting the leached amylose molecules linearly aligned and closely in touch with each other.

Because the extruded products from high moisture protein texturization extrusion have a higher compactness (less expansion, higher density) and more excessive formation of hydrogen bond type protein-protein crosslinking forces than those from low moisture extrusion, the particle (such as starch powder, insoluble salt, fibre, fat, etc., for example) addition can hardly disrupt the protein-protein crosslinking or interaction forces that extensively occur during the cooling phase and after extrusion as they do in the low moisture extrusion. Therefore, those extruded products with and without particle addition still suffer from problems of structure-hardening (firming) and loss of acceptable mouthfeel (e.g. compressibility) during the cooling and storing time. More specifically, the particles are easily homogenized, covered and emulsified by the protein matrix soon during the extrusion or immediately after they are extruded together with the protein material. Then the particles cannot provide large enough disruption force, or barrier effect between protein fibres, but can only possibly provide a limited disruptive area just surrounding each individual particle spot, without extension. More severely, when starch is added in a form of starch powder (with or without including modified starch or pregelatinized starch), or grain flour powder, they are also soon homogenized, covered and emulsified by the protein matrix after it is extruded together with protein material. Then the emulsified starch is heated and gelatinized. The starch remains as small particles throughout the whole extrusion process and in the end product. So the starch can hardly provide large disruption force, or barrier effect between protein fibres, but can only possibly provide limited disruptive area as just surrounding each individual particle spot, without extension. After the extrusion, the protein matrix surrounding the starch particles can continue getting firming, forming protein-protein interaction forces such as more hydrogen bonds. Moreover, the starch after being sheared, gelatinized, being distributed and aligned linearly within (between) the linearly aligned protein fibres, become highly prone to undergo starch gelation, retrogradation, hardening, drying out, and forming possible starch-protein interaction with hydrogen bonds. In this way, the extruded products undergo very significant problems of structure-hardening (firming) and loss of acceptable mouthfeel (e.g. compressibility) during the cooling and storing time.

Figure 12B:
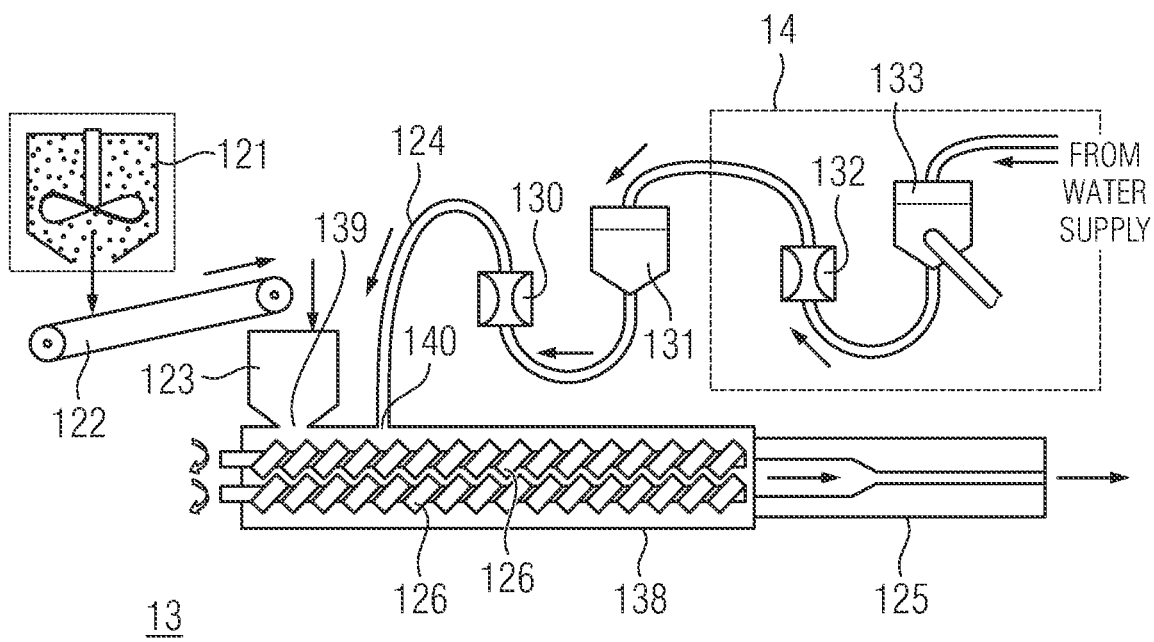

II: The Processor (Extruder System) to Carry Out the Tests Described in the Following Examples FIG. 12B illustrates an extruder 13 configured to carry out the high moisture protein texturization extrusion process used to carry out the methods described in according to the invention. The extruder 13 enables the technical features that are required in the new process.

In the new process, mechanically processed starch containing grains are mixed with starch containing grains in powder format, preferably flour, at least one (preferably vegetable or diary) protein isolate/at least one (preferably vegetable or diary) concentrate/a mixture of at least one such isolate and at least one such concentrate, possibly oil and possibly spices and any further ingredients, in a mixer 121 and fed through the feed line 122 into the extruder 13, such as through entry funnel 123, for example. The extruder 13 has a liquid feed line 124 connected to a water heating element 14, which is configured to provide heated water (such that the heated water is substantially above the temperature of the tap water, such as, having a temperature of at least 50° C.), and preferably configured to provide water with a stable temperature (for this purpose, the heating element 14 preferably has a pump 132 and a heater tank 133, and the heater tank 133 preferably has water heating element and temperature detector). The extruder 13 further comprises a long cooling die 125. The pump 132 can be controlled so that water fed into the tank 131 always has targeted temperature, the pump 130 can feed water into the extruder 13 targeted flow rate (e.g. how many kg water per hour). If tap water is straight connect to tank 131, and try to heat the water in tank 131, then the temperature of the water will be harder to control precisely.

In the following Examples, the experiments carried out by the inventors are described in more detail.

III: First Experiments (Examples 1 and 2)

In the following, and throughout the description of the ingredients of the Samples also in the other experiments and tests, the percentages of the ingredients are given in weight-% on dry basis.

With Examples 1 and 2 we demonstrate exemplary parameters (ingredients, shock heating) for the manufacturing process and their effects on the quality of the resulting meat replacement product (such as in terms of certain physical properties, such as compressibility, hardening, expansion, cavity structure).

The mechanically processed starch containing grains comprise or consist of one or more of the following: flakes (such as compressed, rolled, or flaked), steel cut grains, dehulled pearled grains, crushed grains, dehulled but not pearled grains.

The mechanically processed starch containing grains comprise or consist of one or more of the following: oat, barley, rye, wheat, rice, corn, lentil, chickpea, mung bean, faba bean, pea, quinoa, pigeon peas, sorghum, buckwheat.

However, the following ingredients are excluded from the mechanically processed starch containing grains: dehulled but not pearled oat grains, dehulled but not pearled rye grains, dehulled but not pearled barley grains, and dehulled but not pearled corn grains.

Though another extruder configuration may be used, the extruder 13 used to carry out the experiments was a twin screw co-rotating extruder having screws 126 with diameter between 30 mm and 50 mm. The extruder 13 has a screw chamber 138 surrounding the screws 126. The screw chamber 138 in the used configuration has 6 zones (though another number of zones is possible), which can be numbered as zone 1 to zone 6 starting from the side where the solid ingredients are fed into the extruder and got extrusion started. Therefore, there is a portal hole 139 (such as, at zone 1) for feeding solid ingredients. The zone 2, zone 3, zone 4, zone 5 and zone 6 are all equipped with heating, cooling and temperature detection elements that preferably can individually control each zone's temperature to be, for example, between 10° C. and 220° C. Furthermore, there is a portal hole 140 (such as, at zone 2) for feeding liquid into the extruder 13 to be extruded together with the solid ingredient.

At a typical screw rotation speed (e.g. between 150 rpm and 300 rpm), the material can pass through the screw chamber 138 with approximately between 45 s and 75 s. The inventors had a set up to allow the liquid feed line 124 and the heating element 14 to feed water with different temperature of water between 5° C. and 99° C., for example, in some cases, feeding heated water to the tank 131 and pump it to extruder 13 by the pump 130 of the liquid feeder. A test was carried out to stop the extruder and to take out the screws after continuously running extrusion of dry oat flakes without water. And it was observed that with 5-15 s screwing time (e.g. calculated by conveying distance) and approximately at zone 2, the oat flakes were mostly (more than 90%) and substantially powdered into flour-like particles that were clearly smaller than their original size (e.g. they had a size smaller than 200 μm).

Differently, the conventional liquid feed line 124 is connected to normal tap water, and feed tap water with temperature between 5° C. and 25° C. to the extruder (illustrated a in FIG. 12A). The speed (e.g. kg/h) of feeding the solid ingredient and liquid can be controlled individually.

After the last zone (such as zone 6), there is a long cooling die 125 connected with the extruder 13, which also has heating, cooling and temperature detection elements. The long cooling die 125 is longer than 300 mm, preferably its length is between 300 mm and 5000 mm, most preferably between 1000 mm and 3000 mm. There is a pressure detection sensor and a temperature detection sensor between the last zone (such as, zone 6) and the long cooling die 125. Furthermore, there can be a cutter connected after the long cooling die 125.

People skilled in the art have sufficient knowledge from background art to know about how to adjust or select screw 126 diameter, screw 126 speed, cooling die 125 length and shape, the type of cutter and cutting speed according to different kinds of tailored need in the production stability, production speed, product size and shape etc.

Example 1 (Samples #1, #2, #3, #4)—Effect of the Ingredients on the Texture Properties of the Extruded Product The inventors prepared four samples (#1, #2, #3, #4) that were processed with high moisture protein texturization extrusion with the extruder 13 shown in FIG. 12B.

Sample #1 contained 90 weight-% pea protein, 5 weight-% oat flour, 4 weight-% fibre, to which further ingredients (such as, salt, spice, yeast extract, oil, oat malt extract, grains that do not contain starch—e.g. sunflower seeds-, for example) were added.

Sample #2 contained 90 weight-% pea protein, 5 weight-% steel cut oat, 4 weight-% fibre, to which further ingredients (such as, salt, spice, yeast extract, oil, oat malt extract, grains that do not contain starch—e.g. sunflower seeds-, for example) were added.

Sample #3 contained 62 weight-% pea protein, 20 weight-% oat flour, weight-% fibre, to which further ingredients (such as, salt, spice, yeast extract, oil, oat malt extract, grains that do not contain starch—e.g. sunflower seeds-, for example) were added.

Sample #4 contained 62 weight-% pea protein, 1 weight-% steel cut oat, 19 weight-% oat flour, 10 weight-% fibre, to which further ingredients (such as, salt, spice, yeast extract, oil, oat malt extract, grains that do not contain starch—e.g. sunflower seeds-, for example) were added.

The Samples #1, #2, #3, #4 were after producing cooled down and stored overnight. Their mechanical properties were measured next day to study the texture. The measurement results are shown in Table II.

The results in Table II show that Samples #1 and #3 produced from ingredient containing starch containing flour (oat flour) have a stiff and rubbery texture, and had high resistance force against cylinder compression.

The results in Table II further show that Sample #2 and Sample #4, for which the starch containing flour (oat flour) was replaced or partially replaced by starch containing grain (steel cut oat), are much more flexible and compressible than Samples #1 and #3. Sample #2 had a much higher cooking expansion rate (265%) of thickness than Sample #1 (143%), after being cooked in water in high pressure cooker (such as, in autoclave) at 110° C. The differences were only induced by the change of the starch-containing ingredient (from flour to steel-cut grain). The other conditions like extrusion parameters are kept as the same; and the ingredients had the same chemical (nutrient) composition.

TABLE II

Texture of Samples #1, #2, #3, #4

| Sample | Ingredients | | | | | Cutting force (g) | Compression force (g) | Texture Observation | Expansion |
| --- | --- | --- | --- | --- | --- | --- | --- | --- | --- |
| | Protein | Grain | Flour | Fibre | Other | | | | |
| 1 | 90 | 0 | 5 | 4 | 1 | 712 | 32 468 | Very stiff, leathery and rubbery | 143% |
| 2 | 90 | 5 | 0 | 4 | 1 | 522 | 16 926 | Flexible, compressible, chewy | 265% |
| 3 | 62 | 0 | 20 | 10 | 8 | 1 029 | 27 673 | Very stiff and rubbery | N.A. |
| 4 | 62 | 1 | 19 | 10 | 8 | 525 | 12 781 | Very flexible, compressible, chewy | N.A. |

As protein in Example 1, we used pea protein isolate. It can be at least partly replaced with pea protein concentrate, or with any other protein isolate or protein concentrate (such as, of faba bean, soy bean, chickpea, wheat gluten, oat), dairy (milk or whey) protein, or a mixture of at least one of these. The results are comparable.

Grain used in Example 1 was steel cut oat. It can be replaced with mechanically processed starch containing grains as explained above (please take note of the excluded sorts as explained above), in particular with steel cut barley, rice kernel, broken rice, pearled barley, pearled rye, pearled wheat, pearled oat, broken seeds of pea (such as, with particle size of 2 mm, for example), broken seeds of faba bean, broken seeds of chickpea, lentil seed, etc and mixture thereof. The results are comparable.

The mechanically processed starch containing grains were soaked in hot water before extrusion in this example. The soaking was carried out that the grains were 1:2 gently mixed with hot water (e.g. 90° C.) and then kept at warm temperature (e.g. 75° C.) for 2 hours. After soaking, the grains absorbed all the water and become softer and larger.

Flour in Example 1 was oat flour. It can be replaced by barley flour, wheat flour, rice flour, pea flour, chickpea flour, faba bean flour, lentil flour etc and mixture thereof. The results are comparable.

Fibre in Example 1 was pea fibre. It can be replaced by oat fibre, oat bran, potato fibre, faba bean fibre etc and mixture thereof. The results are comparable.

Other ingredients in Example 1 comprised all of the followings salt, spice, yeast extract, oil, oat malt extract, grains that do not containing starch (e.g. sunflower seeds) etc. Some of these can be omitted or replaced with desired further ingredients.

As the cutting force in Example 1, resistance force against cutting with a sharp knife blade was measured. The measurements were carried out with the texture analyser as described above.

As compression force in Example 1, resistance force against compression with a cylinder was measured. The measurements were carried out with the texture analyser as described above.

As texture observation in Example 1 in Table II, the texture property observation note was analysed by expert panelist that performed a sensorial evaluation.

Extrusion parameters used in Example 1:
(1) Liquid feed: Hot water (e.g. with elevated temperature of 65° C.);
(2) moisture content of the slurry (materials being extruded) during extrusion is approximately 50%. The moisture content of the slurry can be adjusted between 40% and 80% according to desired properties of the extruded product (e.g. moisture content, colour etc.) and to changes of the ingredients (e.g. different proteins may have different melting requirement, different starches may have different gelatinization requirement);
(3) extruder heating profile: shock heating profile with temperature 80-125-160-145-130 (° C.) at zone 2-3-4-5-6. The cooling die temperature was 90° C. The temperature can be adjusted within the range described in the attached method claims, according to the changes of the ingredients (e.g. different proteins may have different melting temperature, different starches may have different gelatinization temperature);
(4) production rate: approximately 18 kg product was made per hour. Pressure at the end of the screws: between 1.0 mPa and 3.0 mPa.
(5) The extruded products after extrusion were immediately soaked in water (e.g. 20° C.) for 2 hours to cool down and to prevent drying. Then they were taken out from water. Then after 24 h storage in cold room (e.g. 5° C.), the samples were analysed for cutting force, compression force, texture observation, and cooking expansion rate of thickness.

N.A. stands for Not Analysed.

Expansion in Example 1 stands for cooking expansion rate of thickness analysed by a cooking test method, which will be described below. The "Expansion" or "Expansion rate" always refer to Cooking Expansion Rate of thickness throughout this application, unless when there are other specifications such as "Extrusion Expansion Rate".

In further experiments, the ingredients of Sample #1 (90 weight-% pea protein+5 weight-% oat flour+5 weight-% fibre, to which further ingredients were added) were processed with different extrusion parameters such as with a different liquid feed water temperature (15° C.-90° C.), extruder heating profile ("shockheating" such as 80-125-160-145-130° C. (at zone 2-3-4-5-6), "extensive heating" such as 80-125-160-160-160° C., "slow heating" such as 40-75-100-140-165° C.), all produced unacceptable products (similar as Sample #1) that have a stiff and rubber structure and mouthfeel, cutting force between 500 g and 1100 g, compression force between 18 200 g and 44 000 g, and cooking expansion rate between 125% and 149%. The results from these experiments were not satisfying. The mouthfeel was not at all comparable with cooked chicken thigh meat.

Unacceptable results similar to Sample #1 were also produced by replacing the oat flour to other starch containing flours such as oat starch, potato starch, rice flour, chickpea flour, wheat flour, pea flour and so on. The inventors have carried out extensive testing.

Unacceptable products similar to Sample #1 were also produced by replacing the oat flour to grains that do not contain starch, such as sunflower seeds, peanut pieces, almond seed pieces, coconut particles, chia seed.

Unacceptable products similar to Sample #1 were also produced by replacing the oat flour to starch containing grains that have an intact shell, or an intact, thick and strong seed coat (also known as pericarp layer, bran layer), or an intact hull, such as wholegrain oat seed, wholegrain barley seed, wholegrain rye seed.

However, the addition of those particles (e.g. sunflower seeds, chia seeds, wholegrain oat seeds) between 0% and 20% (preferably between 0% and 10%) into the ingredients to partially replace protein of acceptable samples such as Sample #2, did NOT result in adverse effects to the quality of the extruded products.

Adding additives such as Calcium chloride, Calcium carbonate, Gypsum powder (calcium sulphate dihydrate), baking powder, *psyllium*, alginate, ascorbic acid, xanthan, agar-agar and so on to the ingredients of Sample #1 did not result in the desirable properties that were observed with the acceptable samples such as Sample #2.

However, the addition of some of those additives (such as baking powder, Gypsum powder, ascorbic acid) between 0% and 5% (preferably between 0% and 2%) into the other ingredients of the acceptable samples, such as Sample #2, was still possible since it did not to cause a severe adverse effect to the quality (compression characteristics and mouthfeel) of the extruded product.

Example 2 (Samples #5, #6, #7, #8, #9)—Effect of the Extrusion Ingredient and Extrusion Heating Profile on the Texture and Expansion Properties of the Extruded Product The inventors prepared five samples (#5, #6, #7, #8, #9) that were processed with high moisture protein texturization extrusion with the extruder 13 shown in FIG. 12B.

Sample #5 contained 70 weight-% pea protein, 30 weight-% oat flour.
Sample #6 contained as Sample #5, 70 weight-% pea protein, 30 weight-% oat flour.
Sample #7 contained 70 weight-% pea protein, 10 weight-% oat flakes, weight-% oat flour.
Sample #8 contained, as Sample #7, 70 weight-% pea protein, 10 weight-% oat flakes, 20 weight-% oat flour.
Sample #9 contained 70 weight-% pea protein, 20 weight-% oat flakes, weight-% oat flour.

The Samples #5, #6, #7, #8, #9 were after producing cooled down and stored overnight. Their mechanical properties were measured next day to study the texture. The measurement results are shown in Table III.

TABLE III

Texture of Samples #5, #6, #7, #8, #9

| Sample | Ingredient | | | Liquid feed water temperature (° C.) | Shock heating | Temperature at extruder zone (° C.) | | | | Expansion | Visible air cavity | Texture Observation |
|---|---|---|---|---|---|---|---|---|---|---|---|---|
| | Protein | Grain | Flour | | | 2 | 3 | 4 | 5 | 6 | | | |
| 5 | 70 | 0 | 30 | 25 | No | 40 | 125 | 160 | 145 | 130 | 146% | No | Stiff and rubbery |
| 6 | 70 | 0 | 30 | 65 | Yes | 80 | 125 | 160 | 145 | 130 | 129% | No | Stiff and rubbery |
| 7 | 70 | 10 | 20 | 25 | No | 40 | 125 | 160 | 145 | 130 | 164% | No | Stiff and rubbery |
| 8 | 70 | 10 | 20 | 65 | Yes | 80 | 125 | 160 | 145 | 130 | 206% | Yes | Flexible, compressible, chewy |
| 9 | 70 | 20 | 10 | 65 | Yes | 80 | 125 | 160 | 145 | 130 | 189% | Yes | Flexible, compressible, chewy |

Table III shows that extruded products Sample #8 and Sample #9 containing oat flakes being produced by extrusion with shock heating temperature profile (hot water liquid feed in use together with temperature profile 80-125-160-145-130° C. at zone 2-3-4-5-6) had a more flexible and compressible texture, which produces a very good mouthfeel and is pleasant for eating. It also had high cooking expansion rate (189%-206%) after being cooked in water, which is in agreement with its property of having a flexible and extendable structure and texture.

When the oat flakes were completely replaced by oat flours (Sample #6), which had the same chemical composition but much smaller particle size, the extruded product became stiff, rubbery and less cooking expansion rate (129%). The mouthfeel was not at all comparable with cooked chicken thigh meat. The shock heating extrusion condition did not result in large difference between products that do not contain oat flakes (between Sample #5 and Sample #6).

When the oat flakes were used at an extrusion condition that did not have shock heating setting (such as, if the liquid feed water temperature was 25° C., and zone 2 temperature was set to 40° C.), the product (Sample #7) had a stiff and rubbery texture and low expansion rate (164%). The mouthfeel was not at all comparable with cooked chicken thigh meat.

Protein in Example 2 was pea protein isolate. It can be replaced in the manner as explained in the context of Example 1 with other proteins.

As mechanically processed starch-containing grains, in Example 2, oat flakes were used. Oat flakes can be replaced in the manner as explained above and in the context of Example 1 with the other mechanically processed starch-containing grains. In particular, barley flake, steel cut oat, steel cut barley, rice kernel, broken rice, pearled barley, pearled rye, pearled wheat etc and mixture thereof can be used. The results are comparable.

The mechanically processed starch-containing grains were not soaked in hot water before extrusion in Example 2.

Flour in Example 2 was oat flour. It can be replaced by barley flour, wheat flour, rice flour, pea flour, chickpea flour, faba bean flour, quinoa, pigeon peas, sorghum, buckwheat etc or a mixture thereof. The results are comparable.

Expansion in Example 2 stands for cooking expansion rate of thickness analysed by a cooking test method, which will be described below.

Visible air cavity in Example 2 stands for visible air cavity in the extruded product analysed by visual checking method, which will be described below.

Texture observation in Example 2 stands for texture property observation note that was produced by expert panelist sensorial evaluation.

Extrusion parameters:
(1) moisture content of the slurry (materials being extruded) during extrusion is approximately 50%;
(2) The extruded products after extrusion were immediately soaked in water (20° C.) for 2 hours to cool down and to prevent drying. Then they were taken out from water. Then after 24 h storage in cold room (e.g. 5° C.), the samples were analysed for texture observation, visible air cavity, cooking expansion rate of thickness;

(3) production rate: approximately 18 kg product made per hour. The cooling die temperature was 90° C.

Figure 1:
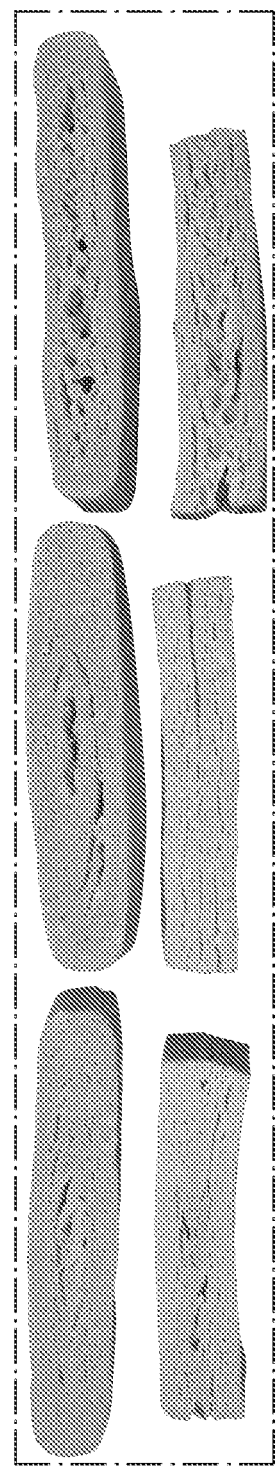
FIG. 1 is a photograph of Samples #5, #7 and #8.

Examples of an air cavity can be seen in Sample #8 of FIG. 1 and FIG. 2.

IV: Results of the First Experiments

FIG. 1 is a photograph of Samples #5, #7 and #8 (from bottom to top), taken after soaking in water at 60° C. for 24 hours: On the right, the Samples are cut in parallel with the fibre direction so that the fibre, the length and the thickness of the Sample are visible. On the left, the Samples are cut across the fibre direction so that the cross-section (the width and the thickness) of the Samples is visible. The Sample #8 had clearly more visible air cavities than Sample #7 and Sample #5 do. The air bubbles in Sample #8 were more evenly distributed in the protein fibre matrix, had more total volume and bigger average size than those in Sample #5 and Sample #7. There were white particles in FIG. 1 sample #7, which were included intact oat flake particles within the proteinaceous matrix.

The included particles did not solve the problem of the product being rubber, stiff, and hard to compress. The visible particles were not powdered by the extruder, mostly due to the fact that some very small portion (e.g. less than 5%) of particles got slipped through the narrow gap between the screws and the screw chamber. They are kept mostly intact throughout the extrusion, and not effectively mixed with the other ingredients. The degree of gelatinization of these particles was insufficient, and was much lower than the other particles that were effectively mixed by the screws (e.g. those being powdered in Sample #7). In the end of the process, they are covered by the other materials. They could not disrupt the overall formation of protein fibre structure or the increase of formation of interaction forces between the fibres. These were in agreement with the results in FIG. 1. These were confirmed by microscopic studies (not provided with picture in this application though) and the texture (compressibility) study results.

Figure 2A:
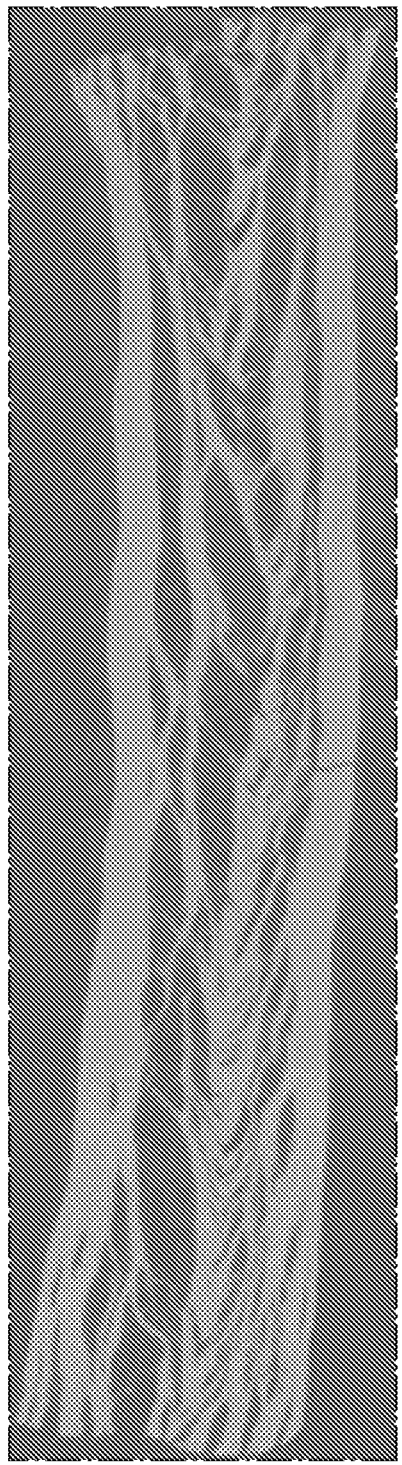
FIG. 2A is an X-ray microtomography (Micro-CT) scanning image of Sample #5 taken after soaking in water at 60° C. for 24 hours and air-drying.

FIG. 2A is an X-ray microtomography (Micro-CT) scanning image of Sample #5 taken after soaking in water at 60° C. for 24 hours and air-drying. The sample was cut in parallel with the fibre direction so that the fibre, the length and the thickness of the sample were visible.

Figure 2B:
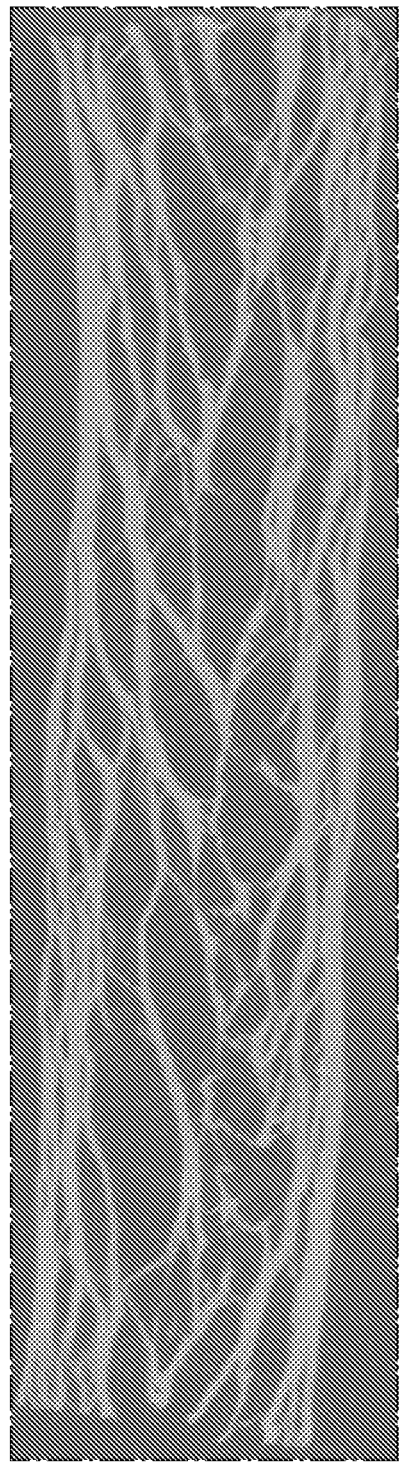
FIG. 2B is an X-ray microtomography (Micro-CT) scanning image of Sample #8 taken after soaking in water at 60° C. for 24 hours and air-drying. The sample was cut in the same way as in FIG. 2A.

FIG. 2B is an X-ray microtomography (Micro-CT) scanning image of Sample #8 taken after soaking in water at 60° C. for 24 hours and air-drying. The sample was cut in the same way as in FIG. 2A. The differences between FIG. 2A and FIG. 2B are clear, and it can be seen that the Sample #8 had more air bubbles (black cavity between the white fibres), which were widely and evenly distributed in the protein fibre matrix, had more total volume and bigger average size than the Sample #5 did. In addition, Sample #8 clearly had a long continuous fibrous structure. The fibres of Sample #8 were thinner and had more homogenous thickness than fibres of Sample #5. Most of the fibres were in parallel with each other. This shows the protein fibres were well disrupted and separated in Sample #8, while the protein fibres tend to stick to each other and form bigger bunches or lump. The thinner fibre structure of Sample #8 contributes to the favourable, chewy and compressible texture, which can be close to cooked chicken thigh meat. The aggregated and layered structure of Sample #5 makes it to have unfavourable, stiff, leathery and rubbery texture.

Figure 6A:
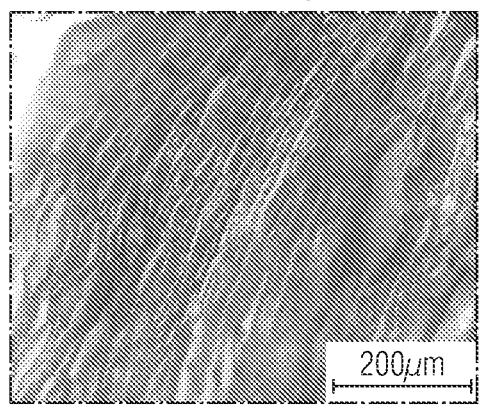
FIGS. 6A and 6B are microscopic images of a specimen taken from Sample #2 (10× magnification)

FIG. 6A is a microscopic image of a specimen taken from Sample #2. The specimen was stained by a protein dye (Thermo Scientific Pierce Coomassie Brilliant Blue R-250. The specimen was observed by an optical microscope (Zeiss Axio Lab.A1 Laboratory Microscope) with 10× magnification. The protein fibres are stained to be black colour. The protein fibres are continuous throughout the image, having length much larger than 1 mm. The protein fibres are mostly aligned to be in parallel with each other. The crosslinking is low, there are only few connections between neighbouring fibres.

Figure 6B:
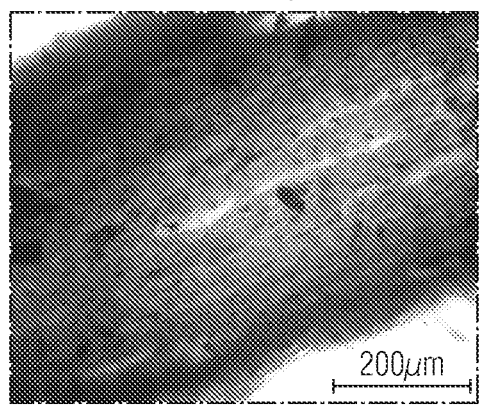

FIG. 6B is a microscopic image of a specimen taken from Sample #2. The specimen was stained by a diluted iodine solution, for example, 1:5 diluted Sigma-Aldrich Lugol's solution stabilized with Polyvinylpyrrolidon for the Gram staining. The specimen was observed by an optical microscope at 10× magnification. The dark black coloured material (mass) indicate starch-rich material, which form dark blue coloured iodine-starch complex with the iodine stain. FIG. 6B also shows protein fibre matrix in grey colour, which is lighter colour than the starch materials, more transparent than the starch materials, but NOT completely transparent. The starch-rich materials appear to be rounded or random shaped, and are not tightly embedded within protein fibre matrix, and are not evenly distributed throughout the structure. These findings indicate that the starch is in cluster format, phase separated out from protein phase and not emulsified with protein.

Figure 6C:
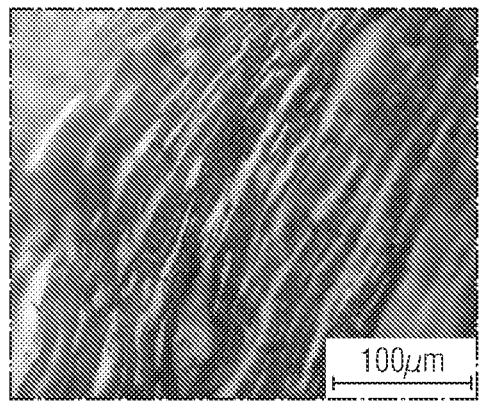
FIGS. 6C and 6D are microscopic images of a specimen taken from Sample #2 (10× magnification)

FIG. 6C is a microscopic image of a specimen taken from Sample #2. The specimen was stained by a protein dye as in FIG. 6A and observed in 20× magnification. The protein fibres are mostly aligned to be in parallel with each other. The crosslinking is low, there are only few connections between neighbouring fibres.

Figure 6D:
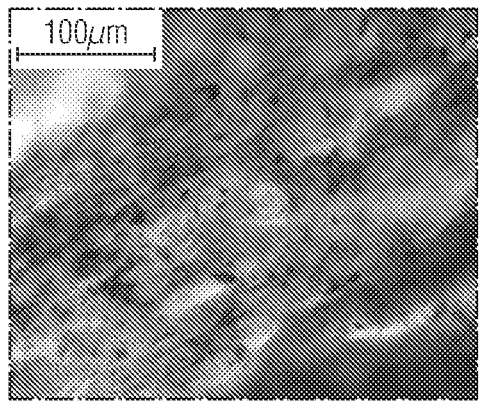

FIG. 6D is a microscopic image of a specimen taken from Sample #2. The specimen was stained by a diluted iodine solution, for example, 1:5 diluted Sigma-Aldrich Lugol's solution stabilized with Polyvinylpyrrolidon for the Gram staining, and observed in 20× magnification. The dark black coloured material (mass) indicates starch-rich material, which form dark blue coloured iodine-starch complex with the iodine stain. FIG. 6D also shows protein fibre matrix in grey colour, which is lighter colour than the starch materials, more transparent than the starch materials, but NOT completely transparent. The starch-rich materials appear to be rounded or random shaped, and are not tightly embedded within protein fibre matrix, and are not evenly distributed throughout the structure. These findings indicate that the starch is in cluster format, phase separated out from protein phase and not emulsified with protein. There are starch clusters (shown as dark spots) with size (e.g. length) larger than 30 μm.

Figure 6E:
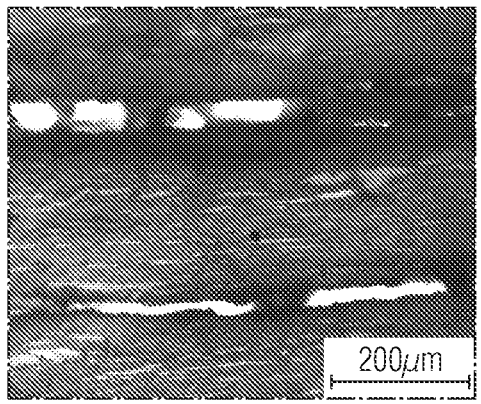
FIGS. 6E and 6F are microscopic images of a specimen taken from Sample #6 (10× magnification)

FIG. 6E is a microscopic image of a specimen taken from Sample #6. The specimen was stained by a protein dye, for example, Thermo Scientific Pierce Coomassie Brilliant Blue R-250, and observed in 10× magnification. The protein fibres are stained to be black colour. The protein fibres are continuous throughout the image, having length much larger than 1 mm. The protein fibres are mostly aligned to be in parallel with each other. The crosslinking is higher: connections between neighbouring fibres in FIG. 6E are clearly more abundant than that in FIG. 6A. The gap spaces between neighbouring fibres in FIG. 6E are clearly narrower and smaller than that in FIG. 6A. There are two rows of bright white space between the three bunches of protein fibres. They are empty gap between two bunches of the protein fibres.

Figure 6F:
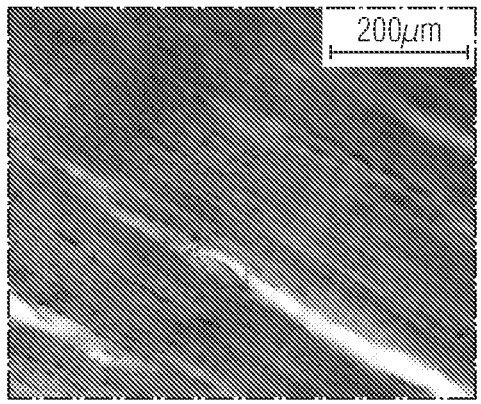

FIG. 6F is a microscopic image of a specimen taken from Sample #6. The specimen was stained by a diluted iodine solution, for example, 1:5 diluted Sigma-Aldrich Lugol's solution stabilized with Polyvinylpyrrolidon for the Gram staining and observed in 10× magnification. The dark black coloured material (mass) indicate starch-rich material, which form dark blue coloured iodine-starch complex with the iodine stain. FIG. 6F also shows protein fibre matrix in grey colour, which is lighter colour than the starch materials, more transparent than the starch materials, but not completely transparent. The starch-rich materials appear to be narrow line shaped, and are tightly embedded within protein fibre matrix, and are obviously substantially evenly distributed throughout the structure between and along with the protein fibres, the distribution, the shape and distribution of the starch rich materials are highly ordered. These indicate that the starch is emulsified with protein.

Figure 6G:
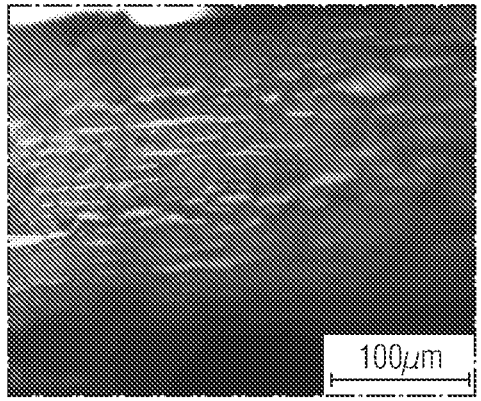
FIGS. 6G and 6H are microscopic images of a specimen taken from Sample #6 (20× magnification)

FIG. 6G is a microscopic image of a specimen taken from Sample #6. The specimen was stained by a protein dye, for example, Thermo Scientific Pierce Coomassie Brilliant Blue R-250, and observed in 20× magnification. The protein fibres are stained to be black colour. The protein fibres are mostly aligned to be in parallel with each other. The cross-linking is high: connections between neighbouring fibres in FIG. 6G are clearly more abundant than that in FIG. 6C. The gap spaces between neighbouring fibres in FIG. 6G are clearly narrower and smaller than that in FIG. 6C.

Figure 6H:
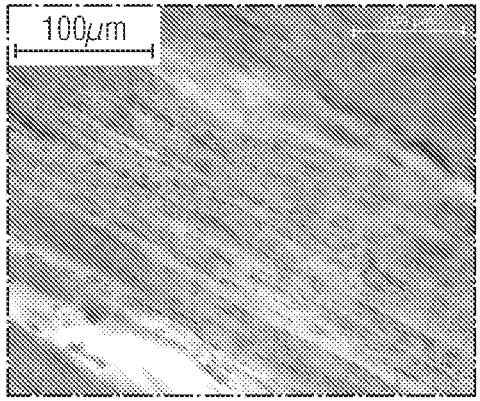

FIG. 6H is a microscopic image of a specimen taken from Sample #6. The specimen was stained by a diluted iodine solution, for example, 1:5 diluted Sigma-Aldrich Lugol's solution stabilized with Polyvinylpyrrolidon for the Gram staining and observed in 20× magnification. The dark black coloured material (mass) indicate starch-rich material, which form dark blue coloured iodine-starch complex with the iodine stain. FIG. 6H also shows protein fibre matrix in grey colour, which is lighter colour than the starch materials, more transparent than the starch materials, but not completely transparent. The starch-rich materials appear to be narrow line shaped, and are tightly embedded within protein fibre matrix, and are obviously evenly distributed throughout the structure between and along with the protein fibres, the distribution, the shape and distribution of the starch rich materials are highly ordered. These indicate that the starch is emulsified by protein.

Figure 7A:
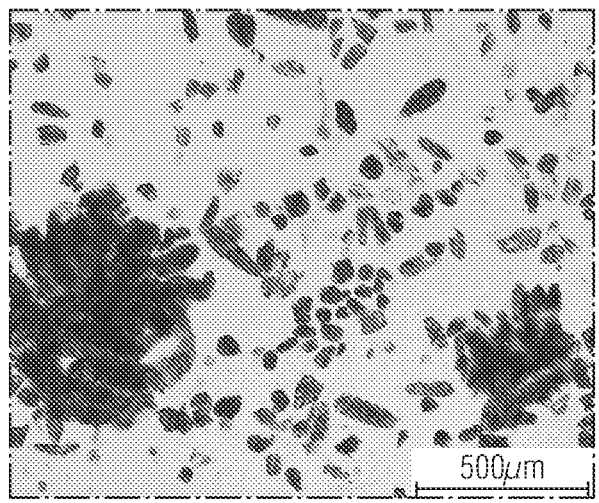
FIG. 7A is a microscopic image of a specimen taken from washable starch washed out from Sample #2 with water at 50° C.

FIG. 7A is a microscopic image of a specimen taken from washable starch washed out from Sample #2 with water at 50° C. FIG. 7A shows the existence of insoluble washable starch in cluster form (black coloured materials in the image), with size between 50 μm and 800 μm. Each cluster contains more than five individual starch granules (round shaped) within it. Within each cluster, the individual starch granules are tightly bound to each other. The specimen was observed with an optical microscope at 5× magnification.

Figure 7B:
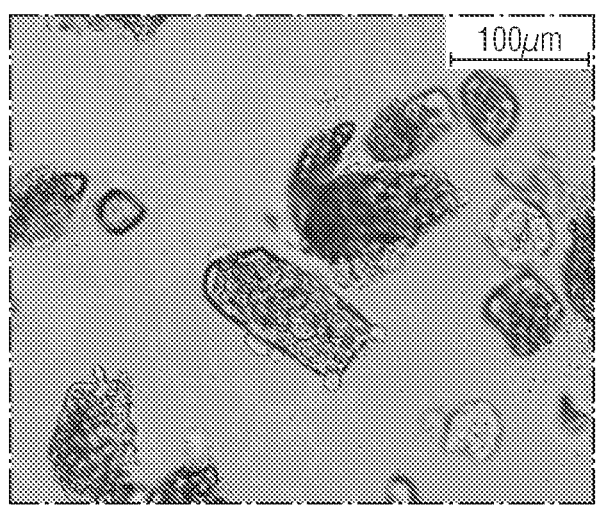
FIG. 7B is a microscopic image of a specimen taken from washable starch washed out from Sample #2 by water at 50° C.

FIG. 7B is a microscopic image of a specimen taken from washable starch washed out from Sample #2 by water at 50° C. FIG. 7B shows the existence of insoluble washable starch in cluster form (black coloured materials in the image), with size around 100 μm. Each cluster contains more than five individual starch granules (round shaped) within it. Within each cluster, the individual starch granules are tightly bound to each other. There are starches leached out from the aggregated-starch-granule-clusters to water. Such leached starches make those clusters "washable" by 50° C. water. Those starches embedded in such clusters are NOT soluble in 50° C. water, but are soluble in 110° C. water. The specimen was observed with an optical microscope at 20× magnification.

FIG. 10 shows pea protein gelation as affected by heating temperature. In order to see how heating temperature can affect pea protein gelation, the pea protein was mixed with water in 1:1 ratio, then packed into a vacuum bag, then heated at different temperatures (50° C. to 110° C.). Then the texture of the gel/mass was measured. As can be seen from the result in the table, the samples heated to 90° C. and above got clearly higher hardness. These indicate a clearly stronger gel was formed after being heated to 90° C. or above.

FIG. 14A shows the starch coating on the inner surfaces of the cavity of the extruded product as observed by iodine staining and visual checking. On the left: a slice of Sample #2. On the right: a slice of a Sample produced in similar conditions as Sample #2, but using dehulled but not pearled wholegrain oat grains to replace the steel cut oat used in Sample #2. The Sample on the right had an unacceptable texture: the compression force was above 20 000 g, for example.

Both Samples were chopped into slices that were approximately 1 mm thick, approximately 10 mm wide, and 40 mm long. The direction of the length is mostly in parallel with the direction of the fibre orientation. One slice of each Sample was stained by diluted Lugol's solution (iodine solution for staining) with a quantity that the diluted Lugol's solution is between 1 mL and 3 mL and can cover the sample in all directions, for 45 min. Then the stained sample was gently moved and immersed in 50 ml water for 5 min. And then we placed the slices on a white paper for visual observation.

The grey coloured mass in the photographs of FIG. 14A refers to the overall structure (protein matrix structure and all other materials embedded in the protein matrix structure). The dark (black) indicates materials that are rich in starch content.

The slice of Sample #2 (i.e. on the left) had obvious dark colour coating material on the inner wall of the cavity, as well as on the outer wall (surface) of the extruded product.

The slice of the other Sample (i.e. on the right) had dark colour as big dots (such as 1 mm round dots) within the structure. The dark dots should be unbroken oat seeds. The sample contains visible unbroken seeds as inclusion particles, but it had unacceptable texture.

Obvious dark colour coating material was not found in Samples #1, #3, #5, #6 nor in Sample #7.

FIG. 14B shows inner surfaces of the cavity of the extruded product as observed by iodine staining and microscopic (5× magnification using a stereo microscope, e.g. a Zeiss Stemi 305 Stereo Microscope) checking. The sample specimen was taken from Sample #2. The specimen was stained by diluted Lugol's solution (iodine solution for staining) for 30 min before observation. The grey coloured mass in the photograph refers to the overall structure (protein matrix structure and all other materials embedded in the protein matrix structure). The dark (black) indicates materials that are rich in starch content. When viewed via the microscope, the colourful view is in blue or dark blue or black colour.

FIG. 14C shows inner surfaces of the cavity of the extruded product as observed by iodine staining, viewed with microscope with 20× magnification. The sample specimen was taken from Sample #2. The specimen was stained by diluted Lugol's solution (iodine solution for staining) for 30 min before observation. The dark grey coloured mass with certain fibrous (anisotropic) structure in the picture (from the left to the middle of the picture) refers to the overall structure (protein matrix structure and all other materials embedded in the protein matrix structure). There are black dot clusters at the left of the picture indicating gelatinized starch clusters. The light grey coloured mass near the very bright white and empty area (at the right side of the picture) indicates materials that are rich in starch content. The starch at the wall of the cavities observed with this magnification and angle has a lighter colour than the protein matrix structure, because the wall is more directly exposed to the microscope light. When viewed via the microscope, the starch at the wall of the cavities observed with this magnification and angle is in light blue colour.

FIG. 14D and FIG. 14E show inner surfaces of the cavity of the extruded product as observed by iodine staining and with a microscope (40× magnification) checking. The sample specimen was taken from Sample #2. The specimen was stained by diluted Lugol's solution for 30 min before observation. The dark grey coloured mass with certain fibrous (anisotropic) structure in the picture refers to the overall structure (protein matrix structure and all other materials embedded in the protein matrix structure). The light grey coloured mass without fibrous structure near the very bright white and empty area (in the middle of the pictures) indicates materials that are rich in starch content. The starch at the wall of the cavities observed with this amplification and angle has lighter colour than the protein matrix structure. When viewed via the microscope, the starch at the wall of the cavities observed with this amplification and angle is in light blue colour.

FIG. 15 is a photograph of Sample #2 (reference numeral 1) before (the photograph on top) and after (the lower two photographs, reference numeral 2) expansion by cooking in water in an autoclave at 110° C. for 10 minutes.

V: Further Experiments (Examples 3 and 4)

With Examples 3 and 4 we further demonstrate exemplary parameters (shock heating) for the manufacturing process and their effects on the quality of the resulting meat replacement product (such as in terms of certain physical properties, such as compressibility, hardening, expansion, cavity structure).

Example 3 (Samples #10, #11, #12, #13)—Hardening of Extruded Product and Compressibility as Affected by Extrusion Temperature Setting Samples #10, #11, #12, #13 contained 70 weight-% pea protein, 5 weight-% steel cut oat, 24 weight-% oat flour, 1 weight-% salt. The Samples #10, #11, #12, #13 were treated each with a different extrusion temperature setting in the extruder 13.

Table IV shows that when mechanically processed starch-containing grain (e.g. steel cut oat) is used in the ingredients, the shock heating temperature setting of the extrusion condition resulted in a good compressibility (compression force 10 234 g) and moderate hardening (129%) of the produced product (Sample #13).

But when the liquid feed water temperature was low (25° C., as commonly used in the known extruders 12), and/or when the temperature at extruder was not using shock heating profile (zone 2 temperature below 100° C., and/or zone 4 temperature below 160° C.), the so produced product (Sample #10, Sample #11 and Sample #12) had a more severe hardening problem (186%-232%) and bad compressibility (compression force 17 803 g-20 844 g). They had much higher hardness (higher than Sample #13) after they are stored for 5 hours, although they had lower hardness (lower than Sample #13) when they are fresh (5 min after extrusion).

TABLE IV

Texture of Samples #10, #11, #12, #13

| Sample | Liquid feed water temperature (° C.) | Shock heating | Temperature at extruder zone (° C.) | | | | | Structure and texture | Compression force (g) | Hardness at 5 min | Hardness at 5 hour | Hardening |
| --- | --- | --- | --- | --- | --- | --- | --- | --- | --- | --- | --- | --- |
| | | | 2 | 3 | 4 | 5 | 6 | | | | | |
| 10 | 25 | No | 50 | 75 | 100 | 140 | 160 | Continuous gel, having intact surface Very stiff and rubbery | 20 844 | 17 564 | 40 726 | 232% |
| 11 | 25 | No | 100 | 125 | 160 | 145 | 130 | Continuous gel, having intact surface Stiff and rubbery | 17 803 | 17 569 | 34 289 | 195% |
| 12 | 65 | No | 100 | 125 | 130 | 145 | 165 | Continuous gel, having intact surface Very stiff and rubbery | 19 338 | 17 500 | 32 470 | 186% |
| 13 | 65 | Yes | 100 | 125 | 160 | 145 | 130 | Continuous fibrous/layered lump, having intact surface Very flexible, compressible, and chewy | 10 234 | 24 725 | 31 820 | 129% |

Protein in Example 3 was pea protein isolate. It can be replaced in the manner as explained in the context of Example 1 with other proteins.

As mechanically processed starch-containing grains, in Example 3, steel cut oat was used. As flour, oat flour was used. The Steel cut oat and the oat can be replaced in the manner as explained above and in the context of Example 1 with the other mechanically processed starch-containing grains and flours.

In particular, steel cut oat can be replaced by steel cut barley, rice kernel, broken rice, pearled barley, pearled rye, pearled wheat, pearled oat etc or a mixture thereof. The results are comparable. The oat flour can be replaced by barley flour, wheat flour, rice flour, pea flour, chickpea flour, faba bean flour, quinoa, pigeon peas, sorghum, buckwheat etc and mixture thereof. The results are comparable.

The steel cut oats were NOT soaked in hot water before extrusion in this example.

Extrusion parameters:
(1) moisture content of the slurry (materials being extruded) during extrusion is approximately 50%;
(2) Some of the extruded products were immediately soaked in water (e.g. 20° C.) for 2 hours to cool down and prevent drying. Then they were taken out from water. After being stored at 5° C. for 24 hours, they were analysed for compression force;
(3) Some of the extruded products were immediately packed in a closed plastic bag to prevent drying, kept at room temperature, and analysed for hardness and hardening;
(4) Extrusion production rate: approximately 18 kg product made per hour. The cooling die temperature was 90° C.

Compression force in Example 3 stands for resistance force against compression with a cylinder analysed by a texture analysis method, described above.

Texture observation in this example stands for texture property observation note as analysed by expert panellist sensorial evaluation.

Hardness in this example stands for the hardness of the non-soaking extruded product analysed by texture analyser using cylinder compression method, which will be described below.

Hardening refers to the hardening rate after 5 hour storage, which is calculated as:

Hardening rate=100%×hardness (5 hour)/hardness (5 minutes)

Example 4 (Samples #14, #15, #16, #17)—Structure and Compressibility of Extruded Products and as Affected by Extrusion Temperature Setting The ingredients used in Samples #14, #15, #16, #17 were: 90 weight-% pea protein isolate, 5 weight-% steel cut oats, 4 weight-% pea fibre and 1 weight-% salt.

Table V shows that when mechanically processed starch-containing grains (now: steel cut oat) was used in the ingredients, the functions of (Sample #16) combing (a) the use of extrusion shock heating temperature setting, and (b) the use of hot water as liquid feed, resulted in a good compressibility (compression force 16 290 g) of the produced product.

When the extrusion temperature was changed to a slower heating profile (decreased temperature, 130° C., at zone 4 and increased temperature, 160° C., at zone 6), the produced product (Sample #15) had much worse compressibility (26 484 g).

When the extrusion heating temperature was changed to "excessive" heating profile as in producing Sample #17, where the zone 5 and zone 6 had increased temperature (160° C. and 160° C.), the produced product (Sample #17) did not have the desired continuous or intact structure any more. So it was not measurable for compression force. And the product does not have similarly desirable chewiness of Sample #16. These make Sample #17 impossible to produce chicken-thigh-like or chicken-nugget-like meat replacement product.

When the extrusion temperature was changed to "very slow" heating profile as in producing Sample #14, where zone 2 temperature was below 80° C., zone 4 temperature was below 160° C., and the liquid feed water was cold (25° C.), the produced product (Sample 14) did not have the desired continuous and intact structure any more. So it was not measurable for compression force. And the product does not have similarly desirable chewiness of Sample #16. These make Sample #14 impossible to produce chicken-thigh-like or chicken-nugget-like meat replacement product.

TABLE V

| | | | | | | | | |
|---|---|---|---|---|---|---|---|---|
| Texture of Samples #14, #15, #16, #17 ||||||||||
| Sample | Liquid feed water temperature (° C.) | Shock heating | Temperature at extruder zone (° C.) ||||| Structure and texture | Compression force (g) |
| | | | 2 | 3 | 4 | 5 | 6 | | |
| 14 | 25 | No | 50 | 75 | 100 | 140 | 160 | Discontinuous gel, having many holes on the surface generate lots of small particles Lack of chewiness | No result |
| 15 | 60 | No | 80 | 125 | 130 | 145 | 160 | Continuous, intact surface Stiff and rubbery | 26 484 |
| 16 | 60 | Yes | 80 | 125 | 160 | 145 | 130 | Continuous, intact surface Flexible, compressible, and chewy | 16 290 |
| 17 | 60 | Yes | 80 | 125 | 160 | 160 | 160 | Discontinuous small gel particles, Lack of chewiness | No result |

Protein in Example 4 was pea protein isolate. It can be replaced in the manner as explained in the context of Example 1 with other proteins. The results will be comparable.

For the possibility of replacing the steel cut oat and the oat flour, the same considerations as in Example 3 apply.

the formation of an intense complete isotropic (three-dimensional) crosslinking network structure. The soluble starch also forms coating material between the gap of protein matrix, which later became cavity inside the extruded product. The coating material strengthen the cavity and prevent it from being sealed by protein-crosslinking.

TABLE VI

| Sample | Liquid feed water temperature ° C. | Shock heating | Temperature at extruder zone (° C.) | | | | | Total starch g/100 g | Washable starch g/100 g | Soluble Starch g/100 g | Starch solubility |
|---|---|---|---|---|---|---|---|---|---|---|---|
| | | | 2 | 3 | 4 | 5 | 6 | | | | |
| 11 | 25 | No | 100 | 125 | 160 | 145 | 130 | 4.4 | 0.65 | 0.18 | 4.1% |
| 12 | 65 | No | 100 | 125 | 130 | 145 | 165 | 4.4 | 0.72 | 0.22 | 5.0% |
| 13 | 65 | Yes | 100 | 125 | 160 | 145 | 130 | 4.4 | 0.71 | 0.34 | 7.7% |

The steel cut oats were not soaked in hot water before extrusion in Example 4.

Extrusion parameters:

(1) moisture content of the slurry (materials being extruded) during extrusion is approximately 50%;

(2) the extruded products were immediately soaked in water (e.g. 20° C.) for 2 hours to cool down and prevent drying. Then they were taken out from water. After being stored at 5° C. for 24 hours, they were analysed for compression force;

(3) Extrusion production rate: approximately 18 kg product made per hour. The cooling die temperature was 90° C.

Compression force in this example stands for resistance force against compression with a cylinder analysed by a texture analysis method described above.

VI—Advanced Experiments (Examples 5 and 6)

With Examples 5 and 6 we demonstrate the effects of the extrusion conditions and ingredients for the formation of the cavities having a gelatinized starch coating, which are closer to the mechanism of how those processing methods could result in improvements in quality. Some of the Samples used in Example 5 and Example 6 were the same as in Example 1.

Example 5. Starch that can be Washed Out and Starch that can Solubilized by Warm Water from the Extruded Product as Affected by the Extrusion Condition Table VI shows that when steel cut oat was used in the ingredient, the functions of Sample #13 combining (a) using extrusion shock heating temperature setting, and (b) using hot water as liquid feed, resulted in increased starch solubility.

The existence of soluble starch in the extruded product were caused by combined effects from (a) mixing the grain with water, (b) heating the grain with water early enough before the starch of the grain is emulsified with the protein matrix.

During extrusion, the soluble starch can cause phase separation between protein gels and protein fibres, prevent The ingredients used in this example and Extrusion parameters: same as described in Example 3.

Total starch in Example 5 stands for the total amount of starch in the extruded product", which can be analysed by any standard starch analysis methods, or by a hot water extraction method. The hot water analysis method is described below.

Washable starch (g of washable starch in 100 g product) in Example 5 stands for the amount of starch that can be washed out from chopped slices of the extruded products by 50° C. water, which was analysed by a water washing test. The analysis method is described in another paragraph separately. There are microscopic images of the washable starch in FIG. 7A and FIG. 7B.

Soluble starch (g of soluble starch in 100 g product) in Example 5 stands for the amount of starch that can be solubilised in 50° C. water from chopped slices of the extruded products, which was analysed by a water solubilising test. The analysis method is described in another paragraph separately.

Starch solubility in this example stands for the ratio between the soluble starch and the total starch.

Starch solubility=100%×soluble starch/total starch

Example 6. Starch that can be Washed Out and Starch that can Solubilized by Warm Water from the Extruded Product as Affected by the Ingredient Table VII shows that using oat flour in the ingredient (Sample #1) resulted in a very low starch solubility (3.4%) and little washable starch (0.08 g/100 g) of the extruded product. However, when the oat flour was replaced by steel cut oat having the same chemical composition but bigger size, the produced product (Sample #2) had a much higher starch solubility (8.4%) and more washable starch (0.41 g/100 g).

Figure 3:
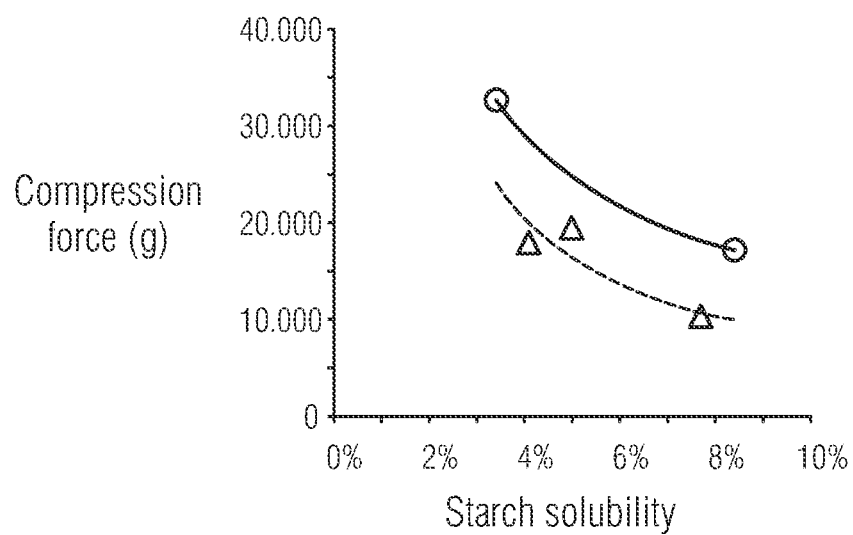
FIG. 3 illustrates the observed relationship (fit of an exponential curve to measurement points) between starch solubility and the compression force required to compress a meat replacement product.

As shown in FIG. 3, and as shown in Example 1, Sample #2 had a more flexible and compressible texture than Sample #1. This is contributable to the higher amount of soluble starch and washable starch. This is in line with the results of Example 5.

TABLE VII

Analysis of washable starch and soluble starch

| | Ingredient | | | | | Washable starch | Starch solubility |
|---|---|---|---|---|---|---|---|
| Sample | Protein | Grain | Flour | Fibre | Salt | g/100 g | |
| 1 | 90 | 0 | 5 | 4 | 1 | 0.08 | 3.4% |
| 2 | 90 | 5 | 0 | 4 | 1 | 0.41 | 8.4% |

The ingredients used in this example and Extrusion parameters: same as described in Example 1.

Washable starch (g of soluble starch in 100 g product) in Example 6 stands for the amount of starch that can be washed out from chopped slices of the extruded products by 50° C. water.

Starch solubility Example 6 stands for "the ratio between the soluble starch and the total starch".

FIG. 3 shows a mathematical model in which an exponential curve was fitted to the measured values. It shows that there exists a relationship between the starch solubility and the compression force required to compress a meat replacement product manufactured with high moisture protein texturization extrusion.

VII: Manufacturing Examples (Examples 8 and 9)

Example 7—Manufacturing of Meat Replacement Product in the Form of a (Preferably Vegan) Chunk A meat replacement product in the form of (preferably a vegan) chunk (mimicking chicken chunks) was produced with the following steps.

Figure 8:
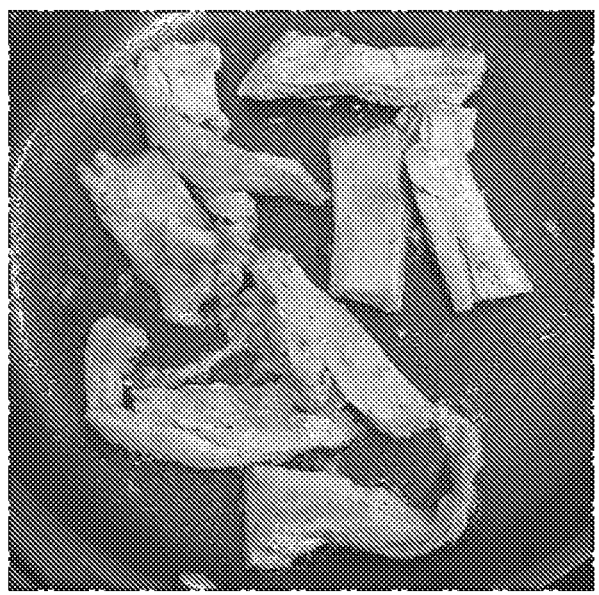
FIG. 8 is an example of a food made from the meat replacement product (Sample #2) after shredding into pieces.

The result is shown in FIG. 8 which is an example of a food made from the meat replacement product (Sample #2) after shredding into pieces having a size of more than 5 cm length, 1 cm width, 0.8 cm thickness, marinating the pieces and pan frying. The food mimics chicken thigh meat chunks or fillet.

Step 1) Produce a meat replacement product, such as the Sample #2 or #13.

Step 2) Tear the extruded products into elongated strips (e.g. approximately 2 cm-4 cm length, 1 cm-3 cm width, 0.8 cm thickness), so the fibre direction is along with the length direction. Tearing can be done manually, or by a shredder machine.

Step 3) Soak the torn/shredded extruded product in a marinade sauce (such as, containing water, oil, lemon juice, balsamic vinegar, sugar, salt and other spices, for example) for a suitable time (such as, for 2 hours for example), preferably right after being extruded;

Step 4) Take the extruded product out from the marinade sauce, and preferably pan fry it for 2 min-3 min until it is warmed and the surface turns to golden colour and crispy.

The extruded product can be frozen or chilled after Step 3). Step 4) can be performed just before consumption, such as at home or work, or at the restaurant after purchasing of the product.

Figure 9:
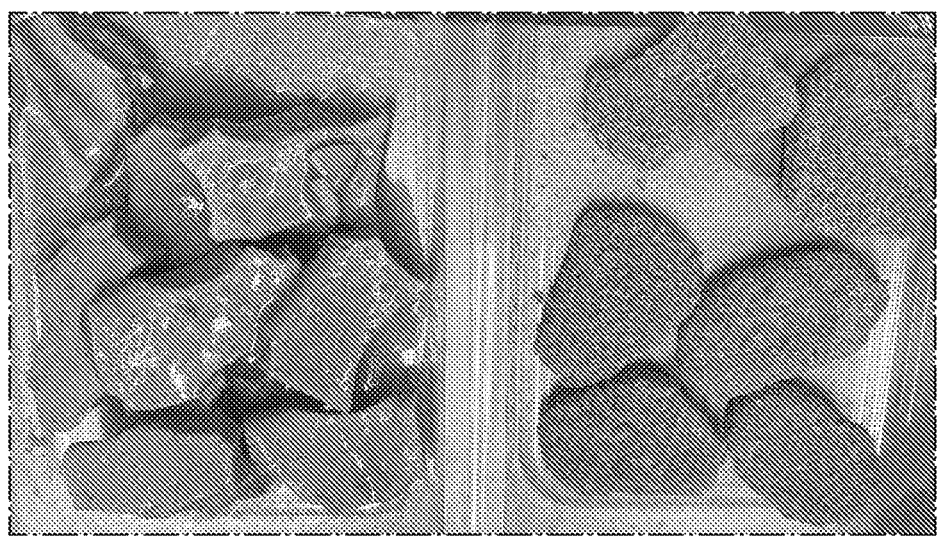
FIG. 9 is an example food made out from the meat replacement product (Sample #2) after shredding the extruded products into pieces, marinating the pieces (on the left), battering the extruded product, breading the extruded product and deep frying in oil (on the right)

Example 8—Manufacturing of Meat Replacement Product in the Form of a (Preferably Vegan) Nugget FIG. 9 shows an example food made out from the meat replacement product (such as Sample #2 or #13) after shredding the extruded products into pieces having a size preferably more than 3 cm length, 2 cm width, 0.8 cm thickness, marinating the pieces (on the left), battering the extruded product, breading the extruded product and deep frying in oil (on the right). The food mimics chicken nuggets.

The meat replacement product in the form of a (preferably vegan) nugget can be produced with the following steps:

Step 1) Produce a meat replacement product, such as the Sample #2 or #13. Soak the extruded product in water or in a marinade sauce (e.g. containing water, oil, lemon juice, balsamic vinegar, sugar, salt and other spices) for a suitable time (such as for 24 hours, for example) after being extruded;

Step 2) Cut the soaked extruded product into size and shape that is similar as regular or typical commercial nugget (such as, at least 3 cm length, 2 cm width, 0.8 cm thickness, for example), Step 3) Prepare a batter by mixing ingredients, such as with a recipe of 40% weight-% chickpea flour and 60 weight-% water;

Step 4) Cover the cut extruded product with the batter liquid

Step 5) Cover the battered extruded products with a breading ingredient, such as commercial wheat based frying breading ingredient, bread crumbs, or alternatively with a commercial gluten free breadcrumb ingredient.

Step 6) Deep fry the breaded extruded product, such as at 170° C., preferably in oil, for a suitable time such as for 3 min, for example.

VIII: Advanced Analysis Methods

The analysing methods for analysing different properties such as compression force, expansion rate, starch solubility are described in the following.

Method for Measuring Cooking Expansion Rate of Thickness

Cut the extruded product into a chunk by cutting through a direction perpendicular to the protein fibre direction (the direction which the extruded product moved out from the die of the extruder). This chunk had a length equal to the original width of the extruded product. The chunk had a thickness equal to the original thickness of the extruded product. The chunk had a width of 20 mm. The width measurement direction is in parallel with the fibre direction.

Put the chunk into a beaker shape container. Then add water to the container to immerse the chunk. Then cook the water and the chunk in high pressure cooker (autoclave) at 110° C., for 10 min. After cooking, take the chunk out from water and let it stand on kitchen-use sieve to drain. Measure and compare the thickness of the chunk before and after cooking. The expansion rate is calculated as: the thickness after cooking divided by the thickness before cooking. The thickness of the chunk was measured at the centre of the length direction of the chunk. The Cooking Expansion Rate of thickness was expressed as "Expansion" or "Expansion rate" throughout this application, unless when there are other specifications such as "Extrusion Expansion Rate".

Expansion Rate=100%×Thickness (after cooking)/Thickness (before cooking)

Method for Observation of Visible Air Cavity in the Extruded Product:

Cut the extruded product into a chunk (chunk A) by cutting through a direction perpendicular to the protein fibre direction (the direction which the extruded product moved out from the die of the extruder). This chunk had a length equal to the original width of the extruded product. The chunk had a thickness equal to the original thickness of the extruded product. The chunk had a width of mm. The width measurement direction is in parallel with the fibre direction.

Cut the extruded product into a chunk (chunk B) by cutting the extruded product, taking the middle part (in the middle of the width of the extruded product), so the chunk has a thickness as its original thickness, has a length of 40 mm in a direction in parallel to the fibre direction of the extruded product, and has a width of 20 mm in a direction in parallel to the width of the extruded product.

Put the chunk A and chunk B into a beaker shape container. Then add water to the container to immerse the chunk. Then heat the water and the chunk at 60° C., for 24 hours.

After heating, take the chunk out from water and let it stand on kitchen-use sieve to drain. Then observe the cutting section (length×thickness) of the chunk A and chunk B by visual checking and photo shooting.

Then air dry the chunk for 7 days at room temperature. Analyse the dried chunk with X-ray microtomography (Micro-CT) scanning.

Method for Soluble Starch Concentration Measurement

The method is adopted with modification from [Ref 10] and [Ref 11]

The solution containing soluble starch (1 mL) was mixed with diluted Lugol's solution* (1 mL) and water (4 mL). Hand shake the mixture for about 10 sec, and then let the mixture to stand still for 10 min. Then measure the absorbance** of the mixture solution at wavelength (wavelength of the light beam used in the spectrophotometer measurement) of 600 nm.

* The diluted Lugol's solution was prepared by mixing one portion of Lugol's solution (Synonym: Iodine/Potassium iodide solution, a solution of potassium iodide with iodine in water, iodine concentration is between 3% and 10%) or stabilized Lugol's solution (a complex of Iodine-Polyvinylpyrrolidon (PVP) (homopolymer from 1-vinyl-2-pyrrolidone, complex with iodine in a concentration between 3% and 10%) with five portions of water. One example of final concentration after dilution: having iodine concentration of 0.0100 mol/L and potassium iodide concentration of 0.0260 mol/L.

** The absorbance was measured by an UV/Visible spectrophotometer (one example UV/Visible spectrophotometer can be UV-1600PC from Supplier VWR Collection).

A standard curve for absorbance and soluble starch concentration was prepared, with a method as: Potato starch (0.05 g, 0.1 g and 0.2 g) were dispersed in 200 mL cold water by hand shaking for 1 min. Then the dispersions were cooked twice in autoclave (each time cooking at 110° C. for 10 min, hand shaking for 1 min after each time of cooking when the mixture is still above 60° C.). In this way, the potato starches were completely solubilized in water. The potato starch dispersions were centrifuged at 644 g (g is a unit of RCF=relative centrifugal force) at room temperature. Then the supernatants were taken as starch solutions for further analyses. The centrifugation can be done by centrifuge machine used in this study as Heraeus™ Megafuge™ 8 Small Benchtop Centrifuge equipped with rotor as 50 mL Conical Buckets (supplier's product code 75005703).

The concentration of soluble starch in a starch solution can be calculated on basis of the standard curve and the absorbance value at wavelength of 600 nm.

Citation McGrance (1998) [Reference 10], "The reaction between starch and iodine has been known for over a century. Some fifty years ago, Rundle and Baldwin proposed that the iodine component of the complex is present in a unidimensional array within an amylose helix with six glucose residues per turn. Two important aspects of the colorimetric method using iodine reaction are its versatility and simplicity. It can be used for starches from a wide variety of botanical sources, and requires no special equipment other than a simple spectrophotometer capable of measuring absorbance in the vicinity of 600 nm. Samples of high and low amylose content may be analysed and require only a change in the volume of the aliquot chosen to give optimal results. The sensitivity of the iodine-starch reaction is quite high". Iodine colorimetric analysis method for starch quantification is reliable and known by people skilled in the art, though it has not been used much as an official analysis method.

Method for Analysing the Soluble Starch and Washable Starch from the Extruded Product The method for extracting and defining the Soluble Starch and Washable Starch were adopted with modification from [Ref 12]. Soluble Starch is the starch that can be extracted (extracted=washed out) from the product by water at 50° C., pass through a sieve with 1200 μm pore size, and is soluble in the water. Washable Starch is the starch and starch containing materials that can be extracted (extracted=washed out) from the product by water at 50° C., and pass through a sieve with 1200 μm pore size. Soluble Starch is a part of Washable Starch, in other words, Soluble Starch is synonym of "Soluble Washable Starch". The Washable Starch involves Soluble Washable Starch and Insoluble Washable Starch. The Insoluble Washable Starch can be solubilized in water when it is cooked in water above its gelatinization temperature, preferably around 100° C. A soluble component is a component in the solution that is well dispersed in the liquid and NOT precipitate during centrifugation at 644 g (g is a unit of RCF=relative centrifugal force).

FIG. 13 illustrates the method for analysing the soluble starch and washable starch from the extruded product 61:

(step 62) cutting, to take a sample 63 from substantially the middle of the extruded product 62, avoiding the edges (5% of the width);

(step 64) chopping the sample 63 into thin slices 65, the thin slices 65 of the extruded product with dimensions of approximately 1 mm×10 mm×40 mm, of which the length of the pieces (40 mm) direction is in parallel with the fibre orientation direction of the extruded product (step 66) soaking the thin slices 65 in water at 50° C. for 24 h, hand shaking for 2 min;
(step 67) sieve with pore size 1.2 mm;
Reference numeral 68 refers to insoluble washable components within the washing extract;
(step 69) centrifuging at 644 g (RCF) for 30 min;
Reference numeral 70 refers to supernatant from the centrifugation, which contained soluble starch;
(step 71) autoclave cooking at 110° C. for 10 min, hand shaking;
(step 72) centrifuging at 644 g (RCF) for 30 min;
Reference numeral 73 refers to supernatant from the centrifugation, which contained washable starch.

The measurements were done for 20 g sliced extrudate that was soaked (step 66) in in 200 mL of water and kept at 50° C. for 24 hours.

g is a unit of RCF=relative centrifugal force.

Starch Solubility of the extruded product=(the Soluble Starch Content/the Total Starch Content in the Extruded Product)×100%

Starch Washability of the extruded product=(the Washable Starch Content/the Total Starch Content in the Extruded Product)×100%

Method for Measuring the Total Starch the Extruded Product

Total amount of starch in the extruded product can be analysed by a standard starch analysis method such as AACCI Method 76-13.01 "Total Starch Assay Procedure" (Megazyme Amyloglucosidase/alpha-Amylase Method). And it can also be measured by a hot water analysis method having steps of: (1) chopping the extruded product into approximately 1 mm3 cubes; (2) cooking 4 g of the chopped extrudate in 200 mL water in autoclave oven at 110° C. for 10 min; (3) hand shaking the extrudate-water mixture when it is taken out from the autoclave oven above 70° C. (4) Repeating the step (3) cooking and shaking once again. With this treatment, all the starch can be assumed to be solubilized in the water. (5) Centrifuging the extrudate-water mixture at 644 g (RCF) for 30 min, and (6) measuring the soluble starch concentration of the supernatant. The total amount of starch in the supernatant is equal to the total starch content of the extrudate, which can be calculated with the volume of the water and the soluble starch concentration value.

Method for Measuring the Cutting Force and Compression Force

For the Cutting Force measurement, we measured the resistance forces of the samples during a compression test with a knife blade. The measurements were carried out so that the TA.XTPlus Texture Analyzer (supplier Stable Micro Systems) was equipped with a 294.2 N (30 kg) load cell (detector sensor) and a sharp knife blade. The knife is "double bevel (grind) Scandi" type. The knife has a blade having a total wedge angle of approximately 16 degree at the sharpest part (edge), which means the knife's primary angle of bevel is approximately 8 degree. The knife has a flat part (spine) with 0.6 mm thickness being above the blade part.]). The height of the samples were between 7.0 and 12.0 mm. The width of the sample was 20 mm. The samples were stabilized and put horizontally on a plate and the direction of the sample was adjusted to let the blade compress (i.e. cut) towards the cross-section direction of the elongated fibre (in the length direction of the fibre). The downward speed before the blade touching the fibre was 4 mm/s (pre-test speed). The speed of compression when the blade touched the fibre was 20 mm/second (test speed) and compression went to a cutting depth until 90% of the height of the sample was reached. For the samples that have height above 9.0 mm, the compression went to a cutting depth of 8.0 mm. The peak positive force (peak positive force is a term used in the equipment software, it refers to the largest force detected during the measurement) was taken as the Cutting Force for this study.

For the Compression Force measurement, we measured the resistance forces of the samples during a compression test with a cylinder shape probe (model "P/36R", 36 mm Radius Edge Cylinder probe—Aluminium—AACC Standard probe for Bread firmness, supplier Stable Micro Systems). The measurements were carried out so that the TA.XTPlus Texture Analyzer was equipped with a 294.2 N (30 kg) load cell (detector sensor) and a cylinder shape probe. The height of the samples were between 7.0 and 12.0 mm. The width and length of the sample was 40 mm. The samples were stabilized and put horizontally on a plate and the direction of the sample was adjusted to let the cylinder compress towards the centre of the sample. The downward speed before the blade touching the fibre was 2 mm/s (pre-test speed). The speed of compression when the blade touched the fibre was 0.5 mm/second (test speed) and compression went to a cutting depth until 40% of the height of the sample was reached. The peak positive force (peak positive force is a term used in the equipment software, it refers to the largest force detected during the measurement) was taken as the Compression Force for this study. There was a "trigger force" setting, which was set as 1000 g in this study. The trigger force is set up to control the machine (texture analyser) that when the detected resistant force is below the trigger force, the probe is not in the position where the top surface of the sample was touched, the probe downward move at pre-test speed of 2 mm/s. When the detected resistant force is no less than the trigger force, the probe reached the sample, the probe downward move at test speed of 0.5 mm/s.

Method for Measuring the Hardness

For the Hardness measurement, we measured the resistance forces of the samples during a compression test with a cylinder shape probe (model "P/36R", 36 mm Radius Edge Cylinder probe—Aluminium—AACC Standard probe for Bread firmness, supplier Stable Micro Systems). The measurements were carried out so that the TA.XTPlus Texture Analyzer was equipped with a 294.2 N (30 kg) load cell (detector sensor) and a cylinder shape probe. The height of the samples were between 7.0 and 12.0 mm. The width and length of the sample was 40 mm. The samples were stabilized and put horizontally on a plate and the direction of the sample was adjusted to let the cylinder compress towards the centre of the sample.

The measurement program was adopted from a standard TPA measurement protocol (Citation from the manual of the measurement equipment "Texture profile analysis (TPA) is an objective method of sensory analysis pioneered in 1963 by Szczesniak [Ref 6] who defined the textural parameters first used in this method of analysis. Later in 1978 Bourne [Ref 7] adapted the Instron to perform TPA by compressing standard-sized samples of food twice. TPA is based on the recognition of texture as a multi-parameter attribute. For research purposes, a texture profile in terms of several parameters determined on a small homogeneous sample may be desirable. The test consists of compressing a bite-size piece of food two times in a reciprocating motion that imitates the action of the jaw and extracting from the resulting force-time curve a number of textural parameters that correlate well with sensory evaluation of those parameters [Ref 8]. The mechanical textural characteristics of foods that govern, to a large extent, the selection of a rheological procedure and instrument can be divided into the primary parameters of hardness, cohesiveness, springiness (elasticity), and adhesiveness, and into the secondary (or derived) parameters of fracturability (brittleness), chewiness and gumminess [Ref 9].

The downward speed before the blade touching the fibre was 5 mm/s (pre-test speed). The speed of compression when the blade touched the fibre was 2 mm/second (test speed) and compression went to a cutting depth until 30% of the height of the sample was reached. The peak positive force (peak positive force is a term used in the equipment software, it refers to the largest force detected during the measurement) was taken as the Compression Force for this study. There was a "trigger force" setting, which was set as 5000 g in this study. The waiting time between the first and the second compression was 1 sec. The Hardness is calculated by the software of the measurement equipment. The Hardness equals to the peak positive force during the first compression.

IX: Advanced Mechanism Studies

Mechanism study 1 shows the effects of processing method (ingredient, shock heating) on the property (particle size distribution) of the Test-Extruded (extrusion without cooling die) materials, which revealed the mechanism of how those processing methods affected the extruded products. This also can be used as an evaluation method for selecting processing parameter.

The further mechanism studies show relevant knowledge about the differences between properties of grains and flours, between grains processed by cold water and warm water.

Mechanism Study 1—Effect of Ingredients and Extrusion Temperature Profile on Particle Weight Distribution To study the effects of the ingredients and the extrusion temperature on the results, the inventors carried out a number of further experiments. Table VIII lists the ingredients and test extrusion parameters. Test extrusion means the extruder did not OT install any die during these tests, but only let the ingredients to be processed by the screws running in the heating chamber. The summary of the results and findings can be found in Table IX. FIG. 4 shows the measured particle weight distribution of extruded material as affected by the ingredient composition and extrusion heating temperature profile, for Experiments 1 to 6.

TABLE VIII

Sample preparation for the Test-Extrusion

| Experiment | Ingredient | | | | | Liquid feed water temperature ° C. | Temperature at extruder zone (° C.) | | | | |
|---|---|---|---|---|---|---|---|---|---|---|---|
| | Protein | Grain | Flour | Fibre | Other | | 2 | 3 | 4 | 5 | 6 |
| 1 | 69 | 10 | 20 | 0 | 1 | 25 | 110 | 125 | 160 | 145 | 130 |
| 2 | 69 | 0 | 30 | 0 | 1 | 25 | 110 | 125 | 160 | 145 | 130 |
| 3 | 69 | 10 | 20 | 0 | 1 | 25 | 40 | 125 | 160 | 145 | 130 |
| 4 | 90 | 5 | 0 | 4 | 1 | 60 | 80 | 125 | 160 | 145 | 130 |
| 5 | 90 | 5 | 0 | 4 | 1 | 60 | 80 | 125 | 130 | 145 | 165 |
| 6 | 90 | 5 | 0 | 4 | 1 | 25 | 50 | 75 | 130 | 150 | 165 |

As mechanically processed starch-containing grains, in Experiments 2 and 3 oat flakes were used. In Experiments 4, 5 and 6, steel cut oat was used. The steel cut oats were not soaked before test extrusion.

The test extrusion did not form chunks with long continuous fibrous matrix. Instead, the produced materials were agglomerates with different sizes (thus having a per-particle weight ranging from 0.1 g to 10 g). The agglomerates (i.e. particles) were classified into different size (weight) groups (small, medium, large etc), and then weighed each size group and calculated its percentage to the total weight of the produced agglomerates. The particle weight distribution curve is shown in FIG. 4.

TABLE IX

Results and findings of the Test-Extrusion

| Experiment | Grain presence | Flour presence | Heating speed | Mechanism | Result |
|---|---|---|---|---|---|
| 1 | Yes | Yes | Shock heating | The grain got gelatinized early enough. Protein gelation and aggregation occurred but were limited by gelatinized starch cluster from the grain. Flour contributed to increase the protein gel aggregation | Medium size particle (0.5 g-4 g) were produced (26%). The majority type particles were the small particles (0-0.5 g). Large particles (>4 g) were not produced. |

TABLE IX-continued

Results and findings of the Test-Extrusion

| Experiment | Grain presence | Flour presence | Heating speed | Mechanism | Result |
|---|---|---|---|---|---|
| 2 | No | Yes | Shock heating | Protein gelation and aggregation were abundant. Flours were completely homogenized within protein matrix, formed emulsion gel, and contributed to increase the protein gel aggregation. | Small particles (<0.5 g) were much less than Experiment 1. Large particles (>4 g) were abundant. |
| 3 | Yes | Yes | Slow (zone 2 low) | The grain were ground into flour-like particles before getting sufficient gelatinization. So the behaviour was similar as Experiment 2. | Small particles (<0.5 g) were much less than Experiment 1. Large particles (>4 g) were abundant. |
| 4 | Yes | No | Shock heating | The grain got gelatinized early enough. Protein gelation and aggregation occurred but were limited by gelatinized starch clusters from the grain. | Medium size particle (0.5 g-4 g) were produced (29%). Large particles (>4 g) were not produced. |
| 5 | Yes | No | Slow (zone 4 low) | The grain got gelatinized early. Protein gelation and aggregation occur late, and were excessively limited by gelatinized starch cluster from grain. | Medium size particle (0.5 g-4 g) were much less than Experiment 4. |
| 6 | Yes | No | Very slow (zone 2 low) | The grain were ground into flour-like particles before getting sufficient gelatinization. Protein gelation and aggregation occurred lately, but was slightly increased by the flour-like particles. | Medium size particle (0.5 g-4 g) were much less than Experiment 4. Medium size particle (0.5 g-4 g) were slightly more than Experiment 5. |

Comparison should be mainly made between samples having the same chemical composition (protein content, starch content etc.), such as comparing between Experiment 1, Experiment 2 and Experiment 3. Or, separately comparing between Experiment 4, Experiment 5 and Experiment 6.

Furthermore, there are similarity between Experiment 1 and Experiment 4, which have the parameters that can produce products with good compressibility and flexibility. They both produce medium size particle (0.5 g-4 g) in a percentage between 26%-30%; large particles (>4 g) in a percentage between 0% and 5%.

Mechanism Study 2. Comparison Between Oat Flour, Oat Flake, Steel Cut Oat and Whole Oat Seed for their Particle Size, Seed Coat, Seed Structure Intactness and Starch Extractability The measurement results in Table X show that oat flake, steel cut oat and wholegrain oat seed have much lower starch extractability in water (9-26 g/100 g) than oat flour (40 g/100 g) has due to better intactness of seed structure and seed coat. Wholegrain oat seed has very low starch extractability (9 g/100 g) due to its intact seed coat.

The steel cut oat could absorb much more and faster (375%, 110° C., 10 min) water when the water is hot than when the water is with lower temperature (136%, 50° C., 12 hours). These explain why shock heating and soaking in hot water can change the behaviour and effects of having oat flakes, steel cut oat in the high moisture extrusion. The hot water can allow the starch containing grains to absorb water faster and complete, and get gelatinized and more solubilized.

The wholegrain oat seed would not be as functional/replaceable as the oat flakes and steel cut oat in the examples disclosed above. At the time of writing, the inventors are still testing other treatments to enable the function of having wholegrain oat seed. For example, sufficient boiling in excessive amount of water.

TABLE X

Oat based starting material, starch extractability in water

| | Size (mm³/ particle) | Seed coat | Seed structure intactness | Carbo-hydrate (g/ 100 g) | Extract-able starch (g/ 100 g) | Com-pared to oat flour | Water absorption 50° C. | Water absorption 110° C. |
|---|---|---|---|---|---|---|---|---|
| Oat flour | 0.03 | No | Completely broken | 56 | 40 | 100% | N.A. | N.A. |
| Oat flake | 16 | Broken | Partially broken | 56 | 26 | 66% | N.A. | 644% |
| Steel cut oat | 8 | Broken | Mostly intact | 56 | 18 | 46% | 136% | 375% |
| Wholegrain oat seed | 16 | Intact | Intact | 56 | 9 | 23% | N.A. | 254% |

To measure the extractable starch, 10 g of the starting material was cooked in 100 g of water in autoclave for 10 min, and the cooked mixture was centrifuge at 644 g (RCF) for 30 min. The soluble starch concentration of the supernatant. The extractable starch was calculated as:

The extract table starch=100%×soluble starch in the supernatant/the weight of the starting material To measure the water absorption at 50° C., 20 g of the starting material was soaked in 200 g of water, then kept being soaked at 50° C. for 24 hours, then was sieved to remove the water that was not absorbed by the material. The weights of the material before and after the 24 hour soaking were recorded.

The water absorption=100%×(the weight after soaking−the weight before soaking)/the weight before soaking To measure the water absorption at 50° C., 20 g of the starting material was added to 200 g of water, then being cooking in that water at 110° C. for 10 min in autoclave, then was sieved to remove the water that was not absorbed by the material. The weights of the material before and after the cooking were recorded.

The water absorption=100%×(the weight after cooking−the weight before cooking)/the weight before soaking Steel cut oat with different sizes can be produced in a range of size between 6 mm³ and 15 mm³ per particle. Those with 8 mm³ per particle was used in this Mechanism Study 2.

Mechanism Study 3: The Effect of Soaking of Steel Cut Oat on its Mechanical Properties The effect of soaking steel-cut oak was studied by the inventors. FIG. 5 and Table shows the results of compression testing on dry (un-soaked) steel cut oat vs. soaked steel cut oat (soaking in hot water);

As can be seen in FIG. 5, the steel cut oat without soaking water is clearly more brittle and less compressible than steel cut oat that has been soaked in hot water. The steel cut oat without soaking had cracking and breaking apart when the compression rate reached 27% (compressing 0.47 mm depth of a 1.78 mm thick steel cut oat). On the other hand, the steel cut oat soaked in hot water (80° C., 2 hour) became softer, sticky and paste-like. The soaked steel cut oat did not have cracking or breaking apart throughout the compression (compression between 0%-90% during the test).

This revealed that starch containing grains can be broken apart into smaller pieces by compression force, which was abundant during extrusion process.

Treating the starch containing grains with hot water can soften the grains and help to prevent the grains to be broken apart into smaller pieces by compression or extrusion.

TABLE XI

The effect of soaking of steel cut oat on its mechanical properties

| | Thickness (mm) | Peak positive force (g) | Cracking point (mm) | Compressible rate |
|---|---|---|---|---|
| Dry steel cut oat | 1.78 | 18090 | 0.47 | 27% |
| Soaked steel cut oat | 2.09 | 3261 | Not exist | 100% |

As a summary to compare the soluble starch content, washable starch content, starch solubility and starch washability properties when the protein contents are the same, the inventors reviewed and categorized the results and calculated the changes of those values. In Table XII, the S1, S3, S4, S5 and S6 have the same ingredient and extrusion conditions as in Sample #1, Sample #2, Sample #6, Sample #11 and Sample #13. The S2 had the same ingredients as Sample 2 #, but it had different extrusion conditions. In S2, the steel cut oat was not soaked in hot water before the extrusion, and the shocking heat was achieved by using hot water (60° C.) liquid feed and extruder temperature profile of 100-125-160-145-130 (° C.) at zone 2-3-4-5-6.

Table XII shows that, the S2 had 52% higher starch solubility and 63% higher starch washability than S1. These differences are attributable to the shock heating and ingredient differences (e.g. usage of steel cut oat). The S3 with steel cut oat, soaking and shock heating has even higher starch solubility and starch washability. When the pea protein content was decreased from 90% to 70%, the influence of ingredients (e.g. usage of steel cut oat) and shock heating was even larger. The S6 has 261% higher starch solubility and 58% higher starch washability than S4. The starch solubility and starch washability of S5 were not as high as S6, due to the difference of shock heating.

TABLE XII

The effect of extrusion condition and ingredient on the
soluble starch content, washable starch content,
starch solubility and starch washability properties

| | Recipe | Shock heating | Proportion in the extruded product | | Proportion in the total starch | | Textural quality |
|---|---|---|---|---|---|---|---|
| | | | Soluble starch | WASHABLE starch | Starch solubility | Starch washability | |
| S1 | 5% oat flour + 90% pea protein | Yes | 0.026% | 0.075% | 3.4% | 9.9% | Not acceptable |
| S2 | 5% steel cut oat + 90% protein | Yes | 0.039% | 0.123% | 5.2% | 16.2% | Acceptable |
| | Increase = 100% × (S2 − S1)/S1 | | 52% | 63% | 52% | 63% | |
| S3 | 5% steel cut oat (soaked before extrusion) + 90% pea protein | Yes | 0.096% | 0.410% | 8.4% | 36.0% | Acceptable |
| | Increase = 100% × (S3 − S1)/S1 | | 270% | 444% | 147% | 263% | |
| S4 | 30% oat flour + 70% pea protein | Yes | 0.097% | 0.463% | 2.1% | 10.1% | Not acceptable |
| S5 | 5% steel cut oat + 70% pea protein + 24% oat flour | No | 0.179% | 0.652% | 4.1% | 14.8% | Not acceptable |
| S6 | 5% steel cut oat + 70% pea protein + 24% oat flour | Yes | 0.340% | 0.706% | 7.7% | 16.0% | Acceptable |
| | Increase = 100% × (S6 − S4)/S4 | | 249% | 53% | 261% | 58% | |

X: Conclusions

The inventors have surprisingly discovered that starch added in the form of starch-containing powder or flour can actually result in gluing up the protein matrix individual parts to form even larger pieces and more intact structure during extrusion processes with and without having long cooling die.

The produced extruded product with starch-containing powder addition also has much more isotropic property and less anisotropic properties (anisotropic fibre structure, anisotropic texture).

The inventors have further discovered that the starch in small particle size can get emulsified into and/or between the protein fibres, become filling material in the protein-based emulsion gel like system, being able to improve the evenness and coverage (area, space, volume) of the distribution of the protein materials. As a result, the proteins can form more isotropic interactions with each other throughout the extrusion process. The starch gelation can also combine different parts of materials to be connected to each other.

The inventors have also discovered that when there was a long cooling die used in the extrusion, such materials with the higher amount of starch-containing powder addition can form a thicker, denser and more isotropic chunk having a certain fibrous structure. When there was no cooling die used in extrusion, such materials with higher amount of starch-containing powder addition could form larger connective lumps (pieces) of extruded product without having a fibrous structure.

The inventors have also discovered that the protein matrix hardening problem can be prevented or at least delayed further when starch-containing grains are added to the protein materials and extruded as described in the attached method claims.

Without willing to be bound by any theory, and with regarding to the very limited amount of knowledge in this field, the inventors found and have one possible explanation that the starch-containing grains get broken into smaller parts in a much slower speed when their particle size are bigger than regular starch-containing powders. Furthermore, the broken grain parts do not get easily emulsified by protein matrix. The broken grain parts can still get gelatinized with sufficient heat, shearing and water. Furthermore, the naturally existing grain cell wall structure and materials can restrict the complete-leaching, aligning and retrogradation of the starch molecules.

The naturally existing grain cell wall structure and the gelation effect of the gelatinized starch can also prevent the complete powdering of the grains into small particles (e.g. particle size below 100 μm). As a result, a significant amount of gelatinized starch clusters are formed and kept remaining throughout the whole extrusion process and in the end-product.

The inventors surprisingly found out that at least some of these clusters can be washed out from the extruded product by warm water (50° C.) without needing to further gelatinize the starch, when the extruded products are chopped into thin slices but not necessarily completely breaking the protein fibres. These starch clusters have much larger particle size than the starch in the traditional process, which is the individual being homogenized and emulsified in the protein matrix in traditional production. These starch clusters are often larger than 100 μm in at least one of their dimensions. As a result, these starch clusters can behave like large particles that separate protein fibres far apart from each other and, hence, prevent the formation of hydrogen bond type protein-protein interaction and the texture hardening.

The large starch cluster as large particles also often result in forming holes (cavities) or empty spaces beside them. This might be because of the flow behaviour of the extruded material during the extrusion and the protein fibre strength, allowing the protein fibres to flow far apart from each after meeting the large particle barrier formed by starch cluster. Then, after a while of continuing flowing apart from each other, the beams of protein materials (protein fibres) get close and form interaction to each other again. Within this period of protein flowing apart from each other, there is an empty space formed behind the starch cluster large particles. The protein fibres being separated by the empty space cannot form hydrogen bonds. The inventors believe that this may contribute to the improved mouthfeel being sustained longer even in the cooled or chilled meat replacement product.

Furthermore, the inventors have found out that the earlier the starch in the grains will be gelatinized before it is emulsified by protein matrix, and the higher concentration of the gelatinized starch cluster is, the formation of a continuous protein matrix can be prevented to a higher extent. Without willingness to be bound to any theory, the inventors have one explanation as that the gelatinized starch clusters that are not emulsified with the protein matrix are immiscible with the protein phase and can thus get phase separated from the protein phase, and can thus form a rather large connective phase, and can disrupt the protein-protein interaction formation, so they can, to certain extent, prevent the formation of continuous protein fibrous matrix. This explanation was in good agreement with the test results in the mechanism study experiments that will be described below in the selected examples. The observed differences between the number of Samples examined by the inventors appear to support this explanation, too.

After the formation of the gelatinized starch clusters, the melting, crosslinking and gelation of the protein materials should be induced within a certain window of short time. If this is happened too late, there can be two kinds of unacceptable consequences, namely, (1) the gelatinized starch clusters get eventually homogenized, broken apart, and emulsified with the protein matrix, especially possibly when the quantity of the starch containing grains are added in small quantity, or the starch containing grains are relatively easier to break apart, while the starch-containing powder content in the ingredient is high; (2) the gelatinized starch clusters completely prohibit the formation of long continuous protein fibre structure by excessively dividing and covering the protein materials into individual clusters, and prevent the protein-protein coagulation, aggregation and gelation, especially possibly when the quantity of the starch containing grains are added in large quantity, while the starch-containing powder content in the ingredient is low.

Additionally, the inventors found out that the starch containing grains are more easily ground into powders in the extruder when they are added into the extruder without being soaked in hot water, or without being mixed with hot water in the very early phase (e.g. between 0 sec and 15 s, preferably between 1 s and 15 s after being fed into the extruder) in the extrusion. In this way, the starch containing grains behave similarly as their flours, which have the same chemical compositions but smaller particle size and a broken cell wall structure.

In contrast, the starch contacting grains being soaked in hot water before being extruded, and the starch containing grains being mixed with hot water in the very early phase (e.g. between 0 s and 15 s, preferably between 1 s and 15 s after being fed into the extruder) in the extrusion, will be much less brittle, more extendable and, hence, less easily emulsified by the protein matrix, and more easily remained as large particles throughout the extrusion. Therefore, this is one part of the reasons for the importance and essence of having the shock heating set-up of extrusion condition to be used together with the use of starch-containing grains in the ingredient for extrusion in order to produce acceptable quality extruded product.

The inventors have also surprisingly found out that the meat replacement product manufactured with the high moisture protein texturization extrusion can have a clearly higher level of Extrusion Expansion Rate soon after the extruded product exiting the extruder long cooling die, when it is produced with the methods as described in the attached method claims.

The high Extrusion Expansion Rate can be clearly visible during the extrusion, when the extruded product at one second after coming out from the extruder long cooling die, which clearly have air bubbles inside the expanded structure and have much larger thickness (for example, 200%-600% more) than its original thickness just before exiting the extruder long cooling die (the original thickness is approximately the same as the height of the opening hole of the extruded long cooling die). The expanded structure may be mostly collapsed after the extruded products get cooled down. However, there are still more cavities (in other words, air pockets) structure units remained in the cooled extruded products. This difference can be an advantage belonging to the formation of gelatinized starch clusters without having them being emulsified by the protein matrix, which are produced with the methods as described in the attached method claims.

The gelatinized starch can result in larger expansion rate in high moisture extrusion. The increased expansion rate can be attributable to the decreased structure firmness and to the decreased viscosity of the extruded material.

In contrast such Extrusion Expansion phenomenon is substantially absent or, in other words, cannot be detected in such tested processing methods that do not use the starch containing grains or do not have shock heating set up in extrusion condition. These processing methods that fail to produce the products that have texture close to cooked chicken thigh meat were found to produce extruded products that tend to have a denser and more compact structure (the thickness at one second after coming out from the extruder long cooling die is 0%-199% more than its thickness just before exiting the extruder long cooling die), and have clearly less cavity structure units (in other words, air pockets) remaining after being cooled. During high moisture extrusion, starch containing flours can cause a higher amount of leached starch, more water absorption and higher viscosity increase than the starch containing grains do. These are found in agreement with the observation during the extrusion tests, and in agreement with the mechanism study experiment that cooking the starch containing materials in water in autoclave.

The inventors have surprisingly found out that, for the extruded products that are produced with the methods as described in the attached method claims, there are more starch molecules that can be solubilized out from the extruded product by warm water (50° C.), when the extruded products are chopped into thin slices but not necessarily completely breaking the protein fibres. The 50° C. temperature is below the gelatinization temperature of the starch. Normally, native (non-gelatinized) starch is insoluble in 50° C. water. Pregelatinized starch and some modified starch can be soluble in 50° C. water before they are extruded through high moisture protein texturization extrusion for meat replacement production, but they lose solubility after the extrusion process as they are emulsified with the protein matrix soon after being extruded with the protein materials.

The solubilized starch in extruded product as described here and below is soluble washable starch, which is a part of the washable starch. As compared to the insoluble washable starch, the soluble starch (soluble washable starch) are more completely gelatinized, more leached out from (free from restriction of) the starch granule shell and grain cell wall structures, have more affinity to water, and have more expanded structure (such as volume and surface area) of their molecules. The soluble starch is even less affinitive to the protein matrix, and even less tightly embedded or captured by the long continuous protein fibre structure. The soluble starch is more immiscible with the protein phase, so it more completely separated out from protein phase by phase separation. The soluble starch is a main component to coat the inner wall of said cavities (air pockets) of the acceptable extruded products. The soluble starch compounds are a main component and main sites that occur Extrusion Expansion and generate cavities. The coating materials of the inner wall of the cavities in acceptable quality extruded products can be seen by visual observation and microscopic observation after being stained by diluted iodine solution. The coating materials turn to dark blue colour or black colour after being stained, which indicates a high concentration of starch. The cavities coated with gelatinized starch clusters also act as a novel kind of disruptive compounds that prevent further formation of protein-protein interaction (e.g. hydrogen bonds) between the protein fibres after extrusion. The cavities coated with gelatinized starch clusters are different from and perform better than other known disruptive particles such as starch, flour, insoluble salt, dietary fibre, for example, apparently because the starch clusters keep protein fibres far apart from each other in a volume that is bigger than the size of the individual particles.

There is no background art teaching about the role and effects of soluble starch, washable starch, insoluble washable starch, starch solubility, starch washability in meat replacement products having long continuous protein fibrous structure produced by high moisture protein texturization extrusion, neither in low moisture protein texturization extrusion. There might be some studies concerning the starch solubility in starch extrusion methods that mainly process starch ingredient for starchy food and have very different configuration from protein texturization extrusion. However, starch solubility has been highly correlated with breadcrumb staling and textural qualities. For example, Boyacioglu and D'Appolonia [Ref 5] reported that breadcrumb being staled (stored, aged) over four days can have constant, progressive and clear decrease of starch solubility along with constant clear increase of firmness value; soluble starch content was recommendable to be used to measure the rate and degree of staling, because decreased soluble starch content indicates increased breadcrumb staling and firming; staled breadcrumb samples that had the higher amount of soluble starch had the lower rate of increase of firmness value. In the breadcrumb, the decrease of starch solubility indicates the increase of retrogradation rate of starch molecules. The starch retrogradation is a well-known factor that commonly results in leathery mouthfeel and hard texture of starch containing foods such as bread. It happens the most rapidly at temperatures just above the freezing point (e.g. between 0° C. and 6° C.). Starch retrogradation is partially caused by starch amylose and amylopectin molecule recrystallisation and is a result of an increase of formation of starch-starch hydrogen bonds, and a decrease of starch-water affinity. The connective thinking between the knowledge about starch solubility behaviour in the meat replacement products produced by high moisture protein texturization extrusion and that about the breadcrumb is possible but non-obvious. The meat replacement products produced by high moisture protein texturization extrusion have a completely different ingredient recipe, structure, and microstructure from breadcrumbs. The process and structure formation mechanism of protein texturization extrusion and bread baking are also completely different, though.

The inventors surprisingly found out that meat replacement products manufactured with high moisture protein texturization extrusion and having a low starch solubility and low starch washability have their starch mostly evenly homogenized and emulsified with the protein matrix. With microscopic observation, the emulsified starch in said products was found out to be linearly aligned such that the starch particles were in parallel with each other. The protein fibres tightly cover and capture the starch compounds. The starch compounds are completely leached. The original starch granule structure has substantially disappeared. Therefore, the starch can undergo severe retrogradation. These findings were in agreement with the results that those samples had low starch solubility, had more severe hardening during a 5-hour storage time, had much worse compressibility after being overnight stored, and had much worse ability to get expanded by cooking in water in autoclave. In contrast, the meat replacement products with a substantially high starch solubility and starch washability were found to have better textural properties (good compressibility, good expansion properties, mouthfeel close to chicken thigh meat).

The starch solubility and starch washability are even more important than the soluble starch content and the washable starch content. The starch solubility and starch washability are calculated as the proportion of the soluble starch content and the washable starch content to the total amount of starch in the extruded product. The soluble starch and washable starch contribute positively to the quality (e.g. mouthfeel) of the extruded product. In contrast the higher percentage and higher quantity of insoluble starch and unwashable starch can result in worse quality (e.g. mouthfeel) of the extruded products, because the insoluble starch and unwashable starch are relatively more completely emulsified, captured, embedded in the protein matrix, and have more retrogradation.

With regarding to this background art and the new findings by the inventors, there exists a reason to believe in the importance of monitoring and controlling the level of soluble starch content, washable starch content, starch solubility and starch washability in meat replacement products manufactured with high moisture protein texturization extrusion.

The methods to control and to improve the starch solubility and starch washability in meat replacement products produced by high moisture protein texturization extrusion was not locatable in the background art but is disclosed in the description below.

The inventors have found out that when a meat replacement product that has been manufactured in an extruder configured to carry out high moisture protein texturization extrusion comprises a continuous proteinaceous fibrous matrix structure that is substantially linearly oriented and has disruptions forming cavities, wherein the cavities have walls that are at least partly coated with gelatinized starch clusters, the mouthfeel tends to remain acceptable for a prolonged period.

A decrease of starch solubility (e.g. in water at 50° C.) and an increase of starch retrogradation are known as important factors inducing texture firming of foods such as bread crumb containing starch gel structure. See References (a) SOHOCH, T. J.; FRENCH, D. 1947. Studies on bread staling. 1. The role of starch. Cereal Chemistry, 24: 231-249; (b) T. Inagaki and P. A. 1992. Firming of Bread Crumb with Cross-Linked Waxy Barley Starch Substituted for Wheat Starch. Cereal Chem 69:321-325; (c) K. Ghiasi, R. C. Hoseney, and D. R. Lineback. 1979. Characterization of Soluble Starch from Bread Crumb. Cereal Chem 56:485-490.

Alternatively or in addition, the gelatinized starch clusters contain starch that is not emulsified with the proteinaceous fibrous matrix structure (non-emulsified starch). The advantages resulting from this are that: (1) An increase of percentage of non-emulsified starch results in a decrease of percentage of emulsified starch. The non-emulsified starch does NOT behave like fillers that fill-up the gap between the protein fibres and strengthen the overall extrudate structure, while the emulsified starch does; (2) the non-emulsified starch is less aligned (has less order or molecules) than the emulsified starch does, and hence has less and/or delayed starch retrogradation, and has improved softness throughout prolonged storage time at temperature above freezing temperature (e.g. between 0° C. and 6° C.); (3) the non-emulsified starch disturbs the alignment of the proteinaceous fibrous matrix structure, and therefore improves its softness throughout prolonged storage time at temperature above freezing temperature (e.g. between 0° C. and 6° C.) by reducing and/or delaying hydrogen bond formation between the molecules in the extrudate (e.g. protein-protein, starch-starch).

Alternatively or in addition, the meat replacement product may have been manufactured using a high moisture protein texturization extrusion method in which starch containing grains are gelatinized, and the proteins forming the proteinaceous matrix are melted:
(a) before the gelatinized starch containing grains form an emulsion with the proteins of the proteinaceous matrix, and
(b) before the gelatinized starch forms a complete barrier that prohibit the formation of continuous proteinaceous fibrous crosslinking matrix. The advantage resulting from this is that: the extruded material is in this way controlled in a good balance between (a) sufficient formation of protein-protein crosslinking for forming continuous protein fibre; and (b) prevention of crosslinking formation by gelatinized starch. As a result, the extrudate can have chewiness that is within certain threshold range (cutting force above 300 g) and simultaneously have compressibility that is within certain threshold range (compression force below 17500 g). If the protein melting is not achieved before the formation of emulsion between the gelatinized starch containing grains and the proteins material, the emulsification may still be achieved by continuous shearing, tearing and homogenization of the protein-starch mixture, then the starch become emulsified and unable to prevent the unwanted increase of interaction forces (e.g. hydrogen bonds) and hardening of the extrudate (e.g. compression force become above 17500 g). On the other hand, if the protein melting is not achieved before the gelatinized starch forms a complete barrier that prohibit the formation of continuous proteinaceous fibrous crosslinking matrix, then there will be lack of protein-protein crosslinking. As a result, the chewiness will be too low and NOT be within the threshold range (cutting force above 300 g).]

The extrusion step may be performed with an extrusion die having a length of above 300 mm, preferably above 1000 mm. The advantage resulting from this is that: this kind of die is a typical set-up for carrying out high moisture protein texturization extrusion. This die allows the extruder to handle extrusion cooking of materials having moisture content above 40% to form texturized (crosslinking) structure before the materials exit the extruder. This die also allows the melted protein material to be aligned into long continuous fibrous structure.]

Preferably, the heating step d) is performed at preferably between 140° C. and 200° C. The advantage resulting from this is that: this temperature allows the protein to melt, denature, form gels and form protein-protein crosslinking that are needed for forming long continuous fibrous structure.

Preferably, the mechanically processed starch containing grains comprise or consist of one or more of the following: oat, barley, rye, wheat, rice, corn, lentil, chickpea, mung bean, faba bean, pea, quinoa, pigeon peas, sorghum, buckwheat. The advantage resulting from this is that: these grains are commercially available, contain considerable amount of starch, are known as palatable and nutritious, and are wildly used in different other food applications.

Alternatively or in addition, the heating step d) is preferably performed such that protein melting occurs between 1 s and 40 s, preferably between 10 s and 30 s after step b). The advantage resulting from this is that: in this way, the proteins forming the proteinaceous matrix are melted:
(a) before the gelatinized starch containing grains form an emulsion with the proteins of the proteinaceous matrix, and
(b) before the gelatinized starch forms a complete barrier that prohibit the formation of continuous proteinaceous fibrous crosslinking matrix.

The time needed for the extruder to break the grains (e.g. rolled oats, steel cut oat, rice) into powders were observed in the tests.

Alternatively or in addition, the heating step c) is performed such that starch gelatinization occurs between 0 s and 18 s, preferably between 1 s and 15 s. The advantage resulting from this is that: in this way, the heating step c) can be preferably performed before the starch containing grains are ground by the extruder screw to a volume-per-particle less than 5 000 µm', and preferably before the starch containing grains are ground by the extruder screw to a volume-per-particle less than 0,001 $mm^3$. Gelatinized starch clusters having volume-per-particle larger than 5 000 µm3 are starch that are not emulsified, bigger than those emulsified starch and can provide much more disruption forces to prevent too excessive protein-protein interaction force formation and, hence, can prevent hardening of the extrudate during storage.

Preferably, after the heating step d) extruding of the mixture is continued at temperature not higher than that in the heating step c), preferably between 90° C. and the temperature in heating step d), for more than 5 s, preferably for more than 10 s. The advantage resulting from this is that: the level of heating like this, can induce a good balance between (a) a sufficient formation of protein-protein crosslinking structure (forces) to provide acceptable chewiness (cutting force above 300 g), and (b) having acceptable compressibility (compression force below 17500 g). Higher temperature can result in too much crosslinking formation and, therefore, poor compressibility. Temperature lower than 90° C. can result in too weak structure that is lack of co-aligned long fibrous structure and poor in chewiness.

XI—Summary

To improve the mouthfeel of a meat replacement product, improvements to meat replacement products and high moisture protein texturization extrusion have been invented. The inventors have discovered that selecting the extrusion parameters and starting materials containing mechanically processed starch-containing grains suitably, the formation of an emulsion between the starch and proteinaceous matrix forming protein melt can be prevented or reduced to such an extent that there exists a substantial amount of starch that is not bound in the protein matrix. The presence of starch not bound in the protein matrix has been observed to improve the mouthfeel and sustaining an acceptable mouthfeel for a prolonged period. The patent application contains a number of independent claims for meat replacement products and methods.

Summary of Previous Work

The specific examples disclosed above in the chapter "Previous Work" are disclosed in co-pending international application PCT/EP2019/068926, unpublished at the time of writing and scheduled to be published on Jan. 21, 2021 under publication number WO 2021/008680 A1, the contents thereof are incorporated herein by reference. To summarize:

The mouthfeel of a meat replacement product manufactured with high moisture protein texturization extrusion can be improved such that the improved mouthfeel is comparable with that of cooked chicken thigh meat, and, which improved mouthfeel is further sustained for a prolonged period, such as, overnight, or for 24 h, for example, without the need to freeze the meat replacement product.

The mouthfeel can be assumed to be comparable with cooked chicken thigh meat when the linear compressibility of a sample is relatively high, and the cylindrical compressibility is relatively low. The linear compressibility is preferably between 300 g and 1500 g when measured with a Stable Micro Systems, Inc., Surrey, United Kingdom, texture analyser model TA.XTPlus equipped with a 294.2 N (30 kg) load cell (detector sensor) and a sharp knife blade. The cylindrical compressibility is preferably between 7000 g and 17500 g when measured with a Stable Micro Systems, Inc. texture analyser TA.XTPlus equipped with a 294.2 N (30 kg) load cell (detector sensor) with a cylinder shape probe (model "P/36R", 36 mm Radius Edge Cylinder probe—Aluminium—AACC Standard probe for Bread firmness). For the measurements, samples having a height between 7.0 and 12.0 mm should be used. The width and length of the sample is preferably chosen to be 40 mm. FIG. 11 illustrates the cutting force and compression force analysis methods that preferably should be used.

Alternatively, the mouthfeel of a meat replacement product can be said to be comparable with that of cooked chicken thigh meat when the experienced compressibility and chewing characteristics are by a group of test persons identified to resemble cooked chicken thigh meat.

Further, starch solubility in a meat replacement product manufactured with high moisture protein texturization extrusion can be increased.

Starch solubility in a meat replacement product manufactured with high moisture protein texturization extrusion can be controlled.

A meat replacement product manufactured with high moisture protein texturization extrusion and comprising an extrudate having a continuous proteinaceous fibrous matrix structure that is substantially linearly oriented, the extrudate comprising starch, of which starch at least 5.1%, preferably at least 5.2%, is soluble starch, shows an improved mouthfeel which is sustained for a prolonged period.

Respectively, a meat replacement product which shows an improved mouthfeel which is sustained for a prolonged period can be manufactured with a manufacturing method using an extruder that is configured to carry out high moisture protein texturization extrusion in which starch containing grains are gelatinized and the proteins forming the proteinaceous matrix are melted such a meat replacement product that is an extrudate having a continuous proteinaceous fibrous matrix structure, the extrudate comprising starch, of which starch at least 5.1%, preferably at least 5.2% is soluble starch.

The soluble starch is preferably located in disruptions of the matrix structure and not emulsified with it. Most preferably, some of the disruptions in the matrix structure are in form of cavities that have walls that are at least partly coated with gelatinized starch clusters formed with starch, preferably with soluble starch.

According to a second aspect, which is alternatively to the previous aspect or in addition to it, a meat replacement product manufactured with high moisture protein texturization extrusion and comprising an extrudate having a continuous proteinaceous fibrous matrix structure that is substantially linearly oriented, the extrudate comprising starch, such that: in the extrudate,
  i) at least 10.5% of the starch is washable starch when the protein content of the extrudate is larger than 55% but smaller than 70% weight-%,
  ii) at least 15% of the starch is washable starch when the protein content of the extrudate is at least 70% but smaller than 90% weight-%,
  iii) at least 16% of the starch is washable starch when the protein content of the extrudate is at least 90% but equal to or smaller than 99% weight-%,
  wherein the weight-% indicated are on a dry basis,
shows an improved mouthfeel which is sustained for a prolonged period.

Respectively, a meat replacement product which shows an improved mouthfeel which is sustained for a prolonged period can be manufactured with a manufacturing method using an extruder that is configured to carry out high moisture protein texturization extrusion in which starch containing grains are gelatinized and the proteins forming the proteinaceous matrix are melted, a meat replacement product that is an extrudate having a continuous proteinaceous fibrous matrix structure, the extrudate comprising starch, such that: in the extrudate,
  i) at least 10.5% of the starch is washable starch when the protein content of the extrudate is larger than 55% but smaller than 70% weight-%,
  ii) at least 15% of the starch is washable starch when the protein content of the extrudate is at least 70% but smaller than 90% weight-%,
  iii) at least 16% of the starch is washable starch when the protein content of the extrudate is at least 90% but equal to or smaller than 99% weight-%,
  wherein the weight-% indicated are on a dry basis.

Preferably, the washable starch is located in disruptions of the matrix structure and not emulsified with it. Most preferably, some of the disruptions in the matrix structure are in form of cavities that have walls that are at least partly coated with gelatinized starch clusters formed with washable starch. Washable starch is washable in water having a temperature of 50° C., which is below the gelatinization temperature of starch.

According to a third aspect, which is alternatively to the first and second aspects or in addition to one or both of them, a meat replacement product manufactured with high moisture protein texturization extrusion and comprising an extrudate having a continuous proteinaceous fibrous matrix structure that is substantially linearly oriented, the extrudate comprising starch,
and wherein the extrudate has been manufactured using a high moisture protein texturization extrusion method in which starch containing grains are gelatinized and the proteins forming the proteinaceous matrix are melted, such that:

the starch-containing grains were gelatinized before they got substantially powdered by the extruder screw, shows an improved mouthfeel which sustains for a prolonged period.

Respectively, a meat replacement product which shows an improved mouthfeel which is sustained for a prolonged period can be manufactured with a manufacturing method using an extruder that is configured to carry out high moisture protein texturization extrusion in which starch containing grains are gelatinized and the proteins forming the proteinaceous matrix are melted by producing a meat replacement product that is an extrudate having a continuous proteinaceous fibrous matrix structure, the extrudate comprising starch, wherein: the step of heating slurry in the extruder is performed as a such heating, such that the starch containing grains are gelatinized before they get substantially powdered by the extruder screw.

The manufacturing method of the meat replacement product increases starch solubility and, respectively, the meat replacement product has an increased starch solubility.

According to a fourth aspect, which is alternatively to the first, second and third aspects, or in addition to one, two or all of them, a meat-replacement product manufactured with high moisture protein texturization extrusion and comprising an extrudate having a continuous proteinaceous fibrous matrix structure that is substantially linearly oriented, the extrudate comprising starch, and wherein: the extrudate has been manufactured using a high moisture protein texturization extrusion method in which starch containing grains are gelatinized and the proteins forming the proteinaceous matrix are melted, such that:

the proteins are melted:
(a) before the gelatinized starch containing grains form an emulsion with the proteins of the proteinaceous matrix,
and
(b) before the gelatinized starch forms a complete barrier that prohibit the formation of continuous proteinaceous fibrous crosslinking matrix, shows an improved mouthfeel which is sustained for a prolonged period.

Respectively, a meat replacement product which shows an improved mouthfeel which is sustained for a prolonged period can be manufactured with a manufacturing method by producing, with an extruder that is configured to carry out high moisture protein texturization extrusion in which starch containing grains are gelatinized and the proteins forming the proteinaceous matrix are melted, a meat replacement product that is an extrudate having a continuous proteinaceous fibrous matrix structure, the extrudate comprising starch, such that the proteins forming the proteinaceous matrix are melted:

(a) before the gelatinized starch containing grains form an emulsion with the proteins of the proteinaceous matrix,
and
(b) before the gelatinized starch forms a complete barrier that prohibit the formation of continuous proteinaceous fibrous crosslinking matrix.

The manufacturing method of the meat replacement product enables the control of starch solubility and, respectively, the meat replacement product can have a controlled starch solubility.

According to a fifth aspect, which is alternatively to the first, second, third, and fourth aspects, or in addition to one, two, three or all of them, a meat replacement product manufactured with high moisture protein texturization extrusion and comprising:

an extrudate having a continuous proteinaceous fibrous matrix structure that is substantially linearly oriented, the extrudate comprising starch which is located in disruptions of the matrix structure and not emulsified with it, shows an improved mouthfeel which is sustained for a prolonged period.

Respectively, a meat replacement product which shows an improved mouthfeel which is sustained for a prolonged period can be manufactured with a method using an extruder that is configured to carry out high moisture protein texturization extrusion in which starch containing grains are gelatinized and the proteins forming the proteinaceous matrix are melted, a meat replacement product that is an extrudate having a continuous proteinaceous fibrous matrix structure, the extrudate comprising starch which is located in disruptions of the matrix structure and not emulsified with it.

The manufacturing method of the meat replacement product increases starch solubility and, respectively, the meat replacement product has an increased starch solubility.

Particularly advantageously, some of the disruptions in the matrix structure may be in form of cavities that have walls that are at least partly coated with gelatinized starch clusters formed with starch, preferably with soluble starch or washable starch.

The advantage resulting particularly from the fifth aspect is that the disruptions and especially the cavities at least partly (preferably fully) coated with starch clusters (and the phase-separate-out starch clusters) prevent the hardening (resulting from gel hardness strengthening) of the extrudate. The disruptions formed by and cavities at least partly coated with starch clusters (and the phase-separate-out starch clusters) act as a novel kind of a disruptive compounds that prevent the further formation of protein-protein interaction between the protein fibres after extrusion. They are different from and better than other disruptive particles known to the inventors such as starch, flour, insoluble salt, dietary fibre, pregelatinized starch, gas which either (a) disappear (e.g. gas) after extrusion, or (b) will be emulsified by the protein matrix (e.g. insoluble salt, dietary fiber, flour, starch) during extrusion, or (c) become a factor that speed up or worsen the deterioration (hardening) of the extrudate (e.g. starch retrogradation effect, starch gel staling referring to realignment of starch amylose and amylopectin molecules and so-caused re-crystallisation, which commonly result in a leathery mouthfeel and hard texture of starch-containing foods such as bread. These phenomena take place most rapidly at temperatures just above freezing).

According to a sixth aspect, which is alternatively to the first, second, third, fourth and fifth aspects, or in addition to one, two, three, four or all of them, a meat replacement product which shows an improved mouthfeel which is sustained for a prolonged period can be manufactured with a manufacturing method by:

a) feeding into an extruder that is configured to carry out high moisture protein texturization extrusion a mixture comprising:
a1) at least one proteinaceous matrix forming ingredient, such as protein isolate or protein concentrate and a2) mechanically processed starch containing grains having a particle volume of at least 0,125 mm3, preferably at least 1 mm3, most preferably at least 6 mm3;
b) feeding water into the extruder;
c) heating the mixture in the extruder to gelatinize the starch containing grains;
d) after reaching the starch gelatinization, further heating the mixture in the extruder to melt the at least one proteinaceous matrix forming ingredient; and
e) extruding the mixture through an extrusion die at temperature between 70° C. and 100° C.

wherein:
i) the heating step c) is performed as shock heating such that the starch containing grains are gelatinized before they get substantially powdered by the extruder screw;
and
ii) the heating step d) is performed as shock heating such that the protein melting temperature of the proteinaceous matrix forming ingredient will be achieved:
(a) before the gelatinized starch forms an emulsion with the proteinaceous matrix forming ingredient, and
(b) before the gelatinized starch forms a complete barrier that prohibit the formation of continuous proteinaceous fibrous crosslinking matrix.

"Particle volume" and "volume-per-particle" are terms that describe the size of the particle. They can be calculated on basis of the dimensions of the particles, such as, for example:
when the particles are mostly close to cuboid shape, their particle volume can be calculated as length times width times thickness;
when the particles are close to sphere, the particle volume can be calculated with the diameter value of the particle. For example, the Dv0.5 value in regular particle size distribution analysis methods can be used for calculating the average value of the particle size (diameter).

A particle volume of at least 0,125 mm$^3$ indicates that the average volume of a particle is 0.125 mm$^3$. A typical commercial oat flour has particle size diameter smaller than 0.300 mm as measured by sieving, from which it can be calculated that the average particle volume is not more than 0.014 mm$^3$.

Traditionally, in high moisture protein texturization extrusion, a heating temperature profile that has a progressive increase of temperature in the extruder from the material feeding side to the other end of the screw chamber is used, because the protein melting is expected to happen in the end of the extruder, the ingredients progressively absorbing heat and increasing their temperature. With the present concept of shock heating, the materials in the extruder to be heated to target temperature are heated substantially faster, best if within a few seconds after they are fed into the extruder, which is before they are conveyed to the last part of the extruder screw chamber.

Preferably, the water is fed to the starch containing grains at an elevated temperature. The specific heat capacity of water is about 220% higher than that of the protein powder and flours. So feeding water at elevated temperature can heat up the materials in the extruder to reach the target temperature within a substantially shorter time.

Preferably, the starch containing grains are handled before feeding into the extruder such that the starch is gelatinized before feeding into the extruder, in such a manner that the size (particle volume) of the grains remains at least the same or even increases.

The inventors have observed a permanent co-incidence of the five first aspects in the studied samples that have an improved mouthfeel. Furthermore, the objective of the invention can be solved with the method according to the sixth aspect.

Common for the meat replacement products and methods according to any of the aspects is that the extrudate is an extrudate manufactured using a high moisture protein texturization extrusion method, preferably with a twin-screw extruder having a long cooling die (the cooling die preferably has a length of above 300 mm, most preferably above 1000 mm). In the extrusion, mechanically processed starch containing grains are processed with at least one protein isolate/concentrate/combination of such, oil, and spices to make a slurry which is then extruded.

The term "mechanically processed" refers to flakes—such as compressed, rolled, or flaked-, steel cut grains, dehulled and pearled, crushed grains, or dehulled but not pearled grains, however excluding: dehulled but not pearled oat grains, dehulled but not pearled rye grains, dehulled but not pearled barley grains, dehulled but not pearled corn grains.

The mechanically processed starch containing grains preferably comprise or consist of one or more of the following: oat, barley, rye, wheat, rice, corn, lentil, chickpea, mung bean, faba bean, pea, quinoa, pigeon peas, sorghum, buckwheat, however excluding: dehulled but not pearled oat grains, dehulled but not pearled rye grains, dehulled but not pearled barley grains, dehulled but not pearled corn grains.

The meat replacement product is preferably processed further such that it can be sold in the form of chunks, chops, nuggets, fillets, steaks, or in doner meat-like slices, or in the form of a doner kebab-like layer-wise stratification layers in yoghurt or vegetarian yoghurt and spices.

The use of insoluble washable starch in cluster form in food products may open interesting possibilities for the food industry.

The inventors have observed with a microscope equipped with polarized light that the starch in the extruded product does not have the "Maltese cross" feature that the starch used to have before it was extruded or soaked in hot water. This shows that the starch in the extruded product is gelatinized.

The protein fibrous matrix structure of the chopped extruded product remained insoluble and unbroken after being examined with the starch washability test. The protein fibrous matrix structure of the meat replacement product also remained insoluble and unbroken after being cooked in water in autoclave at 110° C. for 10 min. The cutting force of the autoclave cooked meat replacement product remained between 40% and 50% of that before the autoclave cooking. These are important differences to the properties of products produced by other extrusion methods than high moisture protein texturization extrusion. Products produced by other extrusion methods normally can substantially dissolve, soften or collapse after being cooked in water or after being soaked in warm water overnight.

According to a further aspect, the method for manufacturing a meat replacement product with high moisture protein texturization extrusion can be improved by selecting the extrusion parameters and starting materials containing at least i) one protein ingredient—which preferably is a protein isolate or a protein concentrate or a mixture thereof—ii) mechanically processed starch-containing grains and iii) flour such that the formation of an emulsion between the starch and proteinaceous matrix forming protein melt is substantially prevented or reduced to such an extent that a substantial amount of starch not bound to the proteinaceous matrix is present in the meat replacement product after extrusion.

The extrusion parameters that are controlled preferably include the water feed temperature and/or the heating profile, such as along the extrusion screw and in the cooling die, such that a shock heating of the starting materials in the extruder is obtained.

Advantageously, the stiffness or the compressibility of the meat replacement product is controlled by controlling starch solubility in the meat replacement product. Most advantageously, the starch solubility is controlled such that the linear compressibility is between 300 g and 1500 g and the cylindrical compressibility is between 7000 g and 17500 g. Preferably, the linear and cylindrical compressibility are measured at least 24 h after the extrusion.

Advantageously, the amount of starch not bound to the proteinaceous matrix is determined as the soluble starch. The compressibility is preferably controlled by changing the extrusion parameters such that the proportion of the amount of soluble starch to the total amount of starch (starch solubility) is between 3 weight-% and 10 weight-% in the meat replacement product after extrusion. In this situation, the soluble starch content is between 0.03 weight-% and 1.10 weight-% in the meat replacement product after extrusion.

Present Work—Detailed Description

The inventors to this patent application have continued their work on the Previous Work. A key finding is that steeped grains, germinated grains, malted grains or any combination of two or three of these can be used as one of the ingredients in the extrusion to manufacture meat-replacement food products.

Further, the inventors have discovered that of the Previous Work, the methods and the meat-replacement products disclosed therein can be manufactured using starch-containing grains that are selected in this manner. The inventors suspect that the theory conclusions drawn in the Previous Work to explain the effects are respectively applicable also to the steeped grains, germinated grains, malted grains or any combination of two or three.

Germinated grains are commercially available and mainly used in breweries. They have also been used in bakeries and in the industrial manufacture of biscuits, cereal bars and confectionary. Compared to dry whole grain, germinated grains have the advantages of softer kernel structure, providing new flavours, increasing nutrient content, decreasing content of antinutritive compounds.

Germination is a natural process, which starts when viable and dry seeds imbibed water, and ends with the elongation of the embryonic axis. Upon imbibition, the seed rapidly resumes metabolic activity. The grain biochemical composition was substantially changed. Enzymes degrade storage macromolecules to certain extent, such as starches, proteins. During the germination, the kernel structure is softer and new compounds are developed [Ref 13]. Some of the new compounds are flavour precursors, which participate in forming palatable malt flavour. Almost all nutrients (such as phenolics, phyrosterols, folates and GABA) become fully available, while antinutritive compounds (such as phytate, trypsin inhibitor, tannin) substantially decreased [Ref 14].

Traditional malting process is a controlled germination process for brewing purposes and food application. It comprises 3 steps: steeping, germination and kilning. During steeping, moisture content of the kernel is increased to initiate germination. During germination, conditions are strictly controlled such that enzyme synthesis and kernel modification occurs. The kilning step is to dry the kernel so that the biochemical reactions are stopped or retarded; aroma and flavour compounds are produced; and it is microbiologically stable. After the kilning step, the germinated oats generate a roasted odour and flavour and a sweet taste.

Germinated grains contain functional and/or unchanged starch even after the germination process, even though some of the starch will be degraded in certain amount by degrading enzymes synthesized during germination. The starch degradation of oat germination is much more limited than other common germinated grains, such as barley, rye, wheat, rice, corn, lentil, chickpea, mung bean, faba bean, pea, quinoa, pigeon peas, sorghum, buckwheat, because oat starch granules were the most resistant to α-amylolysis degradation. Therefore, germinated oat is the most preferable choice.

Instead of germinated grains, also steeped grains, and malted grains can be used, either alone or in any combination.

The inventors have tested the invention and found that germinated oat behaves similarly same role as steel cut oat. The germinated oat is preferably dehulled, meaning that the husk is removed. We found out that the husk is hard and difficult to break during extrusion process and it will bring bad mouth feel in the final product.

Instead of germinated grains, malted grains, sprouted grains can be used. In addition, or alternatively, steeped grains may be used. The grains may be whole grains or mechanically processed germinated starch containing grains.

The starch containing grains that are used as steeped/germinated/malted/sprouted preferably comprise or consist of one or more of the following: oat, barley, rye, wheat, rice, corn, lentil, chickpea, mung bean, faba bean, pea, quinoa, pigeon peas, sorghum, buckwheat.

In addition to this, flour and/or bran and/or starch and/or fibre can be used. Preferably the flour is from oat, barley, rye, wheat, rice, corn, lentil, chickpea, mung bean, faba bean, pea, quinoa, pigeon peas, sorghum, buckwheat, potato, sweet potato, lupine or any mixture thereof. Preferably the bran is oat bran, barley bran, wheat bran, rice bran, rye bran, corn bran, millet bran or any mixture thereof. Preferably, the starch is from oat starch, barley starch, rye starch, wheat starch, rice starch, corn starch, lentil starch, chickpea starch, mung bean starch, faba bean starch, pea starch, quinoa starch, pigeon peas starch, sorghum starch, buckwheat starch, potato starch, sweet potato starch, lotus root starch or any mixture thereof. Preferably the fibre is from oat fibre, barley fibre, rye fibre, wheat fibre, rice fibre, corn fibre, lentil fibre, chickpea fibre, mung bean fibre, faba bean fibre, pea fibre, quinoa fibre, pigeon peas fibre, sorghum fibre, buckwheat fibre, potato fibre, sweet potato fibre, lupine fibre, apple fibre any mixture thereof.

Example

Example 9 (Samples #6, #18, GER #19)—Effect of Germinated Oats on the Texture Properties of the Extruded Product The inventors prepared three samples (#6, #18, GER #19) that were processed with high moisture protein texturization extrusion with the extruder 13 shown in FIG. 12B.

Sample #6 was made with the same recipe as sample #6 and contained 70 weight-% pea protein, 30 weight-% oat flour.

Sample #18 contained 70 weight-% pea protein, 20 weight-% oat flour, weight-% steel cut oat.

Sample GER #19 contained 70 weight-% pea protein, 20 weight-% oat flour, 10 weight-% germinated oat.

The mechanical properties of the Samples #6, #18, GER #19 were measured a) within 5 min after extrusion; b) cooled down and stored in sealed bag for 5 h.

The measurement results are shown in Table XIII.

buckwheat, potato, sweet potato, lupine, etc or a mixture thereof. The results are comparable.

Extrusion parameters:
(1) moisture content of the slurry (materials being extruded) during extrusion is approximately 50%;
(2) The compressibility was measured when the extruded products were a) within 5 min after extrusion; b) stored in sealed bag for 5 h;
(3) production rate: approximately 18 kg product made per hour.

The cooling die temperature was 99° C.

TABLE XIII

Texture of Samples #6, #18, GER#19.

| | Ingredient | | | | | | | | Compression force (g) | | |
| --- | --- | --- | --- | --- | --- | --- | --- | --- | --- | --- | --- |
| | | | Mechanically processed | Germinated | Temperature at extruder zone (° C.) | | | | | Immediately after extrusion | Stored in sealed | Texture |
| Sample | Protein | Flour | grain | grain | 2 | 3 | 4 | 5 | 6 | (within 5 min) | bag for 5 h | observation |
| #6 | 70 | 30 | 0 | 0 | 80 | 125 | 160 | 145 | 130 | 17729 | 36368 | Stiff and rubbery |
| #18 | 70 | 20 | 10 | 0 | 80 | 125 | 160 | 145 | 130 | 15662 | 30657 | Flexible, compressible, chewy |
| GER#19 | 70 | 20 | | 10 | 80 | 125 | 160 | 145 | 130 | 15898 | 32552 | Flexible, compressible, chewy |

The results in Table XIII show that Samples #6 produced from ingredient containing starch containing flour (oat flour) have a stiff and rubbery texture, and had high resistance force against cylinder compression.

The results in Table XIII further show that Sample #18 and Sample GER #19, for which the starch containing flour (oat flour) was partially replaced by starch containing grain (steel cut oat [#18] and germinated oat [GER #19]), are more flexible and compressible than Sample #6.

Sample GER #19 has better flavour than samples #6 and #18, for example, favourable improvements in sweetness, nutty flavour, and slightly roasted flavour.

Protein in Example 9 was pea protein isolate. It can be replaced in the manner as explained in the context of Example 1 with other proteins.

As mechanically processed starch-containing grains, in Example 9, steel cut oats were used. Steel cut oats can be replaced in the manner as explained above and in the context of Example 1 with the other mechanically processed starch-containing grains. In particular, barley flake, oat flake, steel cut barley, rice kernel, broken rice, pearled barley, pearled rye, pearled wheat etc and mixture thereof can be used. The results are comparable.

As germinated grains, in Example 9, germinated oats were used. Germinated oats can be replaced in the manner as explained above. In particular with barley, rye, wheat, rice, corn, lentil, chickpea, mung bean, faba bean, pea, quinoa, pigeon peas, sorghum, buckwheat. The results are comparable.

The mechanically processed starch-containing grains and germinated starch-containing grains were not soaked in hot water before extrusion in Example 9.

Flour in Example 9 was oat flour. It can be replaced by barley flour, wheat flour, rice flour, pea flour, chickpea flour, faba bean flour, quinoa, pigeon peas, sorghum,

CONCLUSION

The inventors have discovered that the use of starch-containing germinated grains in extrusion has effects similar to using mechanically processed starch-containing grains, resulting in preventing or delaying protein matrix hardening. The benefit has not been discovered when using dry whole grains without germination process. The inventors have one possible explanation that the germinated grains has a softer kernel, which can be easier to get broken into smaller parts than dry whole grains without germination. The average particle size is larger than in regular starch-containing powders. The broken grain parts do not get easily emulsified by protein matrix. The broken grain parts can still get gelatinized with sufficient heat, shearing and water. Furthermore, the naturally existing grain cell wall structure and materials can restrict the complete-leaching, aligning and retrogradation of the starch molecules. In addition, the starch-containing germinated grains, cooked with other ingredients in the high moisture extrusion process, have advantage over the mechanically processed starch-containing grains and whole grains in flavour improvement, such as sweetness, nutty flavour, and slightly roasted flavour.

Final Words

It is obvious to the skilled person that, along with the technical progress, the basic idea of the invention can be implemented in many ways. The invention and its embodiments are thus not limited to the examples and samples described above but they may vary within the contents of patent claims and their legal equivalents.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated feature but not to preclude the presence or addition of further features in various embodiments of the invention.

LIST OF REFERENCE PUBLICATIONS

[Ref 1] Tolstoguzov, V. B. (1993), Thermoplastic extrusion—the mechanism of the formation of extrudate structure and properties. J Am Oil Chem Soc, 70: 417-424. doi:10.1007/BF02552717
[Ref 2] Akdogan, H. (1999), High moisture food extrusion. International Journal of Food Science & Technology, 34: 195-207. doi:10.1046/j.1365-2621.1999.00256.x
[Ref 3] Lin, S., Huff, H. and Hsieh, F. (2000), Texture and Chemical Characteristics of Soy Protein Meat Analog Extruded at High Moisture. Journal of Food Science, 65: 264-269. doi:10.1111/j.1365-2621.2000.tb15991.x
[Ref 4] Xiang Dong Sun, Susan D. Arntfield. (2010) Gelation properties of salt-extracted pea protein induced by heat treatment. Food Research International. Volume 43, Issue 2, 2010, Pages 509-515.
[Ref 5] M. H. Boyacioglu and B. L. D'Appolonia. (1994) Characterization and utilization of durum wheat for breadmaking III. Staling properties of bread baked from bread wheat flours and durum wheat flours. Cereal Chemistry. 71:34-41
[Ref 6] SZCZESNIAK, A. S. (1963). Classification of textural characteristics. J. Food Sci, 28, 385-389.
[Ref 7] BOURNE, M. C. (1978). Texture Profile Analysis. Food Technol., 32 (7), 62-66, 72.
[Ref 8] BOURNE, M. C. (1988). Basic Principles of Food Texture Measurement. Lecture text of Dough Rheology and Baked Products Texture Workshop—Chicago.
[Ref 9] SZCZESNIAK, A. S. (1966). Texture Measurements. Food Technol., 20, 50, 55-58.)
[Ref 10] McGrance, S. J., Cornell, H. J. and Rix, C. J. (1998), A Simple and Rapid Colorimetric Method for the Determination of Amylose in Starch Products. Starch/Starke, 50: 158-163. doi:10.1002/(SICI)1521-379X(199804)50:4<158::AID-STAR158>3.0.CO;2-7.
[Ref 11] Adedeji, O. E., Oyinloye, O. D., & Ocheme, O. B. (2014). Effects of germination time on the functional properties of maize flour and the degree of gelatinization of its cookies. African Journal of Food Science, 8(1), 42-47.
[Ref 12] Azarfar, A., Williams, B. A., Boer, H. and Tamminga, S. (2007) In vitro gas production profile and the formation of end products from non-washable, insoluble washable and soluble washable fractions in some concentrate ingredients. Journal of the Science of Food and Agriculture. 87: 1345-1355
[Ref 13] A Kaukovirta-Norja, A Wilhelmson, K Poutanen. (2004) Germination: a means to improve the functionality of oat. Journal of the Agricultural and Food Science. 12: 100-112.
[Ref 14] Paolo Benincasa et al., Sprouted Grains: A Comprehensive Review, Nutrients 2019, 11, 421; https://doi.org/10.3390/nu11020421

The invention claimed is:

1. A method of manufacturing a meat replacement food product, wherein:
  i) at least one proteinaceous matrix forming ingredient, comprising protein isolate or protein concentrate,
  ii) starch-containing grains that are selected from: a) steeped grains, b) germinated grains, c) malted grains, d) sprouted grains, or e) any combination of two, three or four of these as one of the ingredients, and
  iii) water or water-containing liquid
  a) are fed to an extruder suitable for high-moisture protein texturization extrusion; and
  b) are extruded in the extruder under conditions causing the continuous proteinaceous fibrous matrix structure to contain disruptions, of which some are in form of cavities having walls that are at least partly coated with gelatinized starch clusters formed with starch which is not emulsified with the proteinaceous fibrous matrix structure.

2. The method according to claim 1, wherein: the extrusion is carried out as high moisture protein texturization extrusion method in which starch containing grains are gelatinized and the proteins forming a proteinaceous matrix are melted.

3. The method according to claim 1, wherein: in the extrusion, the starch-containing grains are gelatinized before they get substantially powdered by the extruder screw, to produce a continuous proteinaceous fibrous matrix structure that is substantially linearly oriented in which some of the starch is not emulsified with the proteinaceous fibrous matrix structure.

4. The method according to claim 1, wherein: in the extrusion, the starch containing grains are gelatinized and the proteins forming the proteinaceous matrix are melted:
  i) before the gelatinized starch containing grains form an emulsion with the proteins of the proteinaceous matrix, and/or
  ii) before the gelatinized starch forms a complete barrier that prohibits the formation of continuous proteinaceous fibrous crosslinking matrix.

5. The method according to claim 1, wherein:
after the extrusion, in the extrudate
  i) at least 10.5% of the starch is washable starch when the protein content of the extrudate is larger than 55% but smaller than 70% weight %,
  ii) at least 15% of the starch is washable starch when the protein content of the extrudate is at least 70% but smaller than 90% weight %,
  iii) at least 16% of the starch is washable starch when the protein content of the extrudate is at least 90% but equal to or smaller than 99% weight %,
wherein the weight % indicated are on a dry basis.

6. The method according to claim 1, wherein: the at least one proteinaceous matrix forming ingredient comprises at least one protein isolate and/or at least one protein concentrate.

7. The method according to claim 1, wherein: the starch-containing grains have an average or median particle volume of at least 0.125 mm$^3$.

8. The method according to claim 1, wherein in the method, the extrusion is carried out such that:
  a) water or water-containing liquid is fed into the extruder;
  b) the mixture is heated in the extruder to gelatinize the starch containing grains;
  c) after reaching the starch gelatinization, further heating the mixture in the extruder to melt the at least one proteinaceous matrix forming ingredient;
  d) extruding the mixture through an extrusion die at temperature between 70° C. and 100° C.

9. The method according to claim 8, wherein:
  e) the heating step b. is performed as shock heating such that the starch containing grains are gelatinized before they get substantially powdered by the extruder screw:

i) such that starch gelatinization occurs between 0 s and 18 s, after the water/water-containing liquid feeding step a; and/or
ii) before the starch containing grains are ground by the extruder screw to a volume-per-particle less than 5000 $\mu m^3$, and before the starch containing grains are ground by the extruder screw to a volume-per-particle less than 1000 $\mu m^3$; and/or
f) the heating step c is performed as shock heating such that the protein melting temperature of the proteinaceous matrix forming ingredient will be achieved, at a temperature between 140° C. and 200° C. and/or such that protein melting occurs between 1 s and 40 s, advantageously between 10 s and 30 s, after water/water-containing liquid feeding step a; and/or
g) after the heating step c extruding of the mixture is continued at temperature not higher than that in the heating step c, between 90° C. and the temperature in heating step c., for more than 5 s.

10. The method according to claim 1, wherein: the starch containing grains are processed before feeding into the extruder such that the starch is at least partly gelatinized before feeding into the extruder.

11. The method according to claim 1, wherein: the water or water-containing liquid is fed to the extruder at an elevated temperature of above 60° C.

12. The method according to claim 1, wherein: the starch-containing grains are selected of, comprise or consist of one or more of the following: oat, barley, rye, wheat, rice, corn, lentil, chickpea, mung bean, faba bean, pea, quinoa, pigeon peas, sorghum, buckwheat.

13. The method according to claim 1, wherein: the starch-containing grains consist of or comprise whole grains.

14. The method according to claim 1, wherein: the starch-containing grains consist of or comprise mechanically processed starch containing grains, such as in particular one or more of the following: flakes (such as compressed, rolled, or flaked), steel cut grains, dehulled pearled grains, crushed grains, dehulled but not pearled grains.

15. The method according to claim 1, wherein:
in addition to
i) at least one proteinaceous matrix forming ingredient, such as protein isolate or protein concentrate,
ii) starch-containing grains that are selected from: a) steeped grains, b) germinated grains, c) malted grains, d) sprouted grains, e) any combination of two, three or four of these as one of the ingredients, and
iii) water or water-containing liquid
also
iv) flour and/or bran and/or starch and/or fibre is used.

16. The method of claim 15, wherein:
the flour comprises, consists of or is selected from at least one of the following: oat, barley, rye, wheat, rice, corn, lentil, chickpea, mung bean, faba bean, pea, quinoa, pigeon peas, sorghum, buckwheat, potato, sweet potato, lupine, any mixture thereof; and/or the bran comprises, consists of or is selected from at least one of the following: oat bran, barley bran, wheat bran, rice bran, rye bran, corn bran, millet bran, any mixture thereof; and/or
the starch comprises, consists of or is selected from at least one of the following: oat starch, barley starch, rye starch, wheat starch, rice starch, corn starch, lentil starch, chickpea starch, mung bean starch, faba bean starch, pea starch, quinoa starch, pigeon peas starch, sorghum starch, buckwheat starch, potato starch, sweet potato starch, lotus root starch, any mixture thereof; and/or
the fibre comprises, consists of or is selected from at least one of the following: oat fibre, barley fibre, rye fibre, wheat fibre, rice fibre, corn fibre, lentil fibre, chickpea fibre, mung bean fibre, faba bean fibre, pea fibre, quinoa fibre, pigeon peas fibre, sorghum fibre, buckwheat fibre, potato fibre, sweet potato fibre, lupine fibre, apple fibre any mixture thereof.

17. The method according to claim 1, wherein: the starch-containing grains are selected so that steeped grains (ii)a) are used in combination with germinated grains (ii)b) and/or malted grains (ii)c) and/or sprouted grains (ii)d) only, i.e. excluding the option ii)a) of claim 1 to be selected alone.

18. The method according to claim 1 wherein: the extrusion step is performed with an extrusion die having a length of above 300 mm.

19. The method according to claim 3, wherein: some of the non-emulsified starch is soluble starch, the compressibility is controlled by changing the extrusion parameters such that the proportion of the amount of soluble starch to the total amount of starch is between 3 weight % and 10 weight % and/or the soluble starch content is between 0.03 weight % and 1.1 weight %, in the meat replacement product after extrusion.

20. A meat-replacement food product, wherein: the meat-replacement food product is or comprises an extrudate manufactured with the method according to claim 1.

21. The meat-replacement food product according to claim 20, wherein: the extrudate comprises starch, of which starch at least 5.1%.

22. The meat-replacement product according to claim 20, wherein: the extrudate comprises disruptions in the matrix structure, such that some of the disruptions are in form of cavities that have walls that are at least partly coated with gelatinized starch clusters formed with washable starch not emulsified with the matrix structure.

23. The meat-replacement product according to claim 22, wherein: the starch clusters contain washable starch that is washable in water having a temperature of 50° C.

24. The meat-replacement product according to claim 20, wherein: the matrix structure has disruptions, and further wherein some of the disruptions in the matrix structure are in the form of cavities that have walls that are at least partly coated with gelatinized starch clusters formed with starch.

25. The meat-replacement product according to claim 20, wherein: the meat replacement product is in the form of chunks, chops, nuggets, fillets, steaks, or in doner meat-like slices, or in a doner kebab.

* * * * *